(12) United States Patent
Neill

(10) Patent No.: US 12,449,802 B2
(45) Date of Patent: Oct. 21, 2025

(54) METHODS AND SYSTEMS FOR A RECONFIGURABLE AUTONOMOUS TELEMETRY PLATFORM

(71) Applicant: RN Technologies, LLC, Garden City, NY (US)

(72) Inventor: Richard Neill, Garrison, NY (US)

(73) Assignee: RN Technologies, LLC, Garden City, NY (US)

( * ) Notice: Subject to any disclaimer, the term of this patent is extended or adjusted under 35 U.S.C. 154(b) by 446 days.

(21) Appl. No.: 17/836,653

(22) Filed: Jun. 9, 2022

(65) Prior Publication Data

US 2022/0397902 A1     Dec. 15, 2022

Related U.S. Application Data

(60) Provisional application No. 63/248,833, filed on Sep. 27, 2021, provisional application No. 63/240,515, (Continued)

(51) Int. Cl.
*G05D 1/00*       (2024.01)
*B33Y 80/00*     (2015.01)
(Continued)

(52) U.S. Cl.
CPC ............... *G05D 1/00* (2013.01); *B64U 20/40* (2023.01); *G05D 1/0022* (2013.01); (Continued)

(58) Field of Classification Search
CPC .. H04Q 9/00; H04Q 2209/00; H04Q 2209/30; H04Q 2209/40; H04Q 2209/43; H04Q 2209/70; H04Q 2209/753; H04Q 2209/80; H04Q 2209/82; H04Q 2209/823; H04Q 2209/826; H04Q 2209/84; G05D 1/00; G05D 1/0022; G05D 1/0044; G05D 1/0088; G05D 1/0276; H04L 41/40;
(Continued)

(56) References Cited

U.S. PATENT DOCUMENTS 7,626,982 B2 * 12/2009 Akadiri ............... G06F 13/4059
                                                              370/362
8,520,516 B2 *  8/2013 Ohnishi ................ H04L 47/135
                                                              370/230.1

(Continued)

*Primary Examiner* — Franklin D Balseca
(74) *Attorney, Agent, or Firm* — McCarter & English, LLP

(57) ABSTRACT

An example method includes providing a processor module of an autonomous system, the processor module being communicatively coupleable to a remote system via a first connection and being communicatively coupleable to a device to collect data via a second connection. The method further includes establishing the first connection between the remote system and the processor module, and establishing the second connection between the processor module and the device. The method further includes transmitting data from any one of the remote system, the device, or the processor module to any other of the remote system, the device, or the processor module via the first connection and/or the second data connection based at least in part on the data. The method further includes causing at least one of the remote system, the device, or the processor module to perform an action based at least in part on the data.

19 Claims, 38 Drawing Sheets

Related U.S. Application Data filed on Sep. 3, 2021, provisional application No. 63/209,154, filed on Jun. 10, 2021.

(51) Int. Cl.

| | | |
|---|---|---|
| *B64U 10/13* | (2023.01) | |
| *B64U 20/40* | (2023.01) | |
| *B64U 20/65* | (2023.01) | |
| *B64U 101/30* | (2023.01) | |
| *G16Y 40/20* | (2020.01) | |
| *H04L 41/40* | (2022.01) | |
| *H04L 43/08* | (2022.01) | |

(52) U.S. Cl.
   CPC ......... *G05D 1/0044* (2013.01); *G05D 1/0088* (2013.01); *G05D 1/0276* (2013.01); *H04L 41/40* (2022.05); *H04L 43/08* (2013.01); *B33Y 80/00* (2014.12); *B64U 10/13* (2023.01); *B64U 20/65* (2023.01); *B64U 2101/30* (2023.01); *G16Y 40/20* (2020.01); *H04Q 2209/00* (2013.01)

(58) Field of Classification Search
   CPC ......... H04L 43/08; B64U 20/40; B64U 20/65; B64U 10/13; B64U 2101/30; B33Y 80/00; G16Y 40/20
   See application file for complete search history.

(56) References Cited

U.S. PATENT DOCUMENTS

| | | | |
|---|---|---|---|
| 9,479,341 B2 * | 10/2016 | Bugenhagen | H04L 43/12 |
| 10,247,844 B2 * | 4/2019 | Fukushima | G01R 33/3415 |
| 10,892,843 B2 * | 1/2021 | Gharib | H04B 1/707 |
| 11,294,397 B2 * | 4/2022 | Johnson | B64U 10/14 |
| 12,003,894 B1 * | 6/2024 | Cardei | H04N 7/188 |
| 12,051,206 B2 * | 7/2024 | Chen | G06T 5/50 |
| 2021/0105545 A1 * | 4/2021 | Stamatakis | G08C 19/00 |

* cited by examiner

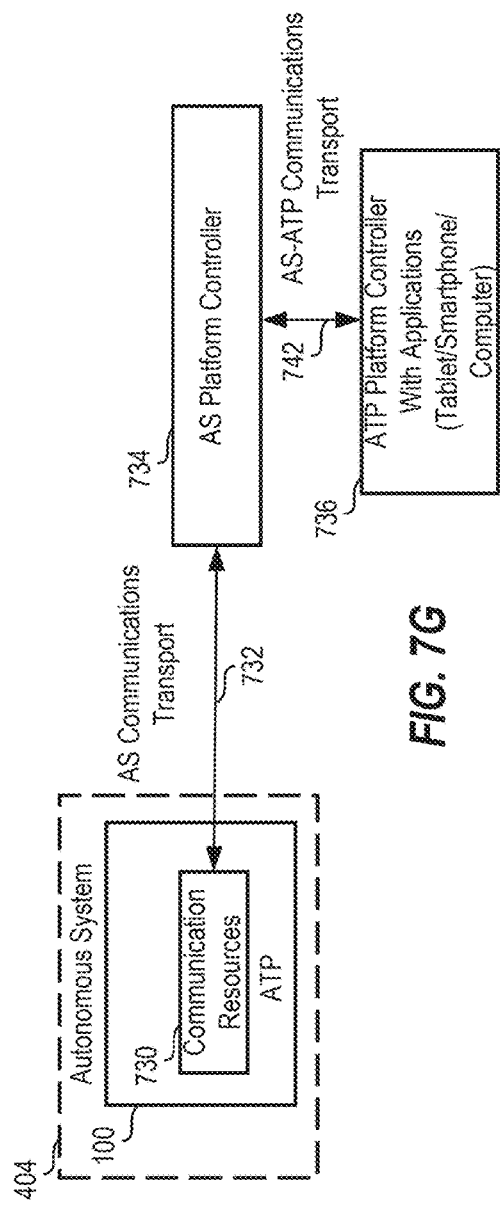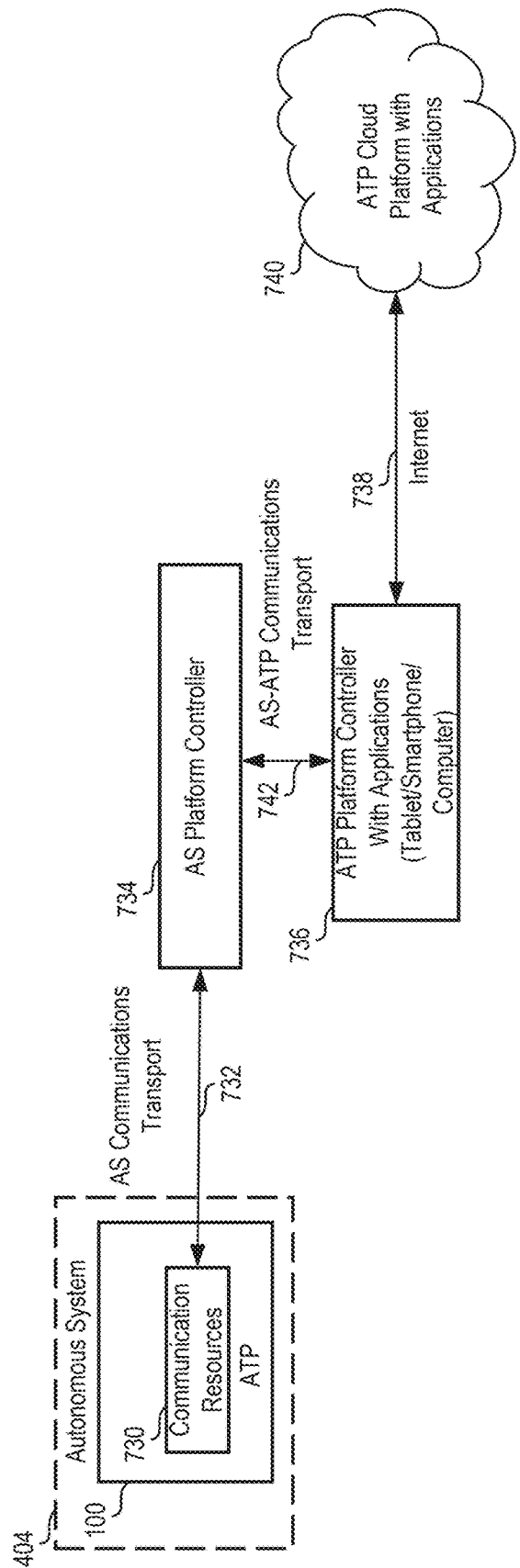

METHODS AND SYSTEMS FOR A RECONFIGURABLE AUTONOMOUS TELEMETRY PLATFORM

CROSS-REFERENCE TO RELATED APPLICATIONS

The present application is a nonprovisional application of, and claims the benefit of, U.S. Provisional Application Ser. No. 63/248,833 filed on Sep. 27, 2021, and also is a nonprovisional application of, and claims the benefit of, U.S. Provisional Application Ser. No. 63/240,515 filed on Sep. 3, 2021, and is also a nonprovisional application of, and claims the benefit of, U.S. Provisional Application Ser. No. 63/209,154 filed on Jun. 10, 2021, the contents of all of which are incorporated by reference herein in their entirety.

BACKGROUND OF THE DISCLOSURE

The subject matter disclosed herein relates to processing of telemetry and data from one or more autonomous systems or devices, and in particular to unmanned, autonomous, or remotely operated systems and methods for adding telemetry acquisition, processing, and distribution capabilities to additional devices to at least one remote system to enhance or increase system functionality.

A remote system includes a remote system/vehicle and either remote system control (computer, micro-controller, mobile smartphone or tablet, base or ground station system) for autonomous operation, or semi-autonomous control through a remote agent, for managing the remote system operations and activities. An example of a remote system is an autonomous system (AS), which is any system or device that can operate with minimal, limited, or no human intervention. An autonomous system can be a single instance or can be deployed as part of a distributed system architecture. In some cases, an autonomous system can be capable of moving (e.g. flying, crawling, roving, etc.) autonomously or semi-autonomously under the control of an operator or intelligent agent. In other cases, an autonomous system can be substantially stationary (e.g., a nuclear magnetic resonance (NMR) device, a magnetic resonance imaging (MRI) device), a portable medical device, or industrial control or sensor device. In either case, the autonomous system may include or be associated with one or more devices for collecting data (e.g., camera, temperature sensor, pressure sensor, gas sensor, NMR imaging sensor, MRI imaging sensor, and/or the like, including combinations and/or multiples thereof). These devices can acquire telemetry data for operation or analysis in order to provide for a complete set of functions required to achieve some goal or objective.

BRIEF DESCRIPTION OF THE DISCLOSURE

In one exemplary embodiment, a method includes providing a processor module of an autonomous system, the processor module being communicatively coupleable to a remote system via a first connection and the processor module being communicatively coupleable to a device to collect data via a second connection. The method further includes establishing the first connection between the remote system and the processor module. The method further includes establishing the second connection between the processor module and the device. The method further includes transmitting data from any one of the remote system, the device, or the processor module to any other of the remote system, the device, or the processor module via at least one of the first connection or the second data connection based at least in part on the data. The method further includes causing at least one of the remote system, the device, or the processor module to perform an action based at least in part on the data.

In addition to one or more of the features described herein, or as an alternative, further embodiments of the method may include that transmitting the data is performed synchronously.

In addition to one or more of the features described herein, or as an alternative, further embodiments of the method may include that transmitting the data is performed asynchronously.

In addition to one or more of the features described herein, or as an alternative, further embodiments of the method may include that transmitting the data based at least in part on the data includes determining how to transmit the data based at least in part on local metrics, remote metrics, a local configuration of the processor module, a network topology, and network properties.

In addition to one or more of the features described herein, or as an alternative, further embodiments of the method may include that the remote system is another autonomous system remote from the processor module of the autonomous system, a platform controller remote from the processor module of the autonomous system, or a portable network controller remote from the processor module of the autonomous system.

In another exemplary embodiment a system includes a processor module communicatively coupleable to an autonomous system. The system further includes a device to collect data. The system further includes a communication link between the processor module and the device to transmit data between the processor module and the device, the processor module facilitating communication between the device and the processor module via the communication link.

In addition to one or more of the features described herein, or as an alternative, further embodiments of the system may include that the processor module includes: a system processor system on module; and a communication device.

In addition to one or more of the features described herein, or as an alternative, further embodiments of the system may include that the processor module further includes: an interface controller; a processor module system software/operating system; a telemetry data/model processor; a message and transport services module; and a transport handler.

In addition to one or more of the features described herein, or as an alternative, further embodiments of the system may include that the processor module includes: a system processor system on module; a communication device; an intelligent autonomous telemetry processor system on chip; and a shared memory or internal system bus.

In addition to one or more of the features described herein, or as an alternative, further embodiments of the system may include that the processor module further includes: an interface controller; a processor module system software/operating system; a telemetry data/model processor; and a message and transport services module.

In addition to one or more of the features described herein, or as an alternative, further embodiments of the system may include that the intelligent autonomous telemetry processor system on chip includes: a network controller; and a transport handler.

In addition to one or more of the features described herein, or as an alternative, further embodiments of the system may include that the intelligent autonomous telemetry processor system on chip further includes: an artificial intelligence processor core; a digital signal processor core; a scalar processor core; a real-time processor core; and an inference and event engine.

In addition to one or more of the features described herein, or as an alternative, further embodiments of the system may include that the processor module includes: a communication device; and an intelligent autonomous telemetry processor system on chip.

In addition to one or more of the features described herein, or as an alternative, further embodiments of the system may include that the intelligent autonomous telemetry processor system on chip further includes: an interface controller; a processor module system software/operating system; a telemetry data/model processor; a message and transport services module; a shared memory or internal system bus; a network controller; and a transport handler.

In addition to one or more of the features described herein, or as an alternative, further embodiments of the system may include that the intelligent autonomous telemetry processor system on chip further includes: an artificial intelligence processor core; a digital signal processor core; a scalar processor core; a real-time processor core; and an inference and event engine.

In addition to one or more of the features described herein, or as an alternative, further embodiments of the system may include that the processor module further facilitates communication between the processor module and a remote system via another communication link.

In addition to one or more of the features described herein, or as an alternative, further embodiments of the system may include that the remote system is selected from a group consisting of: another autonomous system remote from the autonomous system; an autonomous system platform controller remote from the autonomous system; a portable network controller remote from the autonomous system; and another processor module.

In yet another exemplary embodiment an autonomous telemetry system includes a device to collect data. The autonomous telemetry system further includes a processor module communicatively coupled to the device via an external system bus, the processor module facilitating communication between the device and the processor module via the external system bus.

In addition to one or more of the features described herein, or as an alternative, further embodiments of the autonomous telemetry system may include that the device is one of a non-intelligent device or an intelligent device, wherein the non-intelligent device comprises a device hardware interface and a device feature hardware, the device feature hardware collecting the data, and wherein the device is an intelligent device, wherein the intelligent device comprises a device hardware interface, a device operating system, a device processor and program code, and a device feature hardware, the device feature hardware collecting the data.

In addition to one or more of the features described herein, or as an alternative, further embodiments of the autonomous telemetry system may include that the device is a nuclear magnetic resonance (NMR) device, wherein the data is NMR data collected by the NMR device, wherein the processor module receives the NMR data from the processor module, and wherein the processor module transmits the NMR data to an NMR application for visualization and user activity, the NMR application being remote from the NMR device.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIGS. 7G and 7H are schematic illustrations of example implementations of an ATP within an autonomous system, an autonomous system platform controller, and an ATP platform controller and ATP applications according to one or more embodiments described herein;

FIGS. 7L, 7M, 7N, and 7O are schematic illustrations of examples of use cases for the ATP portable network controller of FIGS. 7J and 7K according to one or more embodiments described herein;

The detailed description explains embodiments of the disclosure, together with advantages and features, by way of example with reference to the drawings.

DETAILED DESCRIPTION OF THE DISCLOSURE

With the increasing number of remotely operated and fully autonomous systems, products, and applications, there is also a corresponding increasing need to support complex telemetry processing from the one or more semi-autonomously or autonomously operating systems, embedded components, payloads and devices beyond cameras, imaging/ranging solutions, sensors, detectors, measurement, or monitoring devices. These remote systems can take several forms, such as but not limited to autonomous guided vehicles (AGV), unmanned aerial vehicles (UAV), autonomous underwater vehicles (AUV), portable devices, industrial control and sensor systems, Internet of Things (IoT) devices, and the like. As used herein, the term "remote system" may refer to any of the foregoing or other remotely operated (either autonomous, semi-autonomous, or operator controlled) device or system, or autonomous system (AS). While embodiments herein may refer to specific remote systems, such as the aforementioned AGV, UAV, AUV, portable devices, industrial control and sensor systems, IoT devices, and/or the like including combination or multiples thereof, this is for example purposes and the claims should not be so limited.

One or more embodiments described herein provide an autonomous telemetry platform (ATP) for collecting, processing and managing data for one or more aspects of an autonomous system. For example, an ATP is used to process data and manage data flows and communications within an autonomous system and/or between/among multiple autonomous systems. Additionally, an ATP is used to process data and manage data-flows and communications within an ATP and/or between and among multiple ATP systems, or combinations of ATP and autonomous systems thereof. An autonomous system (AS) is any system or device that can operate with minimal, limited, or no human intervention. An AS can be a single instance or can be deployed as part of a distributed system architecture. In examples, the AS can be a portable medical device or an industrial component (e.g., an intelligent flow measurement or detection device at a plant facility) that is stationary and part of a distributed network of such devices.

Figure 1A:
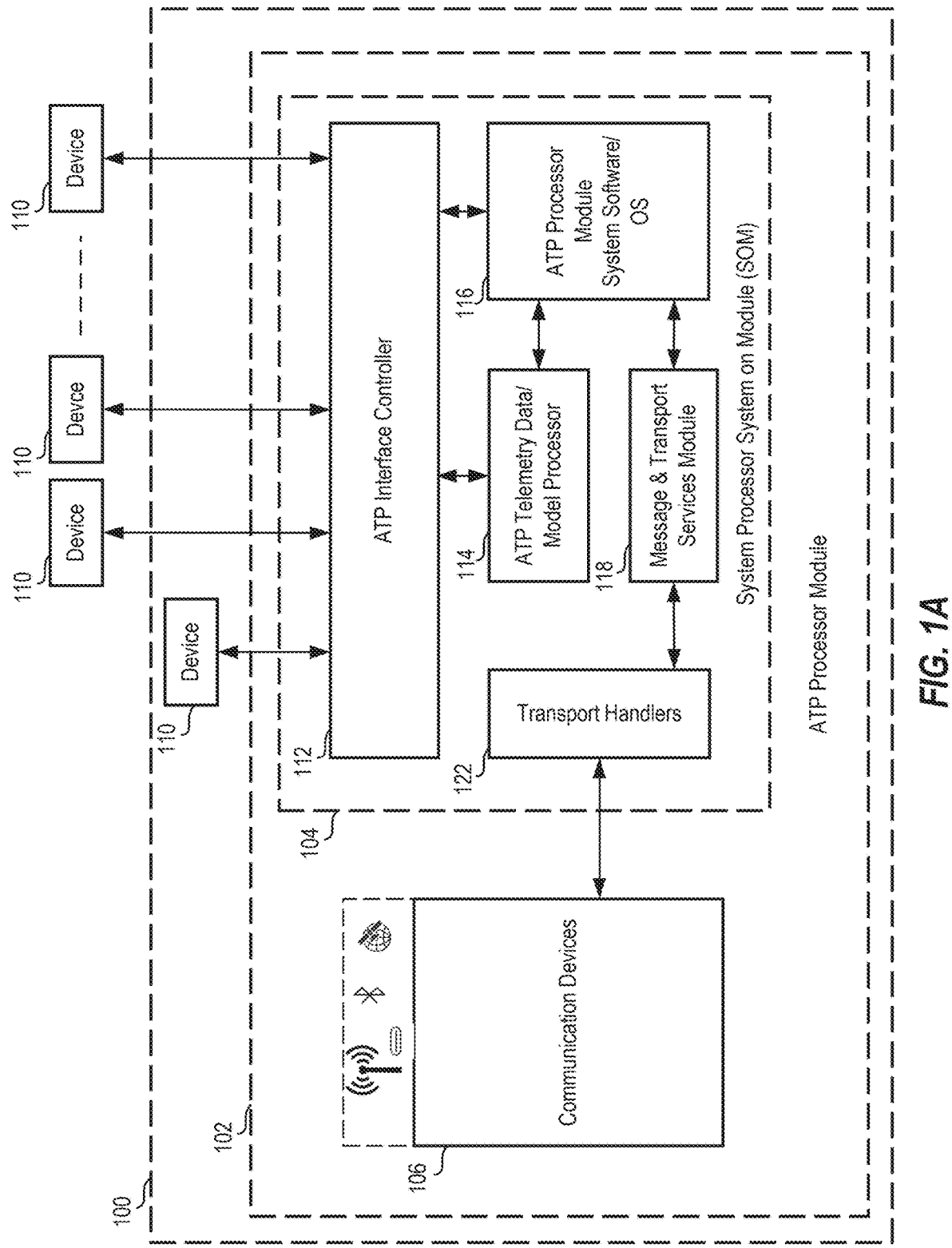
FIGS. 1A-1C are schematic illustrations of example implementations of an ATP processor module according to one or more embodiments described herein.
Figure 1B:
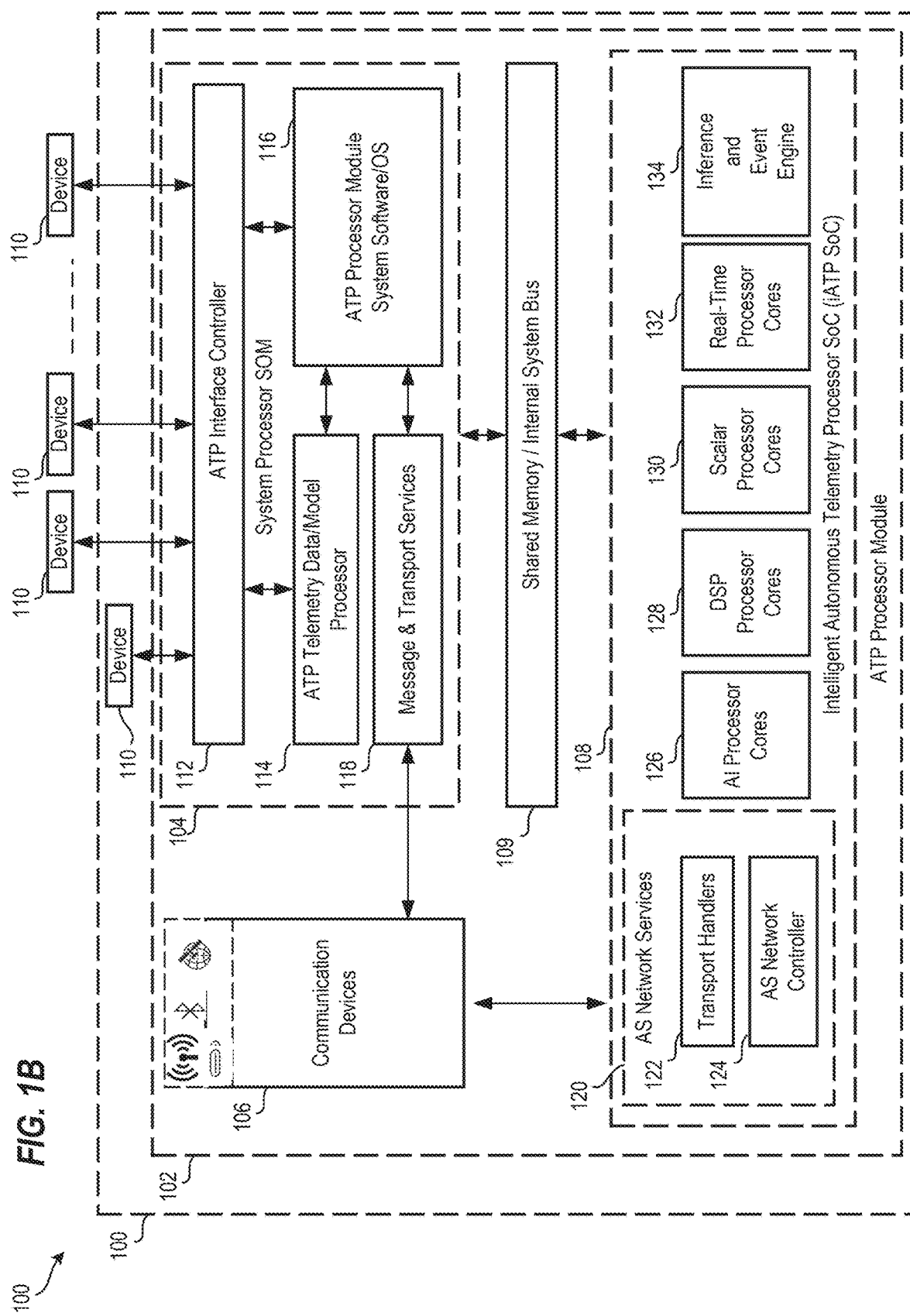
Figure 1C:
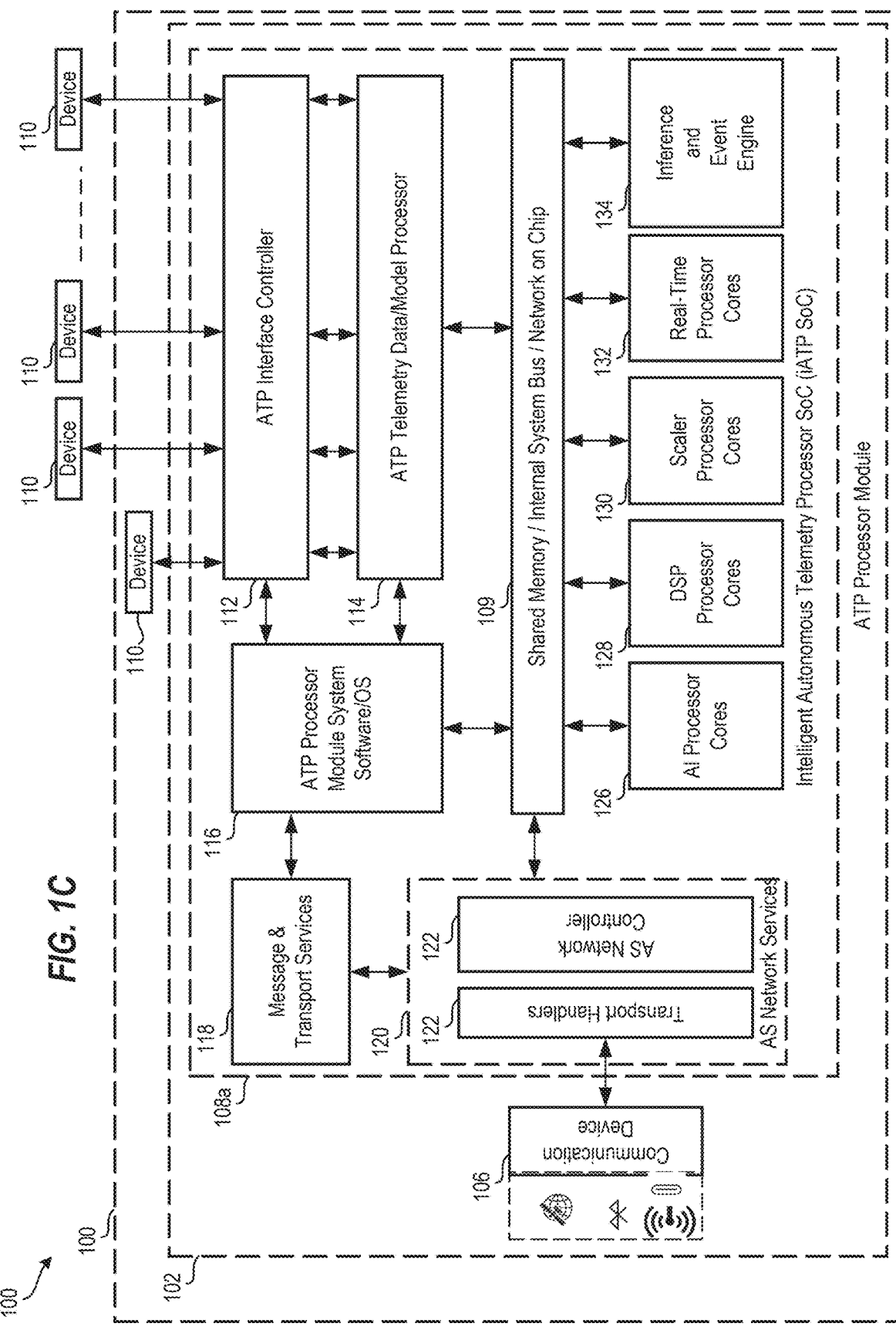

FIGS. 1A-1C are schematic illustrations of example implementations of an ATP processor module 102 according to one or more embodiments described herein. According to an example, the ATP processor module 102 can be coupled to or integrated with an ATP 100. In another example, the ATP processor module 102 can be implemented in an autonomous system 404 (see, e.g., FIG. 4A). Other implementations are also possible as described herein, see, e.g., FIGS. 4A-4F, 5A, 5B, 6A, 6B, and/or the like, including combinations and/or multiples thereof.

The ATP platform is a distributed network system of components, which could include an ATP processor module 102, a network of ATP processor modules 102, a device (e.g., the device 110) integrated therein, a communication bus and/or communication resources, and/or the like, including combinations and/or multiples thereof.

The ATP 100 provides "edge artificial intelligence" processing as part of an end-to-end analytics platform. The ATP 100 can deliver processed telemetry data locally and/or to one or more remote systems. In examples, the ATP 100 manages data flows as part of an intelligent ATP network (e.g., an autonomous software defined network can manage data flows specifically), which is further described herein. To do this, the ATP 100 uses the ATP processor module 102, which can take one of several forms. For example, in FIG. 1A, the ATP processor module 102 is implemented using a system on module (SOM) architecture. In FIG. 1B, the ATP processor module 102 supplements the SOM architecture with an intelligent ATP processor (iATP) system-on-a chip (SoC) (iATP SoC) architecture. In FIG. 1C, the ATP processor module 102 implements the features of the SOM architecture and iATP SoC architecture as an integrated iATP SoC architecture.

The ATP processor module 102 facilitates and manages communication between the one or more devices 110 as part of an autonomous system. It should be appreciated that one or more of the devices 110 can be included in the ATP 100 and/or can be external to the ATP 100, such as included in the autonomous system 400, for example, as shown in FIGS. 1A-1C. This can include receiving data from one or more of the devices 110, sending data and/or commands to one or more of the devices 110, and the like. For example, one or more of the devices 110 can include one or more sensors (e.g., a camera, a gas sensor, a chemical sensor, a nuclear magnetic resonance (NMR) device, a magnetic resonance imaging (MRI) device, a biological measurement and monitoring device, a temperature sensor, a pressure sensor, etc.) which can be used to collect data. The ATP 100 can command one or more of the devices 110 to collect data (or the data can be collected responsive to some other trigger event) and, in response, the sensor(s) of the one or more devices 110 collects the data and transmits it to the ATP 100. In examples, the ATP 100 is integral to, coupled to, or otherwise associated with a remote system. The ATP 100 can determine one or more communication schemes to utilize, such as an asynchronous scheme or a synchronous scheme, as described further herein.

In each of the examples of FIGS. 1A-1C, the ATP processor module 102 facilitates and manages communication between the one or more devices 110 and the ATP 100. In the example of FIG. 1A, the ATP processor module 102 facilitates and manages communication using an SOM architecture. In particular, the ATP processor module 102 includes a system processor SoM 104 that collects and processes data from the devices 110 and facilitates communication (using communication devices 106) between, for example, an autonomous system (see, e.g., FIGS. 4A, 4B, 4F) and the devices 110. This can be done by processing telemetry data and providing message and transport services, which manages the scheduling, transport, and delivery characteristics for incoming and outbound message data consumed or generated by the ATP processor module.

The ATP processor module 102 includes an ATP interface controller 112, an ATP telemetry data/model processor 114, an ATP processor module system software/operating system (OS), a message and transport services module 118, and transport handlers 122. Data flows from the devices 110, through the ATP processor module 102 and its components, to the communication devices 106 as shown. Similarly, data flows from the communication devices 106, through the ATP processor module 102 and its components, to the devices 110 as shown. The communication devices 106 can include one or more modules for transmitting and/or receiving data. Such modules can include a Bluetooth module, a WiFi (e.g., IEEE 802.11) module, a universal serial bus (USB) module (e.g., USB type C), a cellular module (e.g., 4G, 5G), a satellite module, a radio frequency (RF) module, and/or the like, including combinations and/or multiples thereof. The components of the ATP processor module 102 are now described in more detail.

The ATP interface controller 112 provides a software interface abstraction, module control, feature implementation, and integration for each of the one or more devices 110. The ATP interface controller 112 manages these functions for each of the devices 110 while acting as an interface between the system, application, and communications processes executing concurrently in support of the overall platform operation of the ATP 100. The ATP interface controller 112 is described in more detail herein with reference to FIG. 2.

The ATP telemetry data/model processor 114 receives data from the devices 110 via the ATP interface controller 112 and interprets telemetry information from the devices 110. For example, the ATP telemetry data/model processor 114 takes multiple data formats from one or more sensors associated with one or more of the devices 110 and unifies the data into a common data model format. For example, the ATP telemetry data/model processor 114 receives data in multiple formats and performs a translation into the common data model format by extracting information from the data, transforming the information into the common data model format, and then storing the information. The common data model format enables the various components of the system processor SoM 104 to utilize the data (e.g., read the data, process the data, modify the data, etc.). This enables sensors of different types, makes, models, manufacturers, etc. to be used together such that the ATP 100 can read and utilize the data from the different sensors and/or different devices 110.

The ATP processor module system software/OS 116 executes the SOM operating system software including a supervisory control program as well as system and/or application-level software components. An example of system software is the software code module execution whose function is to integrate the message and transport services to one or more autonomous system controllers through one of the available communications resources.

The message and transport services module 118 manages the scheduling, transport, and delivery characteristics for incoming and outbound message data consumed or generated by the ATP processor module 102. As is further described herein, incoming and outbound message data, and therefore related sets of message data, are associated or grouped together as an instance of a message flow or pattern of communications for the given software or hardware process or device. For example, one or more of the devices 110 generates a continuous stream of telemetry data that may be pre-processed by the ATP processor module 102 and subsequently delivered to a remote system (e.g., another autonomous system), or other ATP.

For inbound command/data (see, e.g., FIG. 3A), the AS network controller 124 (see, e.g., FIGS. 1B and 1C) routes a given message, and consequently its associated message flow, for processing synchronously or asynchronously. For outbound command/data (see, e.g., FIG. 3B), the determination of whether a given message, and consequently its associated message flow, is processed synchronously or asynchronously depends on the configuration of the ATP processor module 102. For example, for the embodiment of the ATP processor module 102 in FIG. 1A, a connection manager 311 (see, e.g., FIGS. 3B and 3H) may determine whether a given message, and consequently its associated message flow, is processed synchronously or asynchronously, by interfacing with the ATP processor module system software/OS 116. As another example, for the embodiment of the ATP processor module 102 in FIGS. 1B and 1C, the connection manager 311 directly determines whether a given message, and consequently its associated message flow, is processed synchronously or asynchronously and causes a suitable message path to be implemented. Synchronous and asynchronous data handling is described in more detail herein with reference to at least FIGS. 3A and 3B.

In accordance with another aspect of the disclosure, AS network controller 124 adaptively manages message delivery across both asynchronous and synchronous message delivery processing methods in accordance with the optimal delivery method given network communications bandwidth, latency, and channel/transport characteristics that are monitored by the AS network controller 124 as well as configuration of the given device instance. For example, a particular device (e.g., one of the devices 110) may utilize a minimum data access time or frequency, such as for a sensor reading, in which case the AS network controller 124 can consider which delivery method (synchronous or asynchronous) is suitable based on the available communications capabilities and user-preferences (e.g., where a user-preference is to set the frequency of sensor measurement updates). In this approach, and in cases where a synchronous communication scheme is not realizable due to degraded communications, the AS network controller 124 may dynamically move respective messages to a message queue for asynchronous message delivery (see, e.g., FIG. 3A). As a further embodiment, in cases where the communications channel is sufficiently degraded, or in a fault-condition, the AS network controller 124 may cause the messages to be persisted or stored automatically through persistent message queuing (message data stored in local non-volatile memory). Once the communications channel is no longer in a degraded or fault-condition, any messages that have been persisted can be automatically delivered over the communications channel as originally intended.

In another embodiment, the collective communication activities orchestrated by the AS network controller 124, in conjunction with respective communications device functions, form an integrated autonomous system network implementation for an individual autonomous system or a swarm or fleet of multiple autonomous systems in a point-to-point or mesh configuration. In such cases, network communications in terms of one or more of message delivery performance, latency-minimization, path and message routing as well as QoS are optimized across one or more communications resources available to each ATP and corresponding autonomous system host device. For example, the AS network controller 124 can implement an autonomous system network instance to improve message delivery from one ATP to a remote computing system. In the embodiment of FIG. 1A, the 116 ATP processor module system software/OS can support these features in software. The message and transport services module 118 orchestrates signaling to the ATP interface controller 112 for upstream synchronous or asynchronous communications at the connection level. Thus, in the embodiment of FIG. 1A, the ATP processor module system software/OS decides, based on metrics from the transport handlers 122, on which connection type to use as described above. In the embodiments of FIGS. 1B and 1C, the AS network controller 124 provides this functionality. The foregoing applies outbound communication flows (see, e.g., FIG. 3B). Inbound communication flows (see, e.g., FIG. 3A) are processed in parallel and independent of one another. In another example, multiple AS network controllers 124 can coordinate to improve multiple performance metrics such as bandwidth, latency, and reliability by routing one or more messages/data across communications devices and resources across multiple expansion platforms, remote systems (e.g., UAVs), and/or remote computing systems.

The transport handlers 122 include one or more transport handlers that communicate with the communication devices 106. For example, the transport handlers 122 can include a separate transport handler for each type of module present in the communication devices 106. As an example, if the communication devices 106 includes a USB module, the transport handlers 122 can include a corresponding USB transport handler for interfacing with the USB module of the communication devices 106.

In FIG. 1B, in addition to the system processor SoM 104, the ATP processor module includes an iATP SoC 108. The iATP SoC and the system processor SoM communicate via a shared memory/internal system bus 109, each of which are hardware resources enabling the integration of the system processor SoM 104 and iATP SoC 108. The iATP SoC 108 provides the ATP processor module 102 with autonomous system (AS) network services 120 using the transport handlers 122 and an AS network controller 124 (see, e.g., FIGS. 3C and 3D). In this example, the transport handlers 122 are implement in the AS network services 120 rather than in the system processor SoM 104. The AS network services 120 establishes and manages communications across one or more ATPs and/or autonomous systems and/or devices as part of the ATP processor module 102 functionality.

The AS network services 120 attempts to optimize communications performance metrics based on the available communications links. For example, a higher bandwidth communication link (e.g., 5G) may be used where available instead of a lower bandwidth communication link (e.g., Bluetooth). It should be appreciated that the AS network services 120 can change what communication links are used over time as conditions/environments change (e.g., a communication link becomes available that was previously unavailable). It should also be appreciated that the AS network services 120 can make communication decisions based on the content of the data collected, such as by one or more of the devices 110. For example, if a gas sensor detects a gas leak, the AS network services 120 may select a fastest communication link. In a second example, if bandwidth decreases or latency increases across one or more communication resources, the AS network services 120 can indicate to the ATP 100 that the ATP 100 should modify its trajectory or behavior to avoid a loss of communications. In another example, the AS network services 120 can route communications to an ATP, autonomous system or remote system, or combination thereof, to act as a communications proxy in order to maintain an operational (e.g., to within a desired quality of service) end-to-end communications path to a remote system controller even in the presence of degraded performance or loss of communications.

In examples, the AS network services 120 can support a software defined network. The AS network services 120 includes an autonomous software defined network (A-SDN) data-plane communications controller 370 (see, e.g., FIG. 3D), which implements packet forwarding and routing based on an A-SDN control-plane communications controller 755 (see, e.g., FIG. 7J), which manages the complete network topology of the A-SDN. The A-SDN control-plane communications controller 755 is external to the ATP 100, residing on a remote host, an ATP portable network controller 744 (see, e.g., FIG. 7J), an ATP platform controller with applications 736, and/or the like, including combinations and/or multiples thereof. For example, the AS network services 120 coordinates a software defined network for the ATP processor module 102 in conjunction with the A-SDN control-plane. The AS network services 120 can implement a network instance to manage communications between the ATP processor module 102 and the one or more of the devices 110 (and/or any other suitable devices). The AS network services 120 can analyze the content of data collected by the one or more devices 110 to make decisions on how to handle the data (e.g., route the data synchronously, route the data asynchronously, log/store the data for later routing, etc.). For example, the environment, conditions, etc. detected by the sensors of the one or more devices 110 can change how the AS network services 120 routes data.

The iATP SoC 108 also provides additional processing-cores for performing other tasks related to edge analytic data processing and machine learning, requiring the use of processing cores implementing AI, DSP, etc. For example, the iATP SoC 108 includes AI processor cores 126, digital signal processor (DSP) processor cores 128, scalar processor cores 130, real-time processor cores 132, and an inference and event engine 134.

The AI (artificial intelligence) processor cores 126 analyze data collected by sensor(s) associated with the one or more devices 110 as described herein. For example, the AI processor cores 126 can implement one or more machine supervised learning engines trained to perform a task. In a second embodiment, the AI processor cores 126 can implement one or more unsupervised algorithms that do not rely on training in order to perform a task. As one such supervised machine learning example, an AI processor core of the AI processor cores 126 can include a machine learning model trained to identify a certain feature within images, such as using a convolutional neural network. Other types of AI/machine learning can also be implemented. The DSP processor cores 128 include one or more digital signal processors that perform digital signal processing and complex mathematically operation (e.g., encoding/decoding, compressing, encryption, speech/image recognition/synthesis, noise cancellation, matrix mathematics, floating point calculations, and the like), on the data received by the one or more devices 110. The scalar processor cores 130 include one or more scalar processors that perform scalar processing (e.g., general computation operations, integer operations, etc.) on the data received by the one or more devices 110. The real-time processor cores 132 include one or more real-time processors for processing the data received by the one or more devices 110 in real-time (or near-real-time) within specific timing constraints or "deadlines" which may be adjustable, user-definable, and/or preset. The real-time processor cores 132 can also be utilized to generate complex pulse sequences used by NMR or MRI devices, for example. The inference and event engine 134 provides the ability to ask questions of the iATP SoC 108 (e.g., query the iATP SoC 108 to determine when a particular event occurs). For example a remote system application can register to receive an event that is generated when a particular inference result has occurred, such as the detection of a given property within a processed image or inference derived from some combination or pattern of sensor results. As another example, the resulting analysis of an NMR measurement device can be utilized by the inference and event engine 134 to generate an event when a particular property of the sample is detected or measured and classified accordingly.

In some examples, such as shown in FIG. 1B, the iATP SoC 108 is a separate hardware device from the system processor SOM 104. However, in other examples some or all of the features and functionality of the system processor SOM 104 and the iATP SoC 108 can be integrated into a single hardware device, such as shown in FIG. 1C. In particular, the example of FIG. 1C integrates the features and functionality of the system processor SoM 104 and the iATP SoC 108 as a single unit (e.g., integrated iATP SoC 108*a*). That is, the integrated iATP SoC 108*a* includes some or all of the features and functionality of the system processor SoM and the iATP SoC 108.

Figure 2:
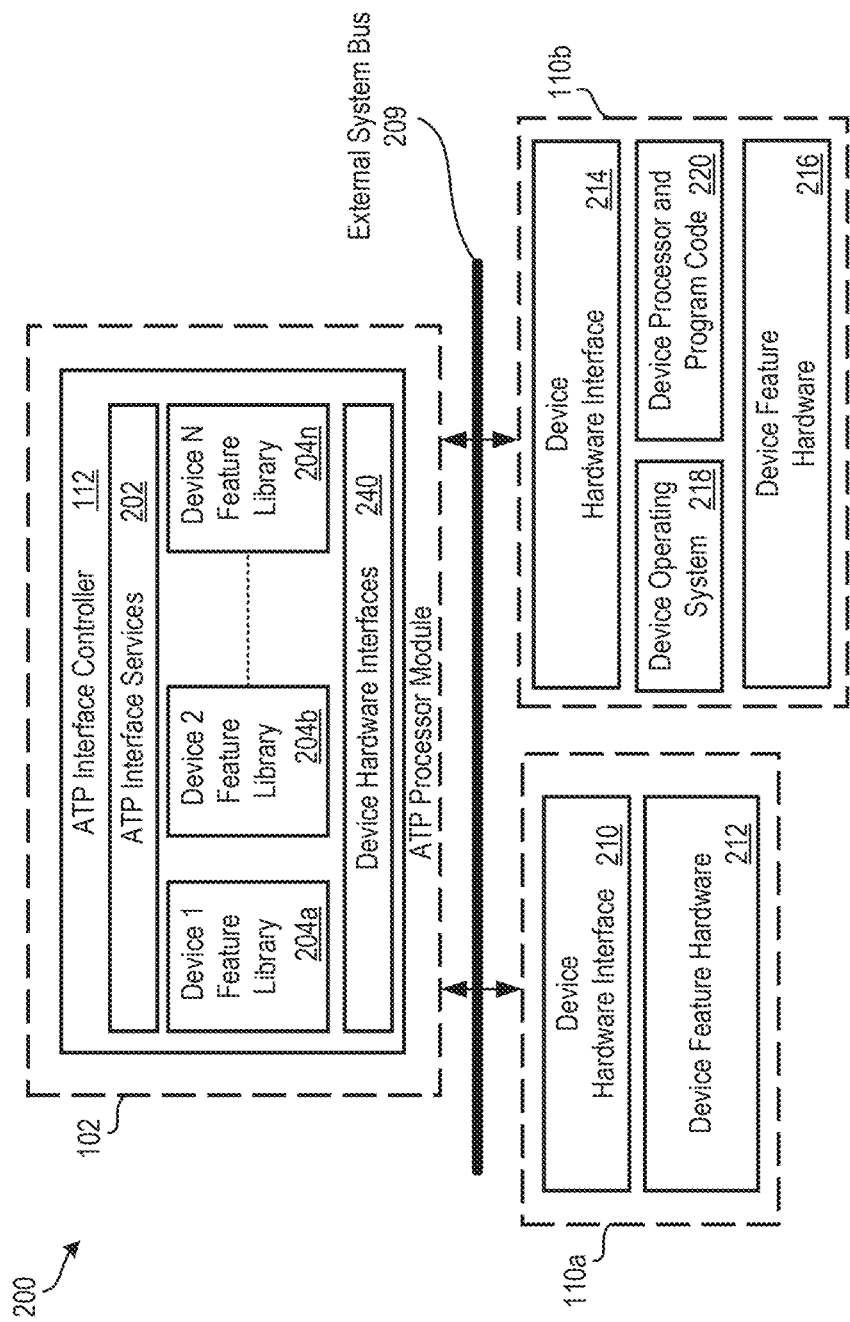
FIG. 2 is a schematic illustration of an example implementation of an ATP processor module according to one or more embodiments described herein.

FIG. 2 is a schematic illustration of an example implementation of the ATP processor module 102 in a control system 200 according to one or more embodiments described herein. This example shows the basic structure of the ATP processor module 102 including an ATP interface controller 112. This example further shows that the ATP processor module 102 is in communication with "dumb" (non-intelligent) and "smart" (intelligent) devices 110*a*, 110*b* respectively via an external system bus 209.

The control system 200 manages the operation, command and control, data exchanges, and orchestration of functions between the ATP processor module 102 and one or more devices 110*a*, 110*b*. In this example, the ATP processor module 102 includes the ATP interface controller 112. The ATP processor module 102 manages interactions between ore or more ATPs coupled to an autonomous system (see, e.g., FIGS. 4A, 4B, 4F) through one or more communications methods.

The ATP interface controller 112 provides a software interface abstraction, module control, feature implementation, and integration for each of the devices 110 (e.g., the devices 110*a*, 110*b*). The ATP interface controller 112 manages these functions for each device 110 (e.g., the devices 110*a*, 110*b*) while acting as an interface between the system, application, and communications processes executing concurrently in support of the overall platform operation. The ATP interface controller 112 is implemented a layered architecture, for example, having multiple layers. The upmost layer of the layered architecture handles message data communications for delivery or consumption outside the unit. The middle layer of the layered architecture includes one or more device feature implementations for managing the operation of a given device without requiring knowledge of the underlying hardware for that device. The lowest layer of the layered architecture includes the hardware interface layer, where feature operations from the layer above (i.e., the middle layer) are translated into direct hardware signaling and control operations. For example, the ATP interface controller 112 manages each device's hardware instance (e.g., one or more of the devices 110*b*, 1210*b*) in terms of low-level hardware level command and control methods over device buses that include UART, SPI, I2C, USB, programmable I/O, parallel and serial communications, and other real-time device interfaces. In an example, each of the devices 110*a*, 110*b* has a specific feature implementation that includes software code for managing and operating the given device 110 and its associated functionality. For example, a temperature sensor device utilizes a device feature implementation that can read the specific temperature sensor device (registers) hardware, potentially transforming the accessed data, before handing the data to either of the synchronous or asynchronous message data delivery subsystems for processing further within the message and transport services module 118. The ATP interface controller 112 supports multiple device feature implementations in a fully dynamic manner, whereby new feature implementations can be added, updated, and/or removed as devices 110 are also added, updated, and/or removed.

The ATP processor module 102 communicates with the devices 110*a*, 110*b* via an external system bus 209 that implements hardware control/data signals as previously described. The external system bus 209 transfers information (e.g., data, messages, commands, etc.) between the ATP processor module 102 and one or more of the devices 110*a*, 110*b*, which can be performed synchronously and/or asynchronously based on the hardware implementation. For example, serial peripheral interface (SPI) is a synchronous communications bus. In contrast, a universal asynchronous receiver/transmitter (UART) interface provides for asynchronous data delivery. In embodiments, the external system bus 209 transfers command and control messages and/or data messages between the ATP processor module 102 and one or more of the devices 110*a*, 110*b*. The command and control messages can command, for example, one of the devices 110*a*, 110*b* to perform a function. The data messages can include data, for example, collected by a sensor associated with one of the devices 110*a*, 110*b*. As an example, the ATP processor module 102 uses the external system bus 209 to transfer a command and control message to the device 110*b* to command the device 110*b* to perform a task. In response, the device 110*b* can send a data message (e.g., an acknowledgment, data collected by a sensor, etc.) back to the ATP processor module 102 via the external system bus 209.

According to another aspect of the disclosure, command and data communications is provided over a synchronous delivery method based on request/response communication method that occur in near-or-real-time. In this embodiment, there is no message queuing wherein the message delivery occurs in accordance with the minimal latency of any computing device or communications channel. In this embodiment, near or real-time streaming of data is possible as messages are delivered within a bounded time-period.

With continued reference to FIG. 2, the ATP interface controller 112 includes an ATP interface services 202, device feature libraries 204a-204n, . . . 204n for the devices (e.g., the devices 110a, 110b), and device hardware interfaces 240. For example, the device feature library 204a is associated with the device 110a, and the device feature library 204b is associated with the device 110b. Additional device feature libraries (e.g., the device feature library 204n) are associated with additional devices 110.

The ATP interface services 202 includes the one or more device feature libraries implementations (e.g., the device feature libraries 204a-204n) having instruction codes on how to manage, operate and communicate (at the device electronics interface level via the device hardware interfaces 240) with the hardware specific devices in order to utilize the device capabilities and resources. Each of the device feature libraries 204a-204n define the features of its respective device. For example, if the device 110a is a non-intelligent device (as described herein), the device feature library 204a might define the type of sensor(s) disposed on the device 110a, and other information about the device 110a. If the device 110a is an intelligent device (as described herein), the device feature library 204b might define the intelligent communications stack offloading message delivery protocol that the device 110b uses, and other information about the device 110b. The device hardware interfaces 240 provide the hardware (e.g., electronic signals, protocols, devices, and/or the like, including combinations and/or multiples thereof) and driver-level interfaces to enable communication between the ATP processor module 102 and the devices 110a, 110b.

In an embodiment, devices (such as the devices 110a, 110b) fall into one of two categories: non-intelligent (e.g., the device 110a) and intelligent (e.g., the device 110b). As used herein, an "intelligent" device is a fully programmable element that is not fixed at design time and typically runs an operating system, which in turn can implement various program instructions. For example, an intelligent device could support intelligent communications stack offloading message delivery from the ATP processor module 102 (e.g., via a satellite module or the like), perform machine learning on data captured from sensors on board the device, execute device-specific feature processing and/or device driver functions to offload the ATP processor module 102, and/or the like, including combinations and/or multiples thereof. In some examples, an intelligent device is able to perform message publishing to the external system bus 209 or even generate HTTP operations towards the ATP processor module 102.

In contrast, a "non-intelligent" device does not have a fully reprogrammable processor running an OS or some stack and instead relies on the ATP processor module 102 to perform tasks that an intelligent device would do. A non-intelligent device in one embodiment is a sensor module where the ATP processor module 102 is interfacing at the hardware level to pull data from the sensor. In this embodiment, the ATP processor module 102 publishes or generates a synchronous data push on behalf of the non-intelligent device (e.g., the device 110a). This notwithstanding, the non-intelligent device could still include a complex state-machine, FPGA, etc. to process fixed instructions and/or algorithms encoded in the state-machine. Examples include reading the sensor, averaging data or performing other data processing, real-time hardware management or processing, compressing/encrypting, and packetizing data so the ATP processor module 102 device driver does not have to perform or deal with these operations, and the like.

In the example of FIG. 2, the device 110a includes a device hardware interface 210 to interface with the ATP processor module 102 via the external system bus 209. The device 110a also includes device feature hardware 212, such as a sensor, an analog-to-digital converter, an image scanner, and/or the like, including combinations and/or multiples thereof. The device 110a is a non-intelligent device in that software is executed outside of the device feature hardware 212 or within the ATP processor module 102. In such cases, the data is communicated to the ATP processor module 102 via the external system bus 209 using synchronous and/or asynchronous communication as described in FIGS. 3A, 3B. For example, synchronous and/or asynchronous delivery schemes can be message-based and/or restful-based services over multiple connection types. Connection types can include TCP/IP, UDP/IP, HTTP over TCP/IP, Reliable UDP/IP (for example QUIC protocol over UDP), HTTP over QUIC/UDP/IP, as well as support for each of unicast, multicast, and broadcast domains over standard or proprietary transport and physical layer mediums. As shown in FIG. 3B, for example, the connection manager 311 provides information to the ATP interface controller 112 so the ATP interface controller 112 knows, for outbound communications, which connection type (e.g., synchronous or asynchronous) is ideal for a given window of messages. The window size (definable in terms of number of time-duration, packets, messages, or ATP interface controller 112 function calls) can be configured through either of user configuration 321 and/or system configuration 323, and/or dynamically by metrics processed by the AS network controller.

The device 110b includes a device hardware interface 210 to interface with the ATP processor module 102 via the external system bus 209. The device 110b also includes device feature hardware 216 (e.g., a sensor, an analog-to-digital converter, an image scanner, and/or the like, including combinations and/or multiples thereof), a device operating system 218, and device processor and program code 220. The device 110b is an intelligent device in that software can reside on the device 110b as shown by the device operating system 218 and the device processor and program code 220. The device operating system 218 executes the program code residing on the device processor and program code 220, which together provide for the device 110b (an intelligent device) to execute software code or instructions independent from the ATP processor module 102.

For either of the devices 110a, 110b, the device hardware interfaces 1240 provides low-level hardware control and data signals between the devices 110a, 110b and the ATP processor module 102. In some embodiments, the intelligent device (e.g., the device 110b) can offload processing from the ATP processor module 102 and/or perform other computational and analysis tasks such as preprocessing or transforming data, performing data analysis and analytics, managing the operation of a more complex device hardware either in parallel or in coordination with the ATP processor module 102 operation, and/or the like, including combinations and/or multiples thereof. In some embodiments, the intelligent device (e.g., the device 110b) and/or the ATP processor module 102 can provide communications and processing of data for orchestrating and coordination the operation and functionality of one or more other autonomous systems or devices.

Figure 3A:
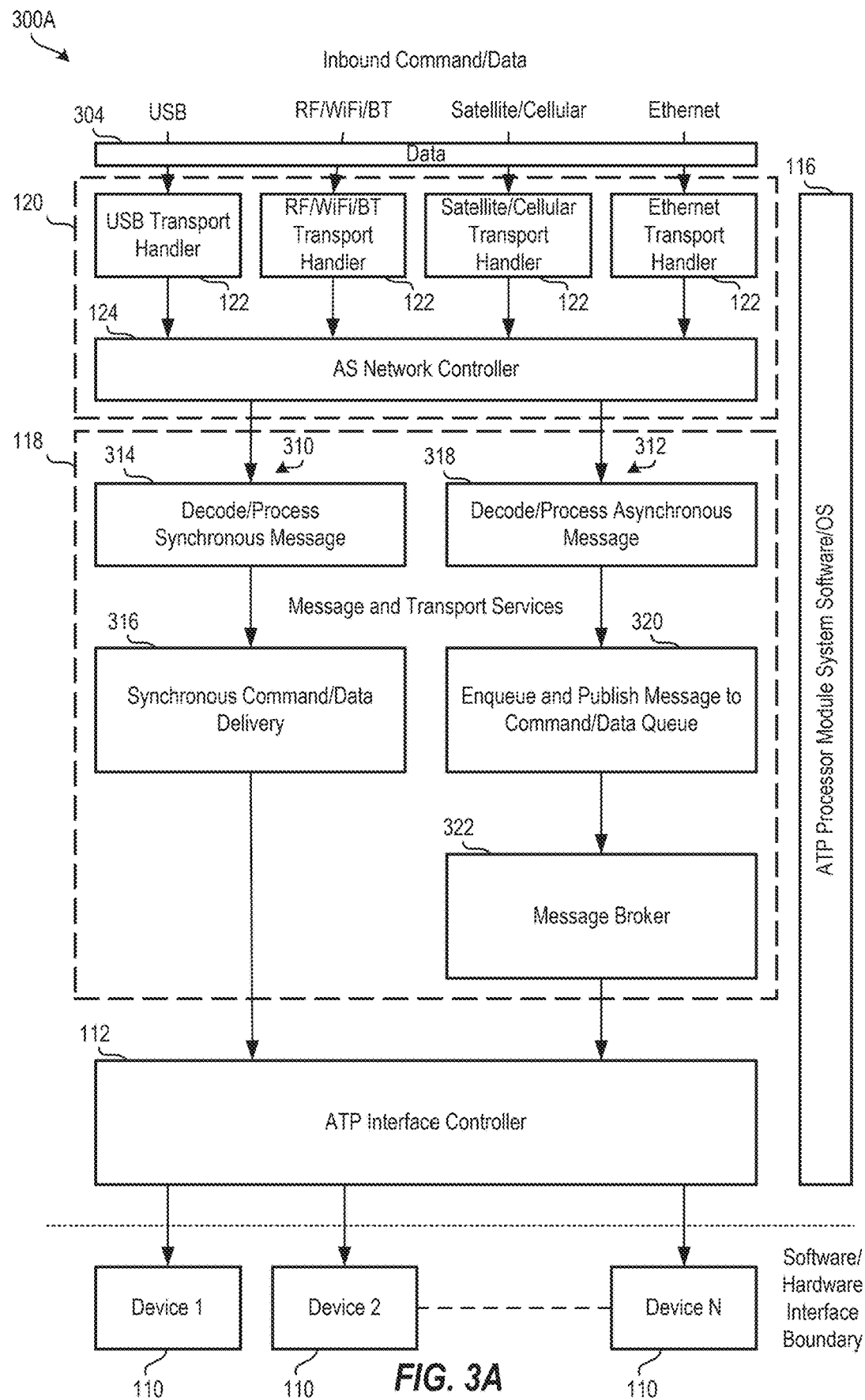
FIGS. 3A and 3B are schematic illustrations of communication schemes for incoming (inbound) command/data and outgoing (outbound) command/data that utilize dynamically controlled synchronous and/or asynchronous communication processing according to one or more embodiments described herein.
Figure 3B:
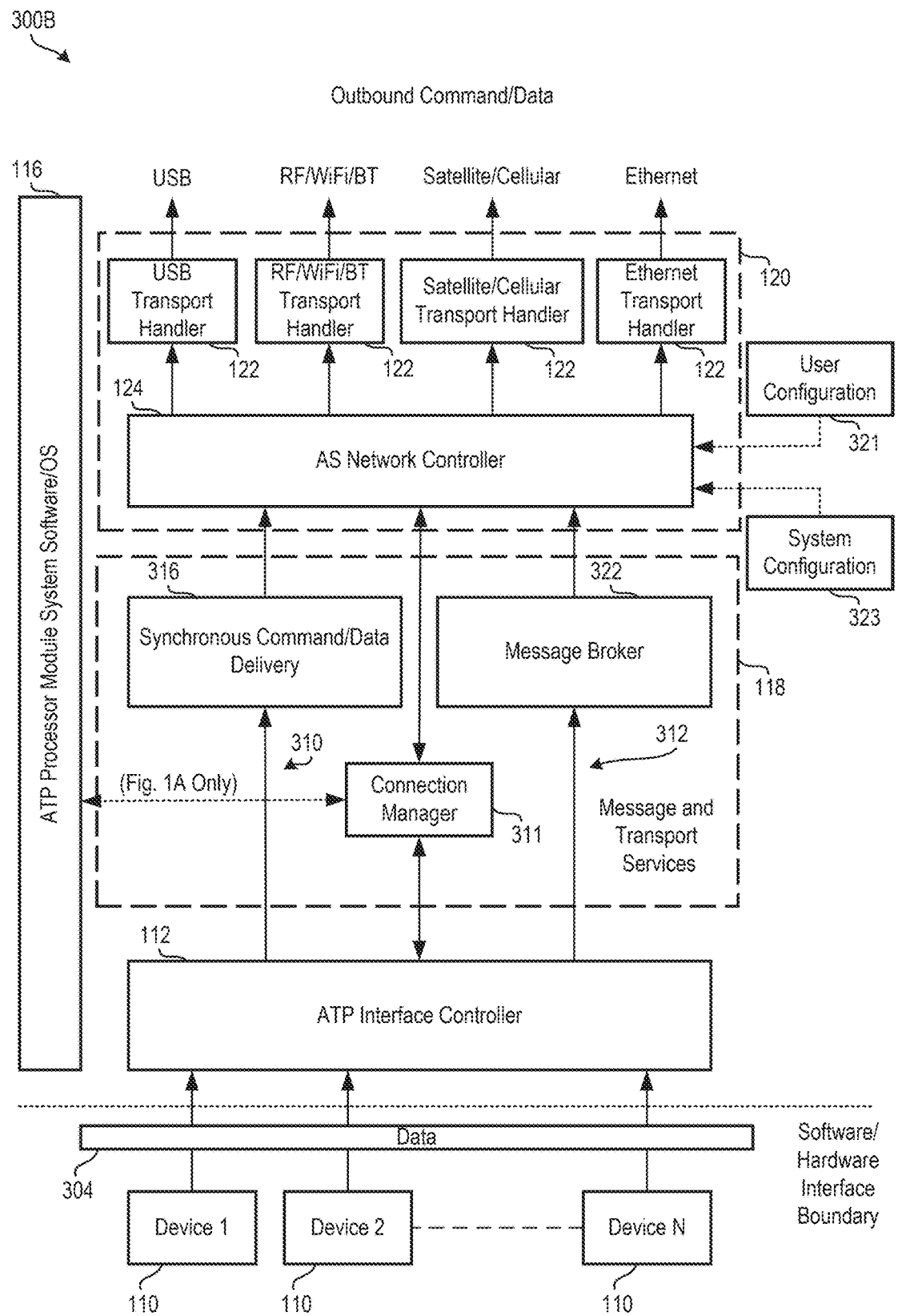

FIGS. 3A and 3B are schematic illustrations of communication schemes for incoming (inbound) command/data and outgoing (outbound) command/data that utilize dynamically controlled synchronous and/or asynchronous communication processing according to one or more embodiments described herein.

Particularly, FIG. 3A shows a communication scheme 300A for incoming (inbound) command/data. The communication scheme 300A sends data from an external source (e.g., an autonomous system, an ATP, an ATP portable network controller, or remote host) through the ATP processor module 102 to one or more devices 110. The communication scheme 300A can use a synchronous communication path 310 and/or an asynchronous communication path 312, which are now described in more detail.

The communication scheme 300A sends data 304 from an external source (e.g., an autonomous system) through the ATP processor module 102 and to one or more devices 110. The ATP processor module system software/OS 116 performs relevant portions of the scheme 300A. It should be appreciated that, in one or more embodiments, there could be a device (e.g., one of the devices 110) that implements a communication function that sends its data to, or receives data from, the ATP processor module 102 in a manner that is consistent with the architecture of FIGS. 3A, 3B. In the example of FIG. 3A, data 304 is received as described herein, such as from an autonomous system, a platform controller, an ATP portable network controller (see, e.g., FIG. 7J), and/or an external device, by the AS network services 120 (see, e.g., FIGS. 1B, 1C), which includes transport handlers 122 and the AS network controller 124. As described with reference to FIGS. 3A and 3B, the data 304 can be data in any form, including raw data, a command, a formatted message, etc. The data 304 can be received via any suitable communications protocol, such as USB, radio frequency, WiFi, Bluetooth (BT), satellite, cellular, ethernet, etc. The data are received by the transport handlers 122 depending on the type of communications protocol used (e.g., a USB transport handler handles data received by USB, etc.). The data 304 is then passed from the appropriate one of the transport handlers 122 to the AS network controller 124. The AS network controller 124 then routes the data to the devices via the message and transport services module 118 using a synchronous communication path 310 and/or an asynchronous communication path 312.

The synchronous communication path 310 begins at block 314, where the data 304 is decoded and processed as a synchronous message. The data 304 is then passed to block 316 where the synchronous message is delivered to the ATP interface controller 112. The data can then be processed and passed to one or more of the devices 110 as appropriate.

The asynchronous communication path 312 begins at block 318, where the data 304 is decoded and processed as an asynchronous message. The data 304 is then passed to block 320 where the asynchronous message is queued and published to a command/data queue. A message broker 322 then delivers the queued message to the appropriate one or more of the devices 110.

FIG. 3B shows a communication scheme 300B for outgoing (outbound) command/data. This communication scheme sends data from one or more devices 110 through the ATP processor module 102 to an external device (e.g., an autonomous system). The communication scheme 300B can use the synchronous communication path 310 and/or the asynchronous communication path 312 based on the decisioning logic of the connection manager 311 in conjunction with the ATP interface controller 112. As described above, as shown in FIG. 3B, for example, the connection manager 311 provides information to the ATP interface controller 112 so the ATP interface controller 112 knows, for outbound communications, which connection type (e.g., synchronous or asynchronous) is ideal for a given window of messages. With reference to FIG. 1A, the connection manager 311 queries the ATP processor module system software/OS 116 (as shown in FIG. 3B), which gathers metrics from the transport handlers 122 to provide the connection manager 311 with intelligence. With reference to FIGS. 1B and 1C, the connection manager 311 receives its "intelligence" from the AS network controller 124. Intelligence in this context means the results of AI or rules-based processing of the communications systems data as described herein (e.g., QoS, bandwidth, latency, etc.) and what the ideal connection types are for some window of time. In each of these cases, the connection manager 311 provides control signaling data to the ATP interface controller 112 so the ATP interface controller 112 knows whether the data to be sent outbound (see FIG. 3B) should be sent via the synchronous communication path 310 or the asynchronous communication path 312 or the asynchronous communication path 312. The communication scheme 300B generally flows opposite the communication scheme 300A, in that the data 304 is transferred by one or more of the devices 110 through the ATP processor module 102 (using the synchronous communication path 310 and/or the asynchronous communication path 312) and outbound to an external device, such as an autonomous system.

Particularly, one or more of the devices 110 transfers the data 304 to the ATP interface controller 112, which then transfers the data 304 using the synchronous communication path 310 and/or the asynchronous communication path 312 as shown. As described herein, the connection manager 311 decides whether to use the synchronous communication path 310 and/or the asynchronous communication path 312. According to one or more embodiments described herein, the data 304 is transferred inbound and outbound using the same communication scheme. For example, if the connection manager 311 decides what to do as the data 304 heads outbound (e.g., reroute over message bus, stay on HTTP, persist to local flash memory storage, schedule for later delivery, etc.), the data 304 is processed the same way when heading inbound. However, in some embodiments, different communication schemes can be used for the inbound and outbound data. Using the synchronous communication path 310, the data 304 is passed to block 316 where the synchronous message is delivered to the AS network controller 124, which performs scheduling, transport selection, and delivery management. Using the asynchronous communication path 312, the data 304 is passed to the message broker 322, which then transfers the data 304 to the AS network controller 124. As examples, the AS network controller 124 can perform its functions by the assembly of SDN control, transport rule engine management, quality of service (QoS)/rate processing units, and/or the like, including combinations and/or multiples thereof.

The AS network services 120 uses the transport handlers 122 to transmit the data from the AS network controller 124 to an external device (e.g., an autonomous system). The AS network controller 124 can utilize user configuration 321 and/or system configuration 323 to determine how to transfer the data. For example, the user configuration 321 and/or the system configuration 323 can specify which of the transport handlers 122 to use in various situations, what policies require implementation and/or enforcement, when to transfer the data 304, when to store the data 304 locally, etc.

According to one or more embodiments described herein, the AS network services 120 performs tag processing. In such examples, the AS network controller 124 functions as a tagging module (see e.g., VAN tagging engine 372 of FIG. 3E). In such cases, telemetry streams can be assigned and associated to a "virtual autonomous network" identifier (VAN ID #) to support virtual or logical networks each with a QoS that is tied to the telemetry modules, devices, and/or the data entity characteristics across one or more autonomous systems or devices whose networks are either flat or complex topologies, and/or heterogeneous in nature (e.g., 5G, WiFi, satellite, etc.). This provides for prioritizing the traffic in an end-to-end manner and across multiple autonomous systems or devices for a given telemetry stream. In one or more embodiments, the tagging module can be incorporated the AS network controller 124 to provide for realization of device or mesh networks that are more intelligent.

Figure 3C:
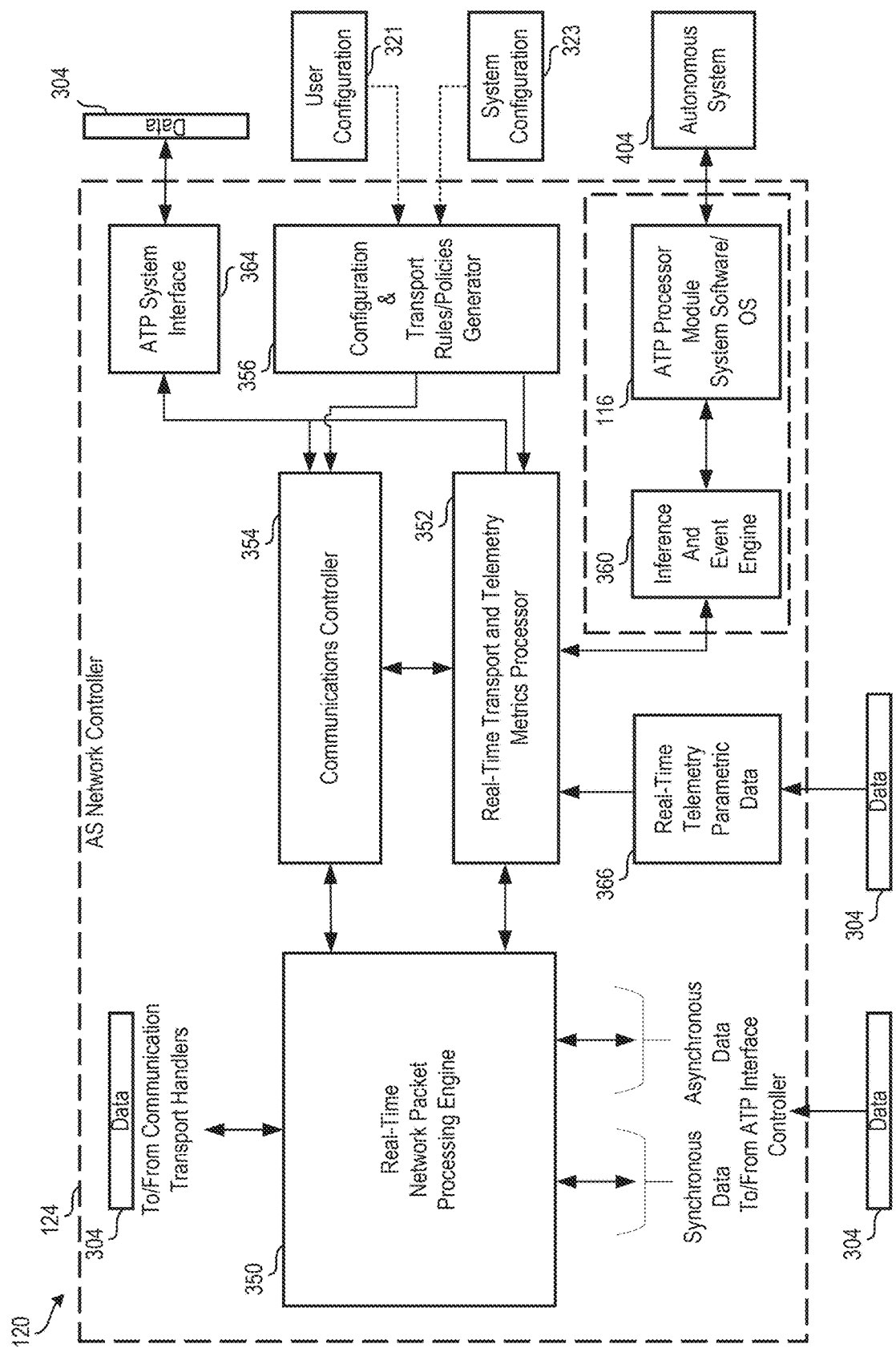
FIG. 3C is a block diagram of a an autonomous system network controller according to one or more embodiments described herein.

FIG. 3C is a block diagram of the AS network controller 124 of the autonomous system network services 120 according to one or more embodiments described herein. The AS network controller 124 is able to react to what is occurring within a network layer and external devices (e.g., the devices 110). For example, where radiation or energy field levels are detected to be rising, a communication path becomes noisier. In this case, the AS network controller 124 can cause the autonomous system 404 (see, e.g., FIGS. 4A, 4B, 4F) to take an action such as stop/back out because of increasing radiation or energy levels or switch from WiFi to radio frequency, for example, because the autonomous system is about to lose WiFi connectivity due to being out of range.

In this example, data 304 is transferred from and received by a real-time network packet processing engine 350 whose message streams operate either synchronously and/or asynchronously, as described with reference to FIGS. 3A, 3B. For example, the data 304 is sent to and/or received from transport handlers 122. Similarly, the data 304 is sent to and/or received from the ATP interface controller 112.

The real-time network packet processing engine 350 is communicatively coupled to a real-time transport and telemetry metrics processor 352 and a communications controller 354. The real-time transport and telemetry metrics processor 352 analyzes real-time telemetry parametric data 366 associated with the data 304. The real-time telemetry parametric data 366 includes telemetry data/information collected by one or more of the devices 110. Telemetry data/information can include quality-of-service information, signal level information, etc. For example, the real-time telemetry parametric data 366 can be hardware driven, for example, a frequency of measurements from a sensor that is fixed as part of the device configuration profile or a fixed set of image data sizes from a camera. The real-time telemetry parametric data 366 can be statically defined as part of defining the resources for a given device or dynamically defined and change in real-time over time. For example, camera resolution can change or the frequency of measurements can increase or decrease based on environment conditions. As another example, size of data samples can change over time depending on the configuration of devices utilized and/or their respective configurations. In the case where the ATP processor module 102 and/or devices 110 are part of a mesh network, the real-time transport and telemetry metrics processor 352 may see data from other processor modules and/or platforms in cases where it is potentially routing messages. In this case, the real-time telemetry parametric data 366 are a stream of data messages that may have dynamic characteristics and behavior.

The real-time transport and telemetry metrics processor 352 and the communications controller 354 make decisions based on various inputs, such as the real-time telemetry parametric data 366, rules/policies generated by a configuration and transport rules/policy generator 356, data 304 received by an ATP system interface 364, and information received from the autonomous system via an inference and event engine 360 and the ATP processor module system software/OS 116. According to one or more embodiments described herein, the inference and event engine 336, based on real-time metrics, generates events to the autonomous system 404, other ATPs, a remote host, portable network controller subsystems as described herein, and/or the like, including combinations and/or multiples thereof.

The configuration and transport rules/policy generator 356 establishes rules and/or policies that define how the communications controller 354 is to orchestrate the processing of data messages by the real-time network packet processing engine 350 depending on different conditions. For example, where quality of service metrics indicate a reduction in one communication protocol (e.g., WiFi), the rules may dictate that the real-time network packet processing engine 350 should change to a different communication protocol (e.g., radio frequency). The configuration and transport rules/policy generator 356 establishes the rules and/or policies based on user configuration 321 and/or system configuration 323. Using the user configuration 321 information and/or system configuration 323 information as well as transport rules defined by the configuration and transport rules/policy generator 356 as well as the real-time telemetry parametric data 366, the real-time transport and telemetry metrics processor 352, in conjunction with the communications controller 354, orchestrates low-level communications processing by the real-time network packet processing engine 350 accordingly. That is, in examples, the communications controller 354 can provide scheduling and selection of transports to optimize delivery and satisfaction of user-defined communication metrics provided by the user configuration 321 information. In an embodiment, input configurations are processed and a static/deterministic set of rule processing is utilized by the communications controller 354 to decide how to utilize communication resources. This scheme shown in FIG. 3C is dynamic in that different actions can happen at different times, but the actions are predefined based on a if-then-else set of transport rules generated by the configuration and transport rules/policy generator 356. In an embodiment, the communications controller 354 in conjunction with the real-time transport and telemetry metrics processor 352 provide control signaling to the connection manager 311 in order to orchestrate the optimal connection protocols (such as synchronous or asynchronous message delivery) during outbound communications (see, e.g., FIG. 3B). For example, the connection manager 311 of the message and transport services module 118 provides steering logic to the ATP interface controller 112 so the ATP interface controller 112 can control how to send messages (e.g., synchronously over HTTP, asynchronously (message based (utilizing MQTT as example also known as MQ Telemetry Transport a light-weight messaging protocol based on the publish/subscribe machine-to-machine communications pattern)), and/or the like, including combinations and/or multiples thereof).

The configuration and transport rules/policy generator 356 can develop an intelligent strategy (for managing the communications resources and network tasks) that adapts over time based on the real-time transport and telemetry metrics processor 352 and the communications controller 354 constantly making decisions (based on rules or learning algorithms) on how to manage the message delivery needs versus available and state of the communications resources. For example, it can generate and deliver the optimal connection protocol behavior to the message and transport services module 118 defining when to use asynchronous or synchronous communication as described herein. For example, when there are multiple communications and parametrics, such as bandwidth, latency, QoS, constraints, and other cost functions imposed by the system and telemetry sources, etc., the communications controller 354 considers each of these conditions when determining how to configure or reconfigure in real-time the real-time network packet processing engine 350 for best use of available communication resources. The decision can be made separately for each packet, destination, for a particular device, for a particular session/connection, and/or the like. The communications controller 354 directs the real-time network packet processing engine 350 accordingly. This approach is particularly useful when dealing with a distributed architecture (e.g., mesh networks, swarms of remote systems such as UAVs, etc.).

Figure 3D:
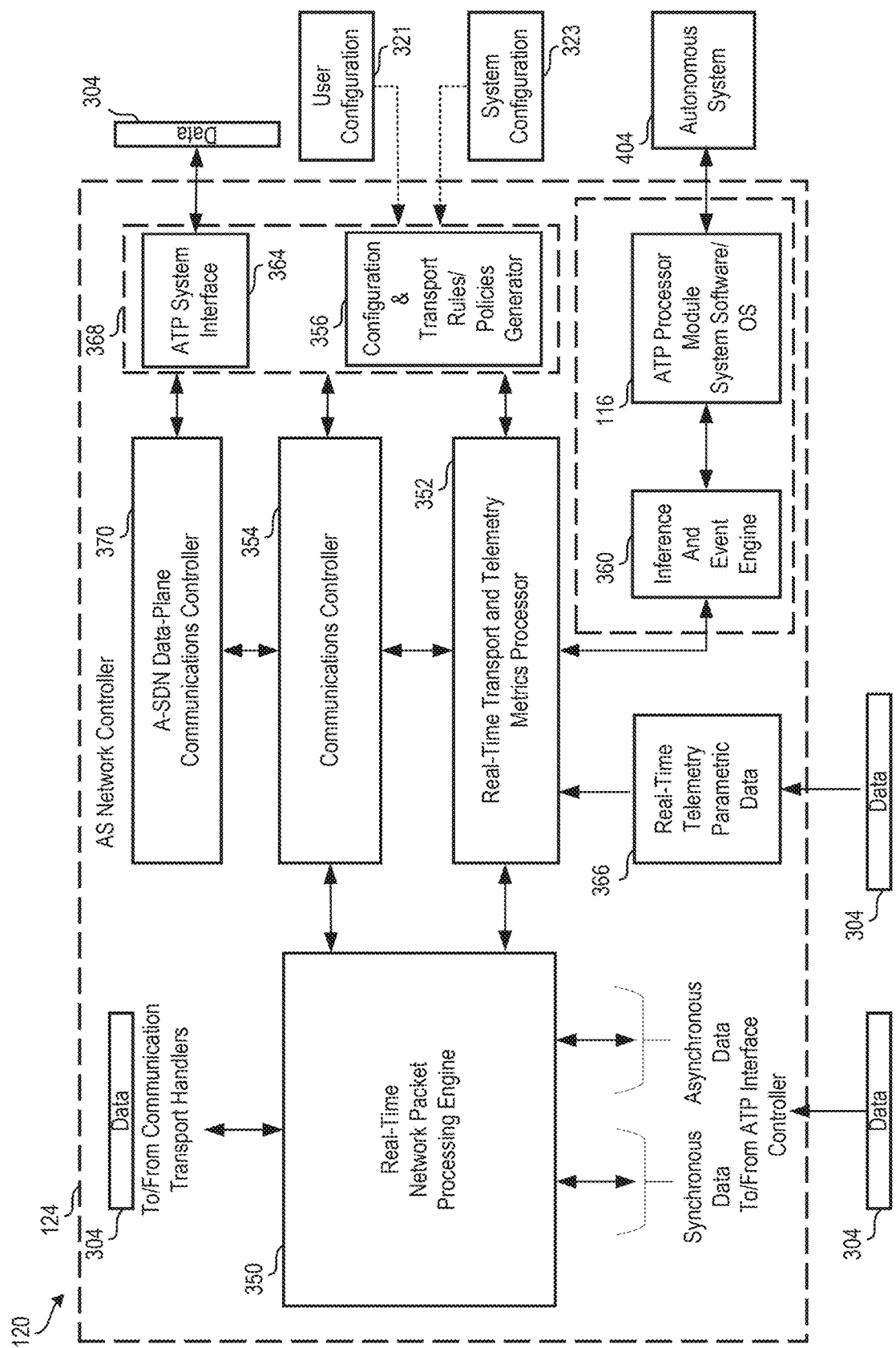
FIG. 3D is a block diagram of an autonomous system network controller according to one or more embodiments described herein.

FIG. 3D is a block diagram of the autonomous system network controller 124 according to one or more embodiments described herein. In this example, the AS network controller 124 includes the components of the AS network controller 124 but also supports an autonomous software defined network (A-SDN) using an A-SDN data-plane communications controller 370. The box 368 is used to show that each of the ATP system interface 364 and the configuration and transport rules/policy generator 356 are in communication with the real-time transport and telemetry metrics processor 352, the communications controller 354, and the A-SDN data-plane communications controller 370. The A-SDN data-plane communications controller 370 manages, at a data-plane level, communications within an A-SDN as described further herein.

The A-SDN data-plate communications controller 370 reacts to command/control messages received from an A-SDN control-plane communications controller 755 (see, e.g., FIG. 7J) and to inject these into the communications controller 354. Based thereon, the communications controller 354 can arbitrate these command/control messages (e.g., instructions) against local policies/rules defined by the configuration and transport rules/policy generator 356 and metrics from the real-time transport and telemetry metrics processor 352. In some examples, some of the optimization processing performed by the communications controller 354 can be handled by machine learning and/or other statistical learning techniques as described herein. In conjunction with the instructions received by the A-SDN data-plane communications controller 370 and sent to the communications controller 354, the communications controller 354 can control and orchestrate the operation of the real-time network packet processing engine 350. For example, the communications controller 354 can select the optimal communications transport based on a combination of local metrics from the real-time transport and telemetry metrics processor 352, and operations from the A-SDN data-plane communications controller 370 as a function of the global topological or environmental conditions processed and delivered by the A-SDN control-plane communications controller 755 (see, e.g., FIG. 7J).

Figure 3E:
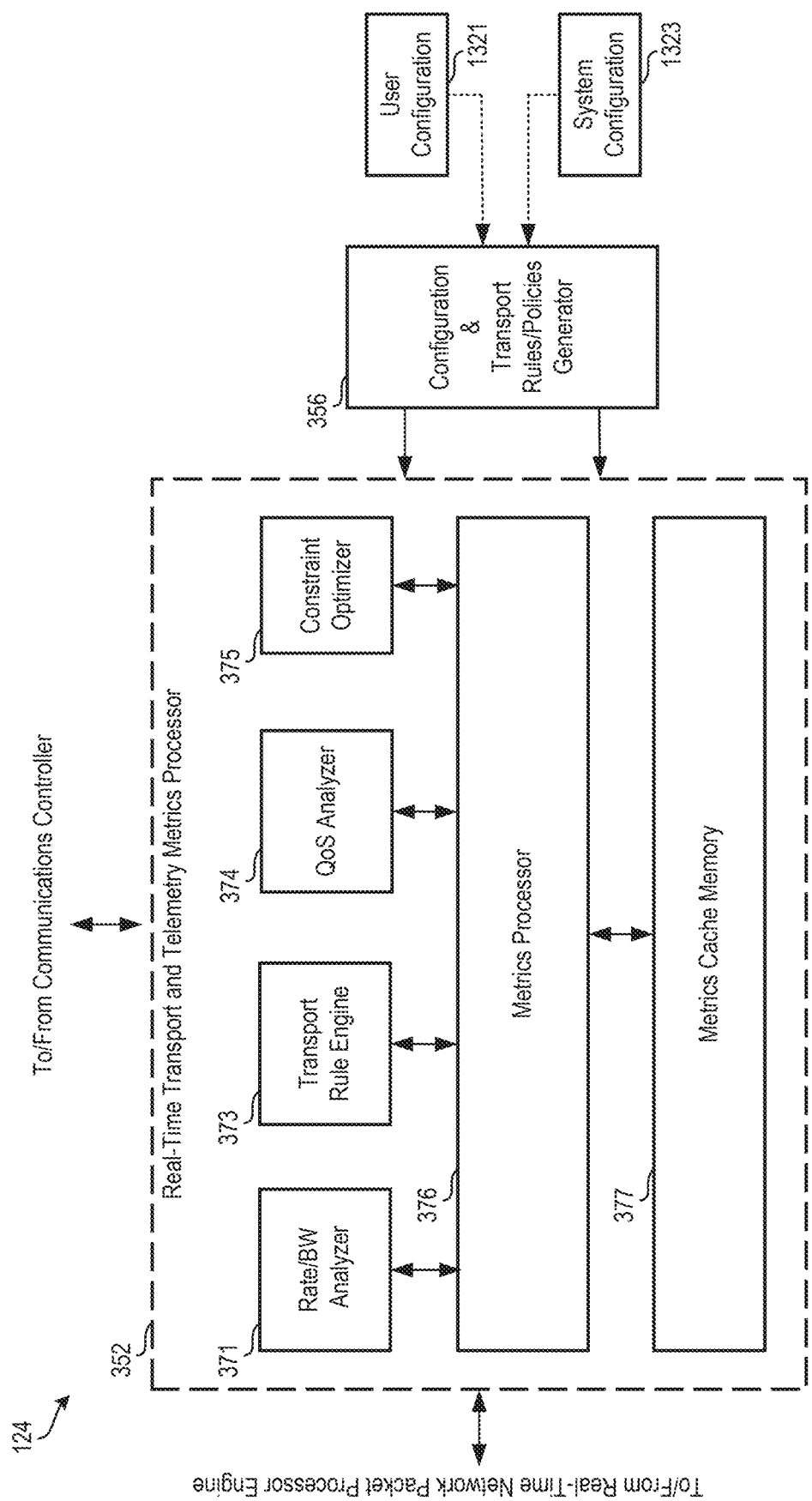
FIG. 3E is a block diagram of a real-time transport and telemetry metrics processor of the autonomous system network controller of FIGS. 3C and 3D according to one or more embodiments described herein.

FIG. 3E is a block diagram of the real-time transport and telemetry metrics processor 352 of the autonomous system network controller 124 of FIGS. 3C and 3D according to one or more embodiments described herein. In this example, the real-time transport and telemetry metrics processor 352 communicatively couples to the communications controller 354 and the real-time network packet processing engine 350 as shown (see also FIG. 3D). The real-time transport and telemetry metrics processor 352 also receives data/information from the configuration and transport rules/policy generator 356 as shown.

The real-time transport and telemetry metrics processor 352 includes various analyzers, engines, and optimizers to generate metrics about communications. For example, the real-time transport and telemetry metrics processor 352 includes a rate/bandwidth (BW) analyzer 371, a transport rule engine 373, a quality of service (QoS) analyzer 374, and a constraint optimizer 375. The rate/BW analyzer 371 generates rate/bandwidth information indicative of the rate/bandwidth of various communications channels/protocols/schemes. The transport rule engine 373 defines transport rules (e.g., if-then-else statements) that are implemented to facilitate data transport. The QoS analyzer 374 generates QoS information indicative of the quality of service of various communications channels/protocols/schemes. The constraint optimizer 375 determines how to best schedule message streams delivery requirements across available communications resources to optimize resource utilization to maximize bandwidth and/or minimize latency given a set of constraints (e.g., bit-rate errors, latency measurements, signal quality, and/or the like, including combinations and/or multiples thereof). The decision can be made separately for each packet, message stream, ATP, for a particular device, for a particular session/connection, and/or the like.

The real-time transport and telemetry metrics processor 352 also includes a metrics processor 376 to process the metrics generated by the rate/BW analyzer 371, the transport rule engine 373, the QoS analyzer 374, and the constraint optimizer 375. The time transport and telemetry metrics processor 352 also includes a metrics cache memory 377 to store the metrics generated by the rate/BW analyzer 371, the transport rule engine 373, the QoS analyzer 374, and the constraint optimizer 375.

Communication resource status includes multiple metrics (that may be computed, measured, and/or otherwise learned utilizing machine learning algorithms) by communications method, such as communications link status, average bandwidth, response time, latency, congestion, reliability, signal strength, and other cost/metrics-based functions or other quality-of-service (QoS) parameters associated to a given communications service. The transport rule engine, as described herein, also establishes scheduling events and delivery prioritization associated to a message flow. For example, high-priority messages are routed to a synchronous delivery method; however, if this resource is unavailable, the transport rule engine determines whether the message flow should be queued for asynchronous delivery. In one further example embodiment, the transport rule engine determines whether message-data should be persisted locally in order to prevent loss of data in the case of communications systems unavailability. The data transmission/reception performed by the message and transport services module 118 can be synchronous or asynchronous communications as described herein (see, e.g., FIGS. 3A, 3B). The processing algorithms executed by the message and transport services module 118 are driven by user and/or system level configuration information (see, for example, FIGS. 3B, 3D). User configuration information (e.g., user configuration 321) includes labeling each device telemetry flow to a desired set of attributes that define the communications pattern, transport, and scheduling configuration. The system configuration information (e.g., system configuration 323) defines global parameters as well as default processing rules in the event the user configurations are unrealizable or non-optimal given the current state of the ATP communication resources.

Figure 3F:
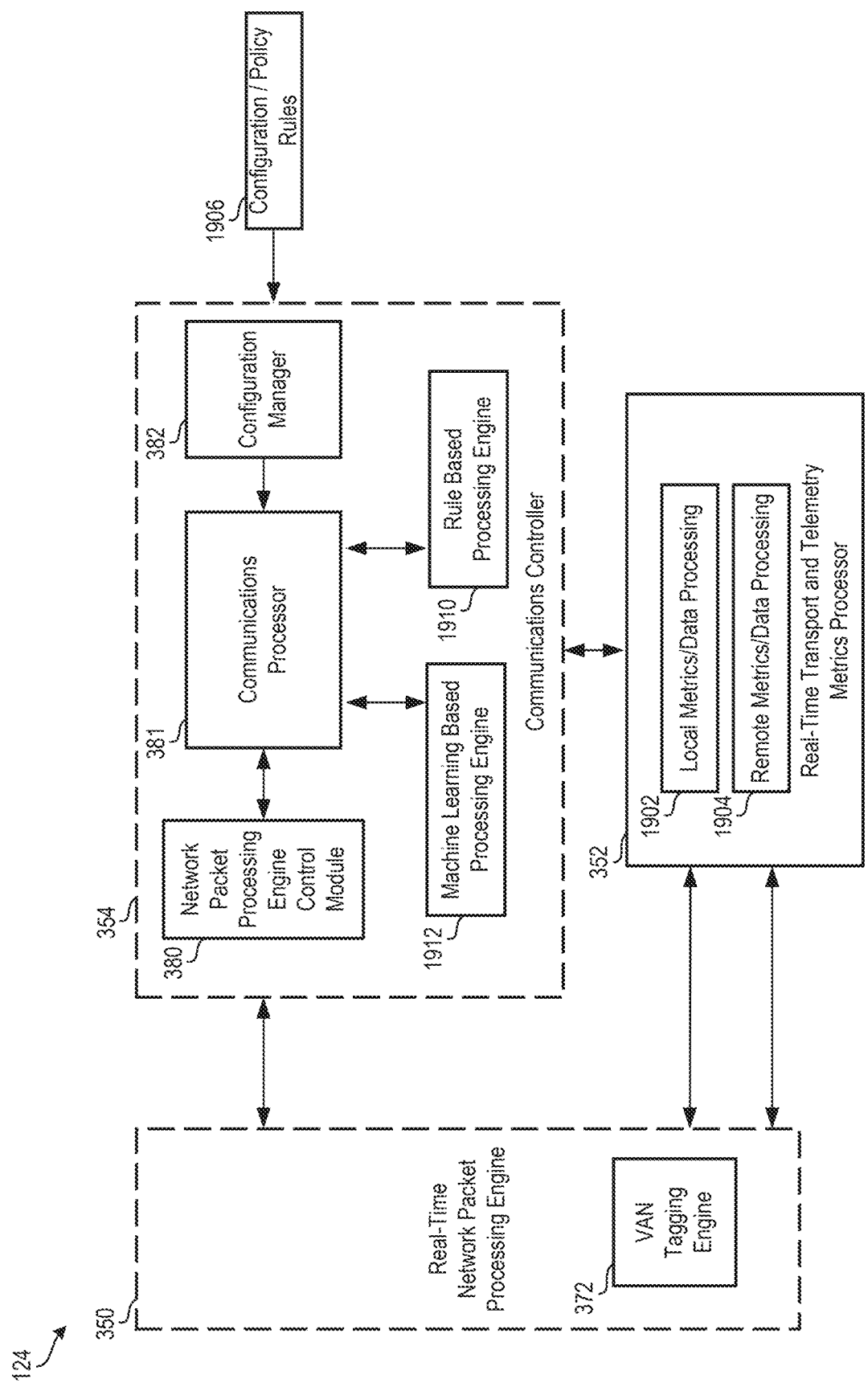
FIGS. 3F and 3G are block diagrams of a communications controller of the autonomous system network controller of FIGS. 3C and 3E.
Figure 3G:
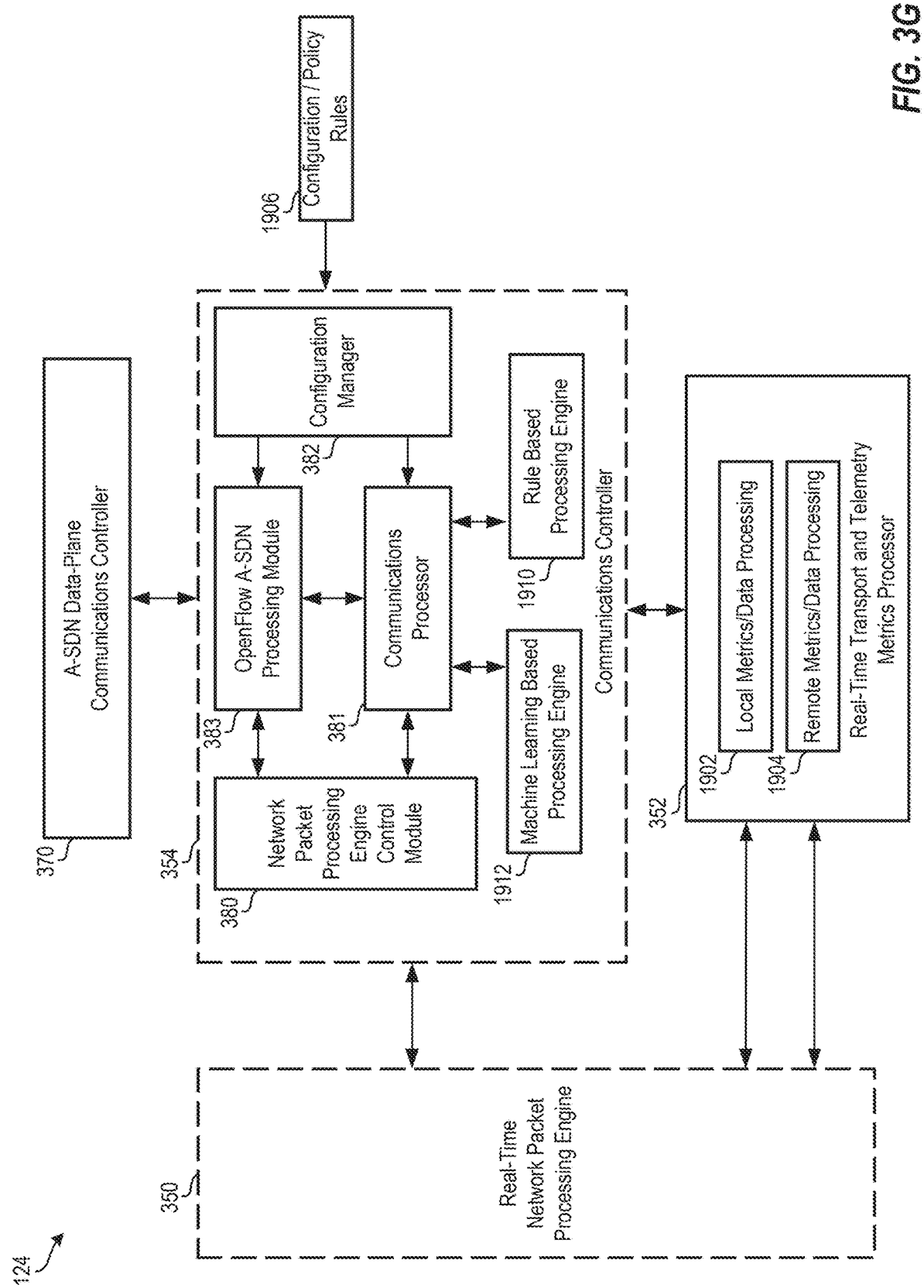

FIGS. 3F and 3G are block diagrams of the communications controller 354 of the autonomous system network controller 124 of FIGS. 3C and 3D. In these examples, the communications controller 354 communicatively couples to the real-time network packet processing engine 350 and the real-time transport and telemetry metrics processor 352 as shown (see also FIG. 3D).

In these examples, the real-time transport and telemetry metrics processor 352 includes local metrics/data processing 1902 and remote metrics/data processing 1904 for processing local metrics 786 (see FIG. 7P) and remote metrics 788 (see FIG. 7P) respectively.

In each of the examples of FIGS. 3F and 3G, the communications controller 354 includes a network packet processing engine control module 380, a communications processor 381, a configuration manager 382, a machine learning based processing engine 1912, and a rule based processing engine 1910. The network packet processing engine control module 380 examines/evaluates/manipulates network packets and executes the forwarding of layer 0 and/or layer 1 network frames among communication interfaces based on control signaling operations from the communications controller 354. Concurrently, the real-time network packet processing engine 350 maintains a set of metric counters for measuring communication network metrics as described herein. According to one or more embodiments described herein, the real-time network packet processing engine 350 provides for port forwarding and routing, policy/rules implementation/enforcement, VAN tagging by packet manipulation, downstream routing/caching for synchronous versus asynchronous data, and deep packet inspection (DPI)/extraction/computation of metrics used by the real-time transport telemetric metrics processor 352.

The configuration manager 382 receives configuration/policy rules 1906 (e.g., the user configuration 321, the system configuration 323, etc.). The engines 1910, 1912 process data and determine how to manage communications. For example, the engines 1910, 1912 can use the local metrics/data processing 1902, the remote metrics/data processing 1904, and/or the configuration/policy rules 1906 to determine how to route data for given measurements (e.g., bandwidth measurements, latency measurements, signal strength measurements, device measurements, and/or the like, including combinations and/or multiples thereof as described in FIGS. 10A-10C). That is, the engines 1910, 1912 provide a framework to make intelligent decisions on next-state behavior for local and/or remote communication resources targets. The communications processor 381 evaluates information provided by the engines 1910, 1912 on how to manage network resources within the network packet processing engine control module 380.

As shown in the example of FIG. 3F, the real-time network packet processing engine 350 can include a VAN tagging engine 372. However, in other examples, the VAN tagging engine 372 can instead be implemented by the communications controller 354. The VAN tagging engine 372 assigns a "virtual autonomous network" (VAN) identifier (VAN ID #) to support virtual or logical networks, each with a QoS that is tied to the telemetry modules, devices, and/or the data entry characteristics across one or more autonomous systems or devices whose networks are either flat or have complex topologies, and/or heterogeneous in nature (e.g., 5G, WiFi, satellite, and/or the like, including combinations and/or multiples thereof). This provides for prioritizing the traffic in an end-to-end manner and across multiple autonomous devices and/or ATPs for a given telemetry stream. The rules/policies defined by the configuration and transport rules/policy generator 356 tells the communication controller 354 how to coordinate the tagging of network packets within the real-time network packet processor engine 350.

In the example of FIG. 3G, the communications controller 354 supports A-SDN implementations. For example, the communications controller 354 can also include an Open-Flow A-SDN processing module 383 communicatively coupled to the A-SDN data-plane communications controller 370. According to one or more embodiments described herein, the communications controller 354 can act alone and/or in parallel to processing A-SDN data-plane instructions by the OpenFlow A-SDN processing module 383. This is described further herein regarding how to operate with or without A-SDN functionality.

Figure 3H:
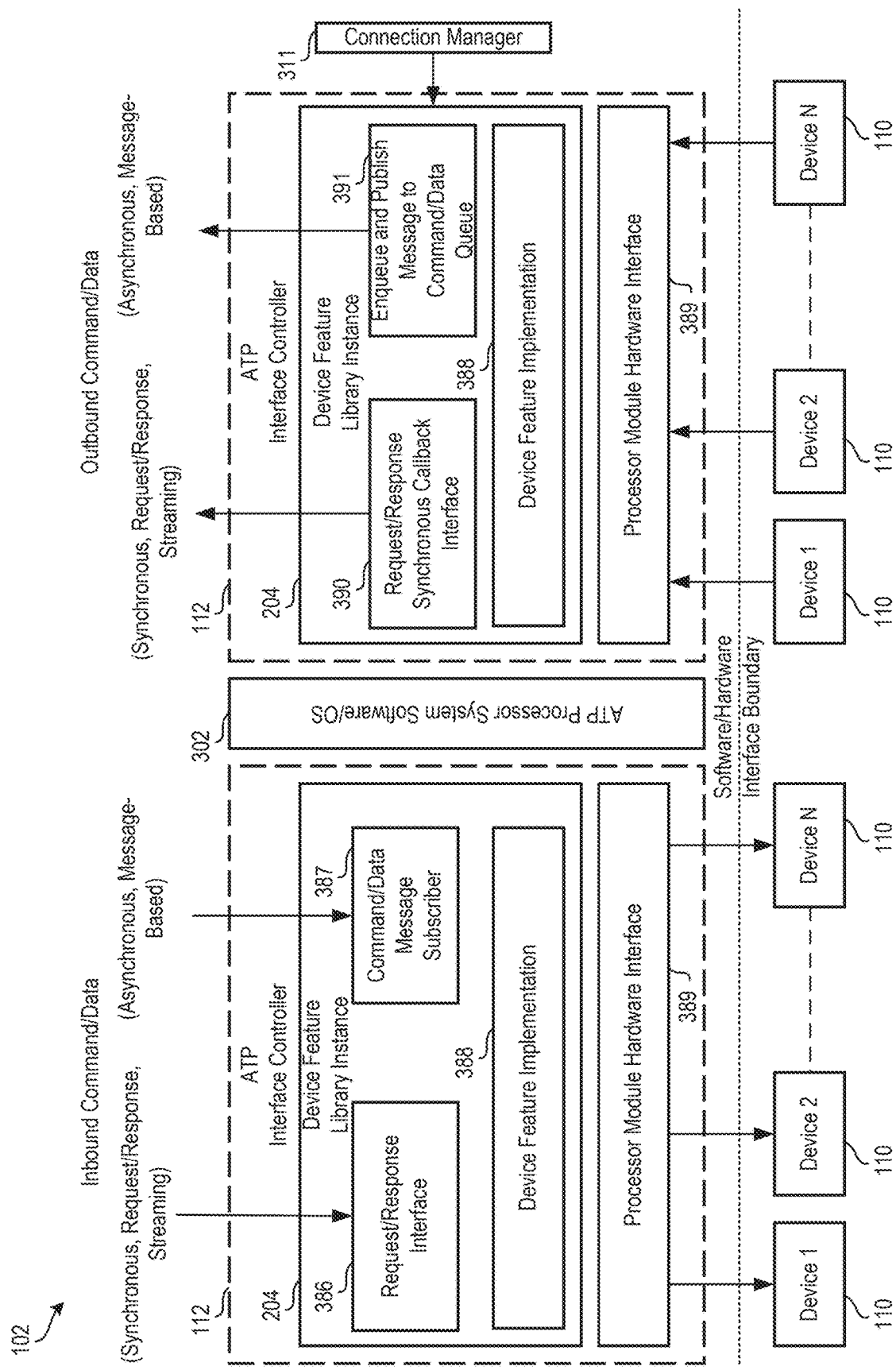
FIG. 3H is a block diagram of an ATP interface controller of the ATP processor module of FIG. 2 according to one or more embodiments described herein.

FIG. 3H is a block diagram of the ATP interface controller 112 of the ATP processor module 102 of FIG. 2 according to one or more embodiments described herein. This example shows the handling of incoming (inbound) command/data and outgoing (outbound) command/data according to one or more embodiments described herein.

For synchronous inbound command/data (which may be request/response-based or streaming-based), the command/data is received at a request/response interface 386 of a device feature library instance 204 (e.g., an instance of one or more of the device feature libraries 204a-204n) of the ATP interface controller 112. For asynchronous inbound command/data (which may be message-based), the command/data is received at a command/data message subscriber 387. Once the command/data is received at blocks 1340 or 1342 depending on whether the communication is synchronous or asynchronous, a device feature implementation unit 388 implements the command/data using information about the device 110 stored in the device feature library instance 204. The processor module hardware interface 389 provides the hardware and driver-level interfaces to enable communication between the ATP processor module 102 and one or more of the devices 110.

Outbound communication is similar as shown. However, in the case of the outbound communication, the connection manager 311 is implemented. For outbound communication, the a device 110 sends command/data through the processor module hardware interface 389, which uses the device feature library instance 204 to transmit the command/data out as shown. The connection manager 311 informs the device feature library instance 204 of the ATP interface controller 112 whether to use synchronous or asynchronous messaging as described herein (see, e.g., FIG. 3B). For synchronous outbound command/data, a request/response synchronous callback interface 390 is used. For asynchronous outbound command/data, the command/data are queued and published to a command/data queue at block 391. In either case, the data is then output through the ATP interface controller 112 as shown.

To summarize, inbound communications and associated connection type is based on the source of network messages. Outbound messages begin from the ATP interface controller 112, where connection type is determined by the connection manager 311 based on metrics gathered (as described herein), and messages first flow to the message and transport services module 118, then out towards the network modules depending on the implementation of the ATP processor module 102 used (see, e.g., FIGS. 1A-1C)

FIGS. 4A-4F are schematic illustrations of examples of implementations of the autonomous telemetry platform (ATP) 100 according to embodiments described herein. As described herein, the ATP 100 collects, processes, and manages data for one or more aspects of an autonomous system. For example, an ATP is used to acquire, process data, and manage data flows and communications within an autonomous system and/or between/among multiple autonomous systems, and/or between/among multiple ATPs.

Figure 4E:
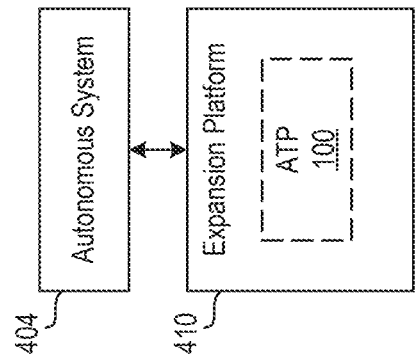
FIGS. 4A-4F are schematic illustrations of examples of implementations of an autonomous telemetry platform (ATP) according to embodiments described herein.
Figure 4F:
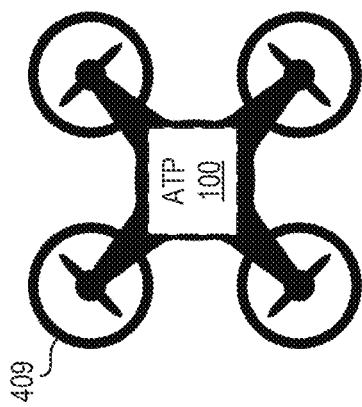
Figure 4C:
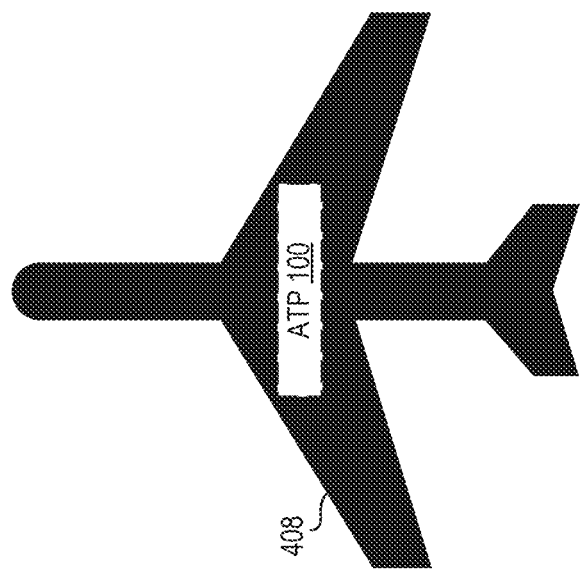
Figure 4D:
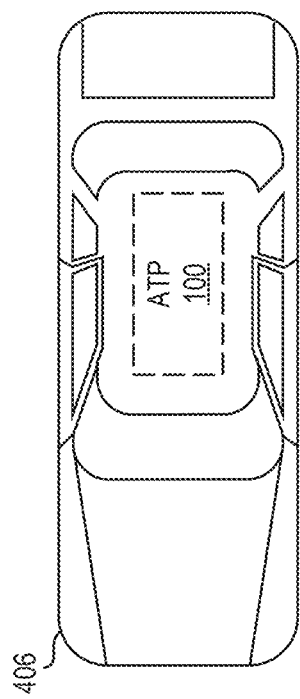
Figure 4A:
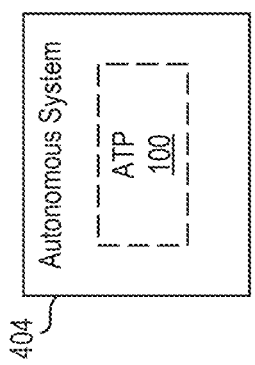
Figure 4B:
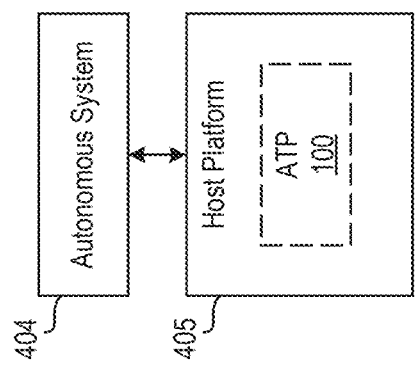

The example of FIG. 4A shows an internal implementation of the ATP 100 being integrated or embedded into an autonomous system 404 or other similarly suitable device. The example of FIG. 4B shows an external implementation of the ATP 100 being integrated into a host platform 405, which is in communication with the autonomous system 404 or other similarly suitable device. The host platform 405 can be any platform in which an ATP is embedded separate from the autonomous system or device. The example of FIG. 4C shows an implementation of the ATP 100 being coupled to a vehicle 406. The example of FIG. 4D shows an implementation of the ATP 100 being coupled to an aircraft 408. The example of FIG. 4E shows an implementation of the ATP 100 being coupled to a UAV 409. The example of FIG. 4F shows an implementation of the ATP 100 being integrated into an expansion platform 410 where one or more sensors are controlled and data is processed by an instance of ATP 100 prior to delivery to the autonomous system 400 or other similarly suitable device. It should be appreciated that the examples of FIGS. 4A-4F are provided for illustrative purposes and are not intended to limit the claims. Other examples are also possible.

Figure 5A:
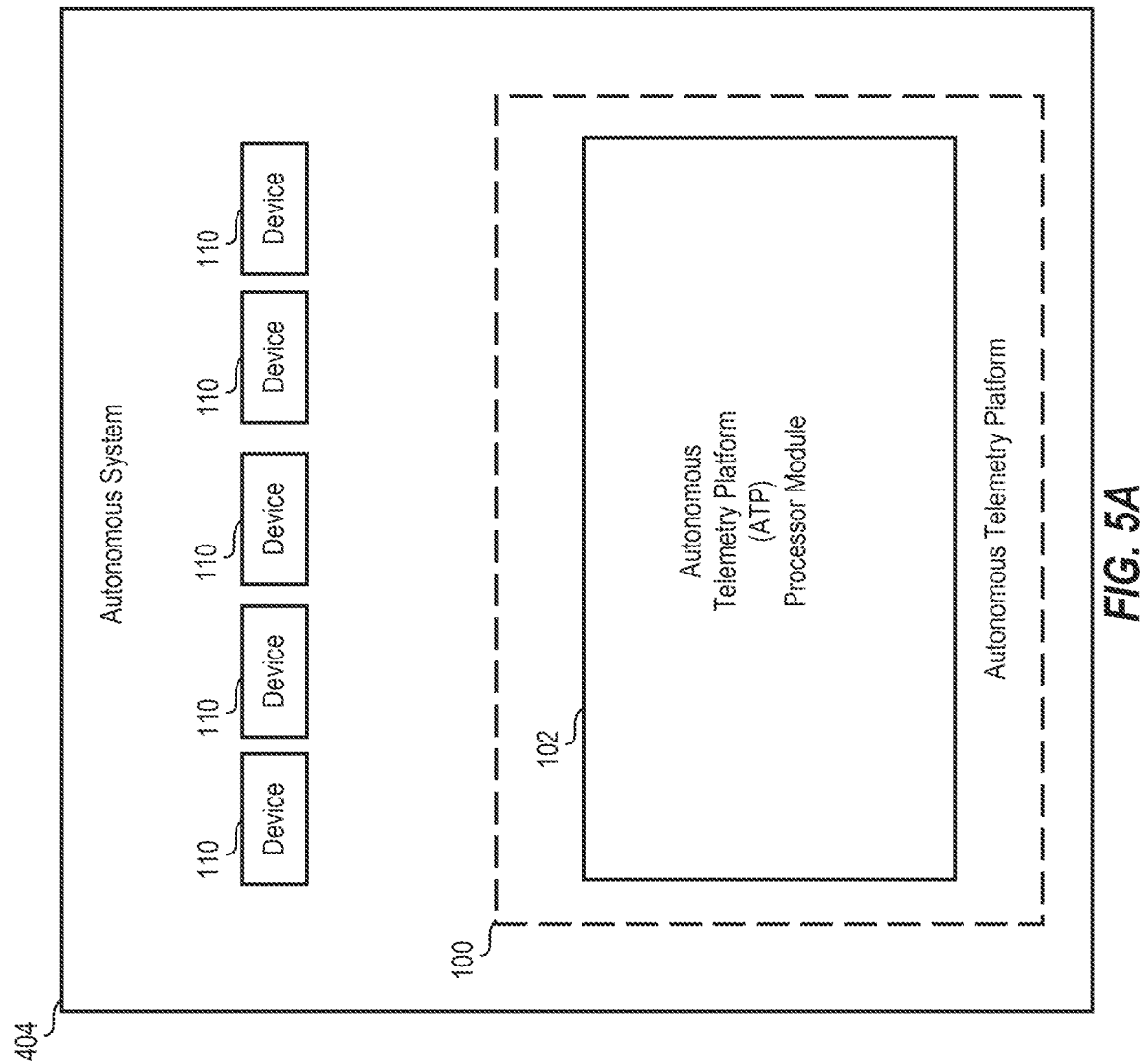
FIG. 5A is a schematic illustration of the ATP of FIG. 4A according to one or more embodiments described herein.

FIG. 5A is a schematic illustration of the ATP 100 of FIG. 4A according to one or more embodiments described herein. In this example, the ATP 100 is integrated or embedded in an autonomous system 404 (see, e.g., FIG. 4A). The ATP 100 includes the ATP processor module 102, which can be configured in accordance with one or more embodiments described herein (see, e.g., FIGS. 1A-1C) and can use the communications subsystem implementation shown in FIGS. 3C and 3D. The autonomous system 404 also includes devices 110, which may be equipped with one or more sensors for collecting data. As an example, the devices 110 can include intelligent devices and/or non-intelligent devices as described herein. Although five devices 110 are shown, other numbers (e.g., more or less) of devices 110 can be implemented in other examples.

Figure 5B:
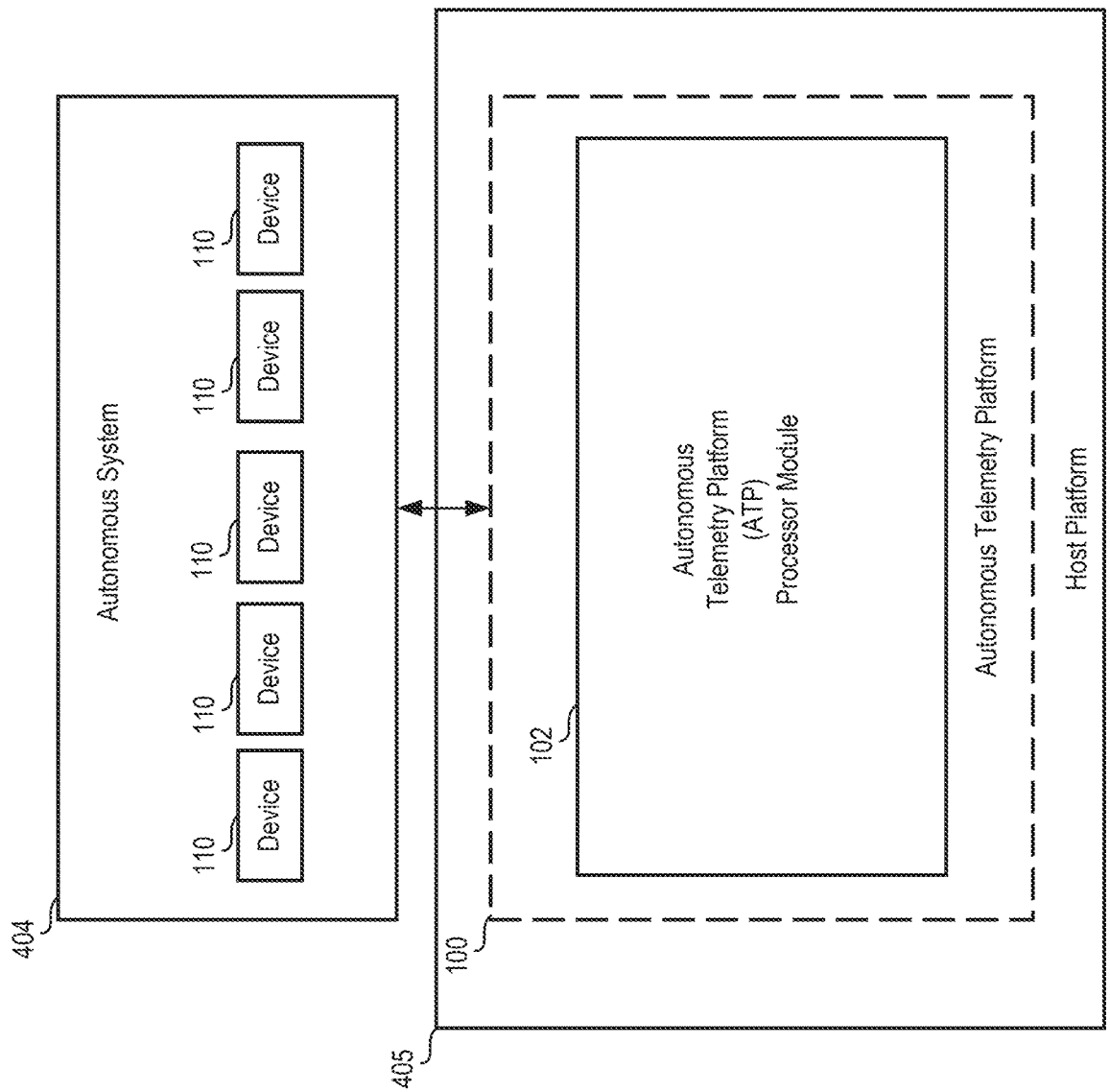
FIG. 5B is a schematic illustration of the ATP of FIG. 4B according to one or more embodiments described herein.

FIG. 5B is a schematic illustration of the ATP 100 of FIG. 4B according to one or more embodiments described herein. In this example, the ATP 100 is integrated or embedded in a host platform 405 (see, e.g., FIG. 4B). The ATP 100 includes the ATP processor module 102, which can be configured in accordance with one or more embodiments described herein (see, e.g., FIGS. 1A-1C) and can use the communications subsystem implementation shown in FIGS. 3C and 3D. The host platform 405 is in communication (e.g., USB, cellular, Bluetooth, radio frequency, satellite, etc.) as described with the autonomous system 404 as shown. The autonomous system 404 includes devices 110, which may be equipped with one or more sensors for collecting data. As an example, the devices 110 can include intelligent devices and/or non-intelligent devices as described herein. Although five devices 110 are shown, other numbers (e.g., more or less) of devices 110 can be implemented in other examples.

Figure 6A:
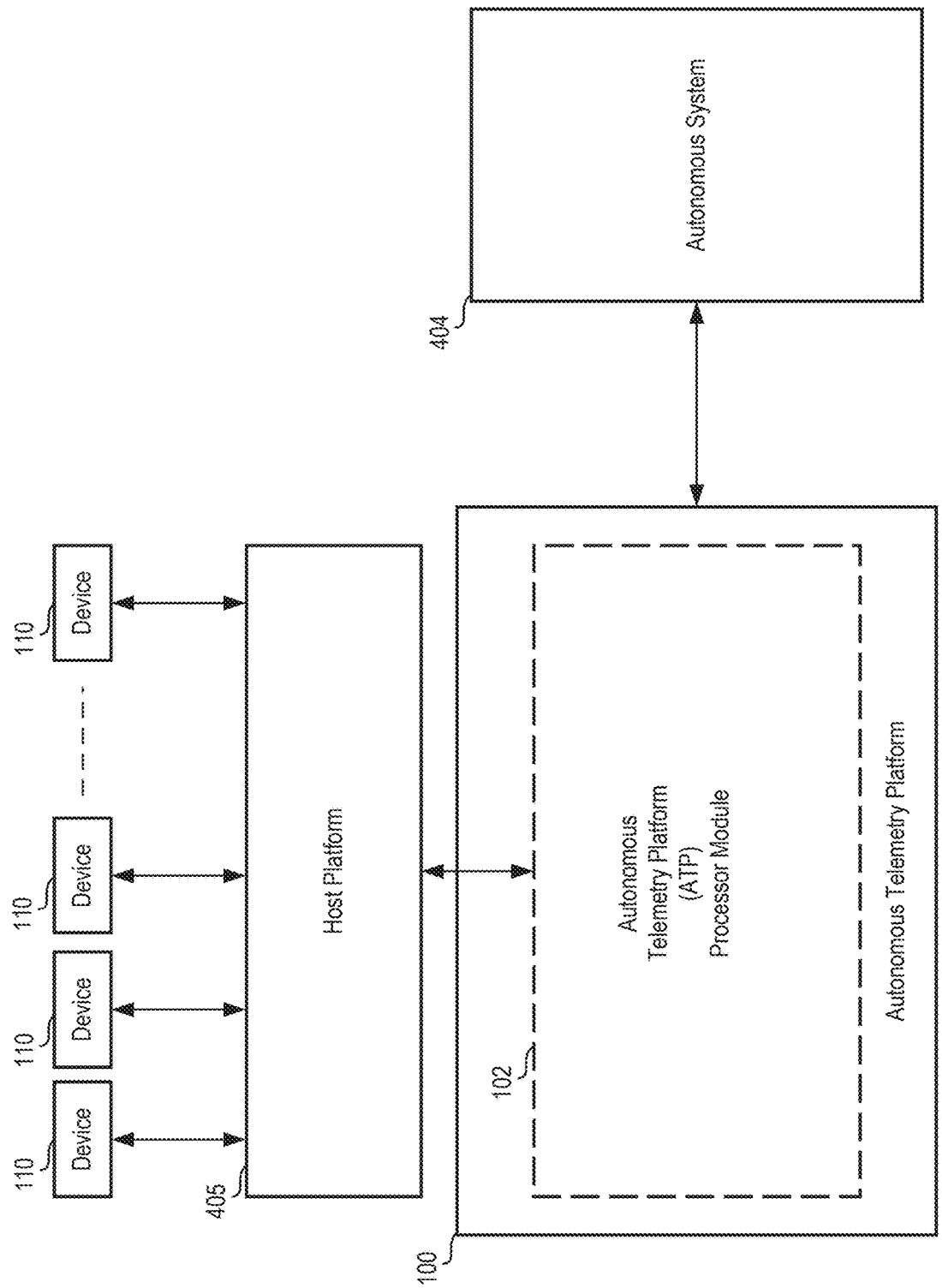
FIGS. 6A and 6B are schematic illustrations of example implementations of a host platform and an ATP according to one or more embodiments described herein.
Figure 6B:
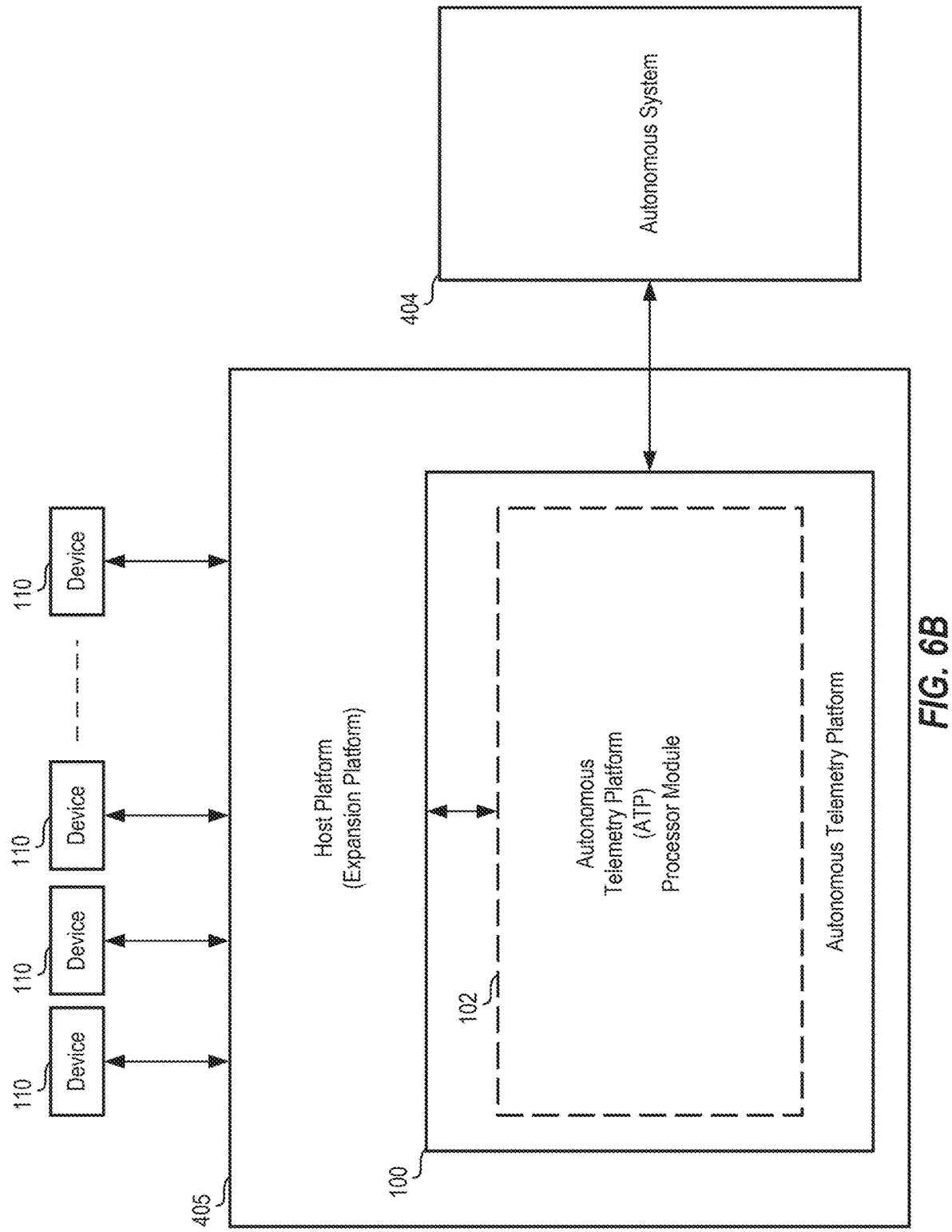

FIGS. 6A and 6B are schematic illustrations of example implementations of the host platform 405 and the ATP 100 according to one or more embodiments described herein. In the example of FIG. 6A, the ATP 100 is separate from but in communication with both the host platform 405 and the autonomous system 404. As an example, the host platform 405 can be an expansion platform. As another example, the host platform can be other portable embedded computing devices provided they operate semi-autonomously and/or autonomously. The ATP 100 includes the ATP processor module 102, which can be configured in accordance with one or more embodiments described herein (see, e.g., FIGS. 1A-1C) and can use the communications subsystem implementation shown in FIGS. 3C and 3D. The ATP 100 facilitates and manages communication between the ATP 100 and one or more devices 110 (e.g., sensors), which are disposed in or otherwise associated with the host platform 405.

In FIG. 6A, the host platform 405 is coupled to or otherwise accessible via a network to the ATP 100 while in FIG. 6B, the ATP 100 is embedded in the host platform 405. As an example, the host platform 405 can be an expansion platform. As another example, the host platform can be other portable embedded computing devices provided they operate semi-autonomously and/or autonomously. The ATP 100 includes the ATP processor module 102, which can be configured in accordance with one or more embodiments described herein (see, e.g., FIGS. 1A-1C) and can use the communications subsystem implementation shown in FIGS. 3C and 3D. The ATP 100 facilitates and manages communication between the ATP 100 and one or more devices 110 (e.g., sensors), which in communication with the host platform 405.

According to an embodiment, the ATP 100 can be utilized within a portable or autonomous or semi-autonomous NMR detector, monitor, or analysis device. For example the NMR device can be a module and the ATP 100 is coupled to the NMR device. The ATP 100 can be embedded within the NMR device to provide the ATP functionality to the NMR device. For example, such an ATP 100 can interface with an autonomous system 404 that is a NMR system or device as depicted in the examples of FIGS. 5A, 5B, 6A, 6B. The NMR application for visualization and user activity can be remote from the data acquisition. This results in a distributed NMR system for portable data acquisition where the ATP 100 provides for data acquisition, pre-processing, and/or transmission to another device that provides for remote display/visualization of the data.

FIGS. 7A-7D are schematic illustrations of different communication paths between and among multiple ATPs 100 and/or a remote computing system 720 according to one or more embodiments described herein. The communication paths shown in FIGS. 7A-7D can be any combination of unicast, multicast, or broadcast; synchronous or asynchronous; and over multiple transport types concurrently; organized in a different topologies, such as mesh; and/or the like, including combinations and/or multiples thereof. In examples, communications can be point-to-point between the ATPs 100 (e.g., FIG. 7A), point-to-point between ATPs 100 and the remote computing system 720 (e.g., FIG. 7B), and/or can be relayed (e.g., FIG. 7C). In examples, a mesh network among the ATPs and remote computing system can be formed (e.g., FIG. 7D).

Figure 7A:
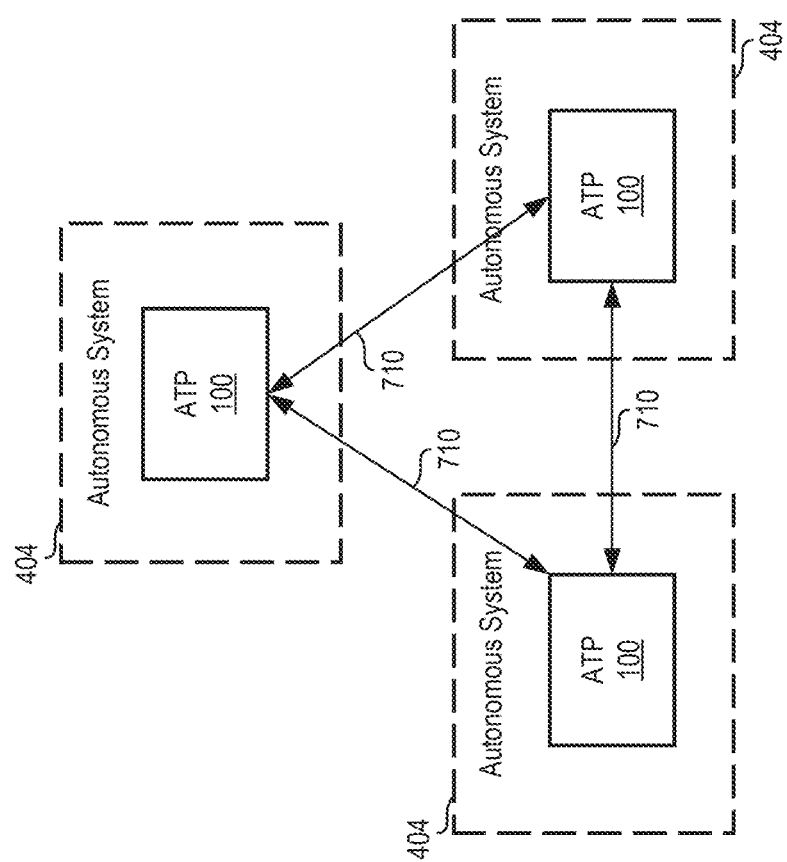
FIGS. 7A-7D are schematic illustrations of communication paths between multiple ATPs and/or remote computing systems according to one or more embodiments described herein.

In FIG. 7A, three autonomous systems 404 are shown, each having an ATP 100 embedded in or otherwise associated therewith. The ATPs are in point-to-point communication with each other as shown by links 710.

Figure 7B:
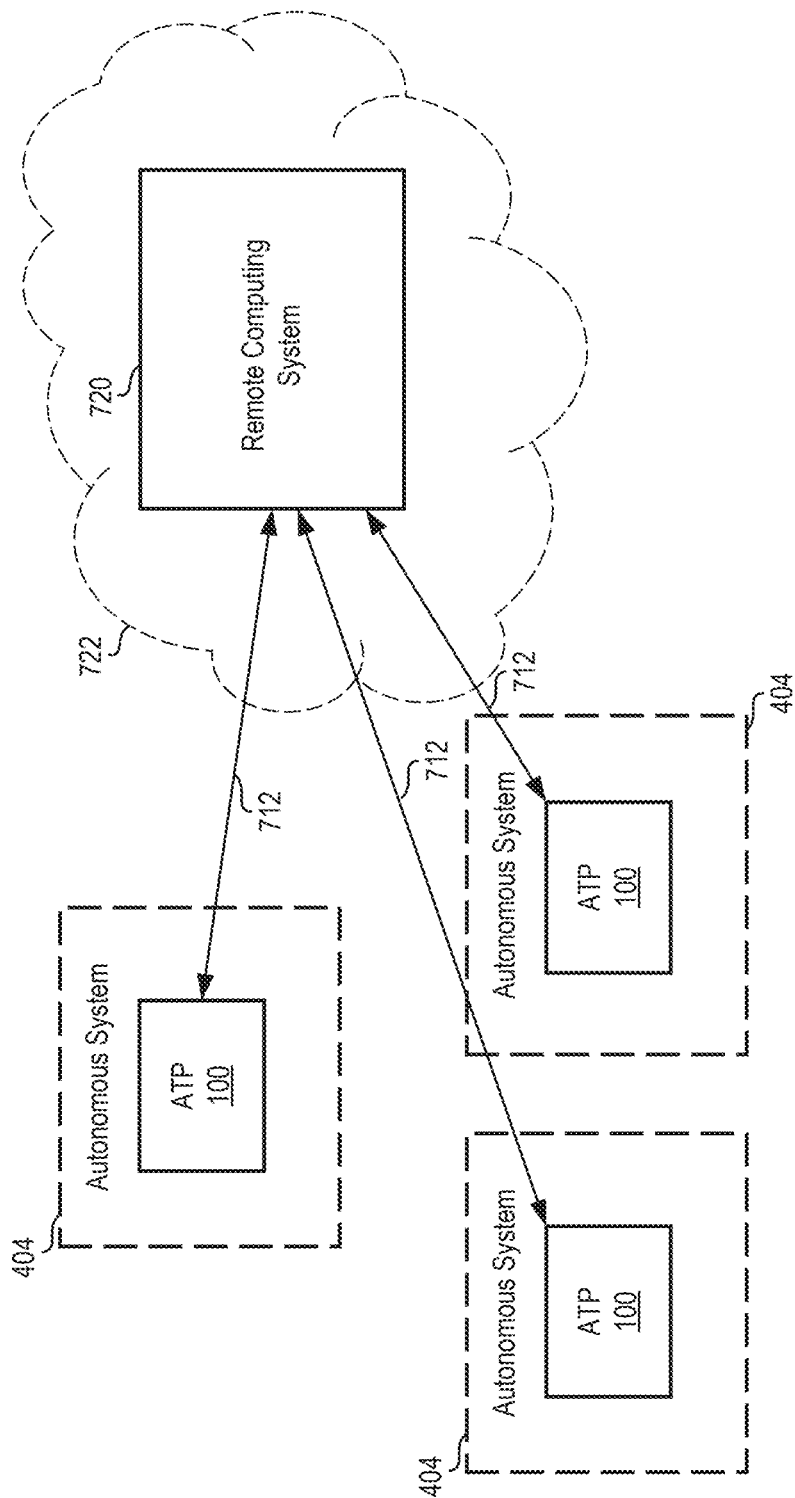

In FIG. 7B, three autonomous systems 404 are shown, each having an ATP 100 embedded in or otherwise associated therewith. In this example, the ATPs 100 are in point-to-point communication with the remote computing system 720 as shown by the links 712. The remote computing system 720 can be any suitable computing device or system, such as a laptop computer, a tablet computer, a smartphone, a server, a node of a cloud computing environment 722, an embedded processor or controller, and/or the like, including combinations and/or multiples thereof.

Figure 7C:
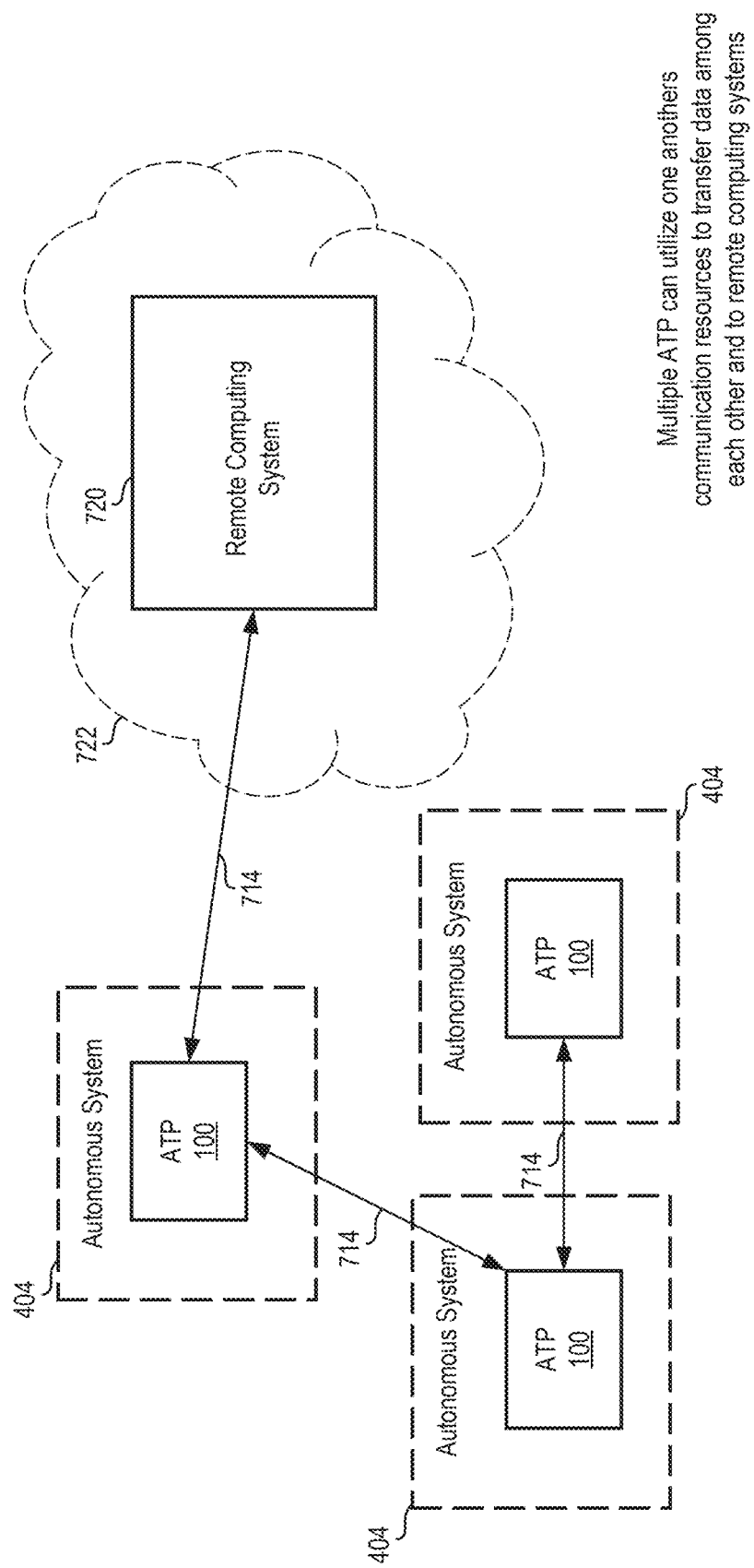

In FIG. 7C, three autonomous systems 404 are shown, each having an ATP 100 embedded in or otherwise associated therewith. In this example, the ATPs 100 can utilize one another's communication resources to transfer data among each other and to the remote computing system 720 as shown by the links 714. This configuration provides for relaying data/messages from one ATP 100 to the remote computing system 720 via other ATPs 100 as shown.

Figure 7D:
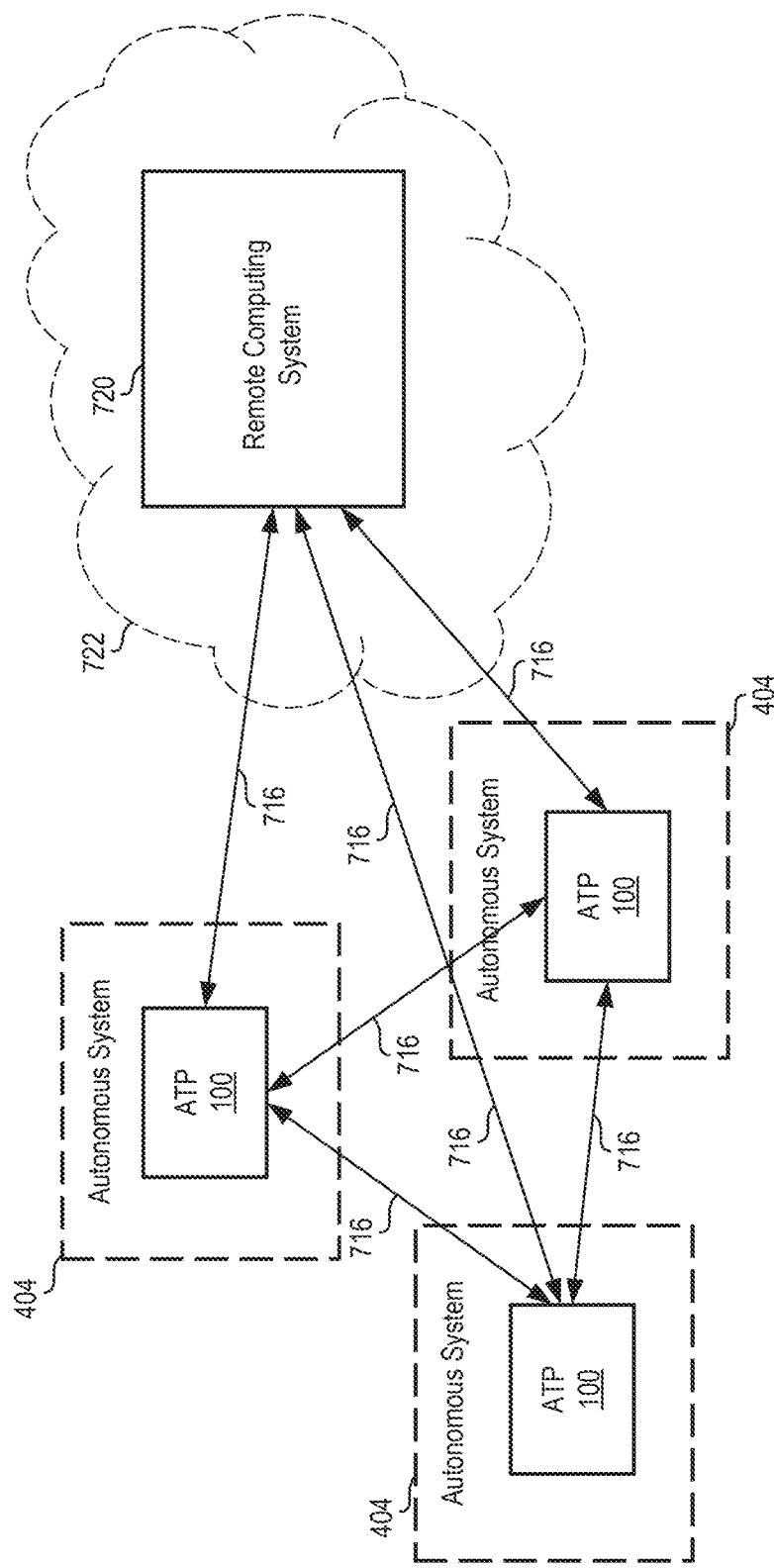

In FIG. 7D, three autonomous systems 404 are shown, each having an ATP 100 embedded in or otherwise associated therewith. In this example, the ATPs 100 and remote computing system 720 together form a mesh network as shown by the links 716.

Figure 7E:
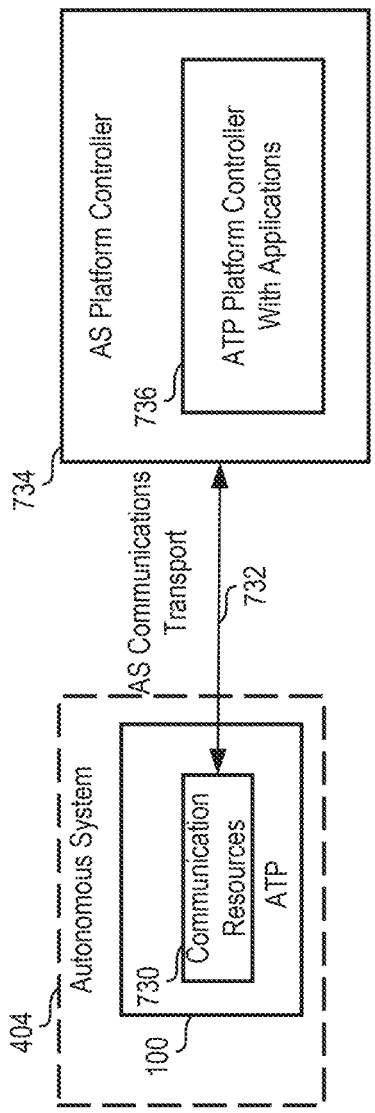
FIGS. 7E and 7F are schematic illustrations of example implementations of an ATP within an autonomous system and an autonomous system platform controller according to one or more embodiments described herein.
Figure 7F:
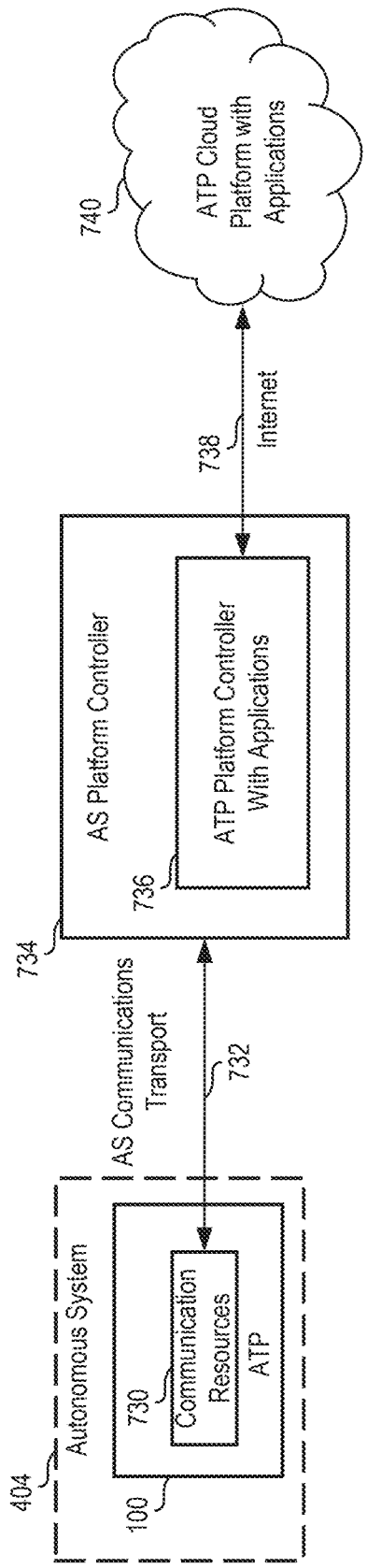

FIGS. 7E and 7F are schematic illustrations of example implementations of the ATP 100 within the autonomous system 404 and an autonomous system platform controller 734 according to one or more embodiments described herein. In these examples, the ATP 100 includes communication resources 730, which include the hardware, interfaces, and/or protocols capable of transmitting data from and/or receiving by the ATP 100 while utilizing the AS communications transport 732 implemented by the AS 404 to simultaneously carry data to/from the ATP 100 and a remote system. As an example, the communication resources 730 transmits data to and/or receives data from the AS platform controller 734 via an AS communications transport 732 as shown. The AS platform controller 734 includes an ATP platform controller with applications 736, which is integrated/embedded into the AS platform controller 734. The AS platform controller 734 manages communications between the autonomous system 404 and external devices, such as other autonomous systems, remote computing systems, cloud computing environments, and/or the like, including combinations and/or multiples thereof. The ATP platform controller with applications 736 leverages communications support/infrastructure within the AS platform controller. In the example of FIG. 7F, the AS platform controller 734 communicates with a cloud environment referred to as ATP cloud platform with applications 740, such as via a network connection (e.g., the Internet 738).

FIGS. 7G and 7H are schematic illustrations of example implementations of the ATP 100 within the autonomous system 404, the AS platform controller 734, and the ATP platform controller with applications 736 according to one or more embodiments described herein. In these examples, the ATP platform controller with applications 736 resides on a separate remote host/computer (e.g., a tablet computing device, a smartphone, a laptop, and/or the like, including combinations and/or multiples thereof), which leverages autonomous system communications support/infrastructure. The AS platform controller 734 and the ATP platform controller with applications 736 communicate via an AS-ATP communications transport link 742 as shown. Access to the ATP cloud platform with applications 740 is also supported as shown in FIG. 7H via the Internet 738 or another suitable communication link.

In the examples of 7E-7H (among others), the ATP platform controller with applications 736 can analyze and act on data that is received, such as from the ATP 100. For example, a device 110 associated with the ATP 100 can collect data as described herein (e.g., sensor data or NMR device), and the ATP platform controller with applications 736 can analyze/process the data and perform operations depending on what applications are available on the ATP platform controller with applications 736. As an example, the ATP platform controller with applications 736 can receive data from multiple ATPs 100, can analyze the data to determine where the ATPs are located geographically and where to move or change the behavior of the autonomous system 404 to depending on an event occurring within an environment of the ATPs 100 (e.g., detected weather event, such as a storm may indicate that the autonomous system 404 should be moved where the ATPs are embedded in or otherwise associated with the autonomous system 404, which can be an unmanned aerial vehicle). In some examples, the ATP cloud platform with applications 740 can provide similar functionality to the ATP platform controller with applications 736.

Figure 7I:
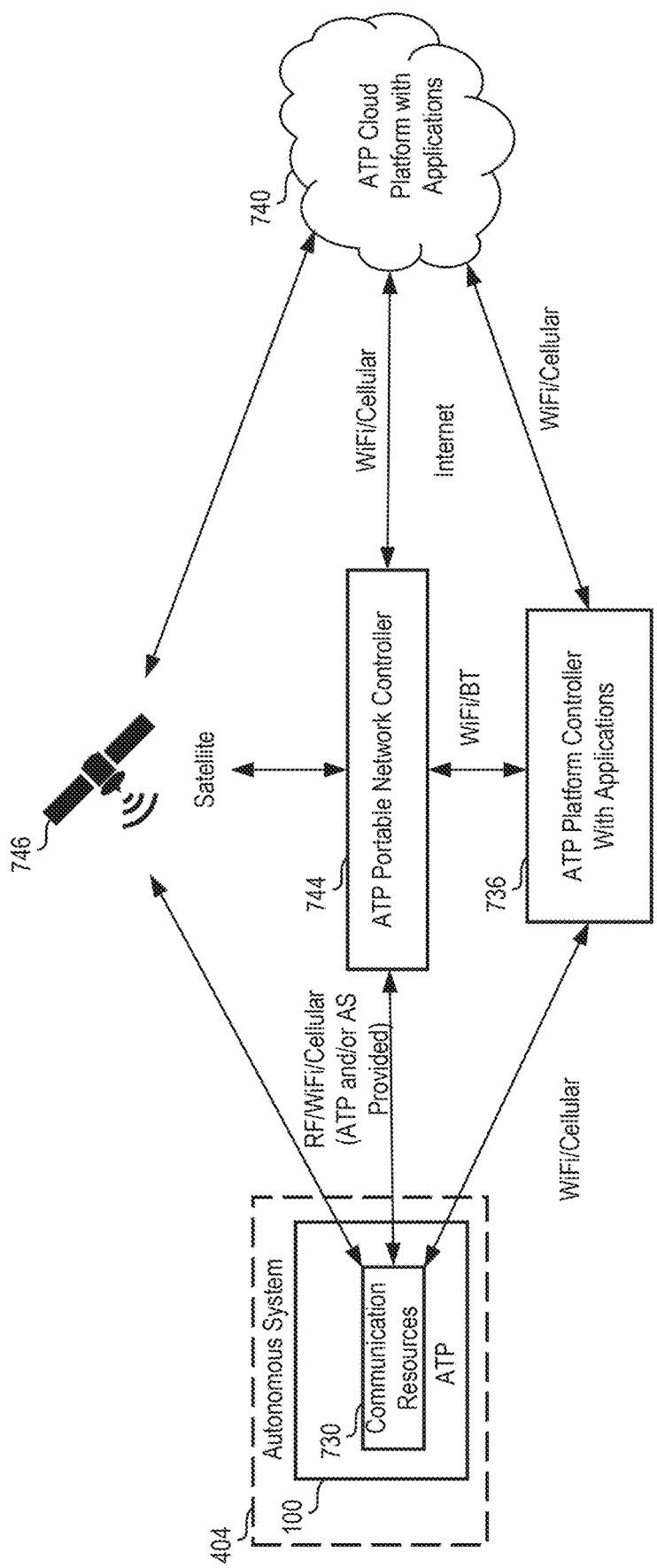
FIG. 7I is a schematic illustration of an example implementation of an ATP portable network controller according to one or more embodiments described herein.

FIG. 7I is a schematic illustration of an example implementation of an ATP portable network controller 744 according to one or more embodiments described herein. In this example, the ATP platform controller (see, e.g., FIGS. 7E-7H) leverages and accesses the ATP portable network controller 744, which manages one or more ATP communications and provides access point capabilities and connectivity across multiple communication resources, dynamically/intelligently. The ATP portable network controller 744 can support various communication schemes/protocols, such as radio frequency, satellite, WiFi, Bluetooth, cellular, and/or the like, including combinations and/or multiples thereof. In an example, the A-SDN control-plane communications controller 755 is implemented (see, e.g., FIG. 3D, 3G) in the ATP portable network controller 744. Access to the ATP cloud platform with applications 740 is also provided.

The communication resources 730 of the ATP 100 can be in communication with a satellite 746 or other suitable device for relaying data between the ATP 100 and the ATP cloud platform with applications 740. The communication resources 730 of the ATP 100 can also be in communication with the ATP portable network controller 744 via a first communication protocol (e.g., radio frequency, WiFi, cellular, etc.) which is provided by the ATP 100 and/or autonomous system 404. The communication resources 730 of the ATP 100 can also be in communication with the ATP platform controller with applications 736 via a second communication protocol (which may be the same or different than the first communication protocol) (e.g., WiFi, cellular, and/or the like, including combinations and/or multiples thereof).

Figure 7J:
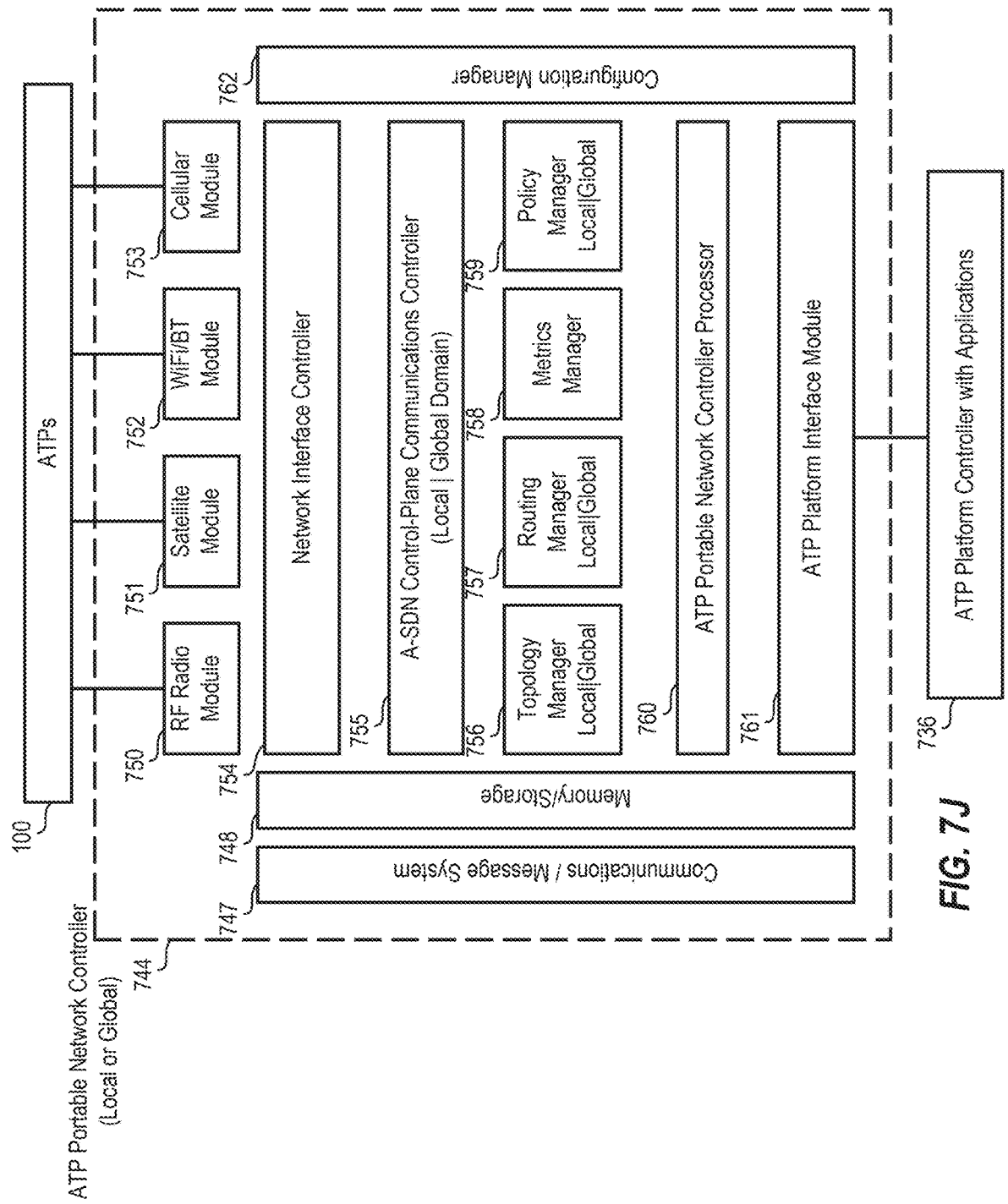
FIG. 7J is a schematic illustration of an example implementation of the ATP portable network controller of FIG. 7I according to one or more embodiments described herein.

FIG. 7J is a schematic illustration of an example implementation of the ATP portable network controller 744 of FIG. 7I according to one or more embodiments described herein. The ATP portable network controller 744 can operate in a local mode or a global mode. In the local mode, the ATP portable network controller 744 manages communication between one or more local ATPs 100 (see, e.g., FIG. 7L, 7N, 7O) directly. In the global mode, the ATP portable network controller manages communication between ATPs 100 via other intermediate ATP portable network controllers (see, e.g., FIGS. 7M, 7N, 7O) and remote resources (e.g., ATP platform controller with applications 736, ATP cloud platform with applications 740, and/or the like, including combinations and/or multiples thereof). In global mode, each ATP portable network controller 744, in a multi-portable ATP network controller implementation, intelligently manages, orchestrates, and optimizes the communication resources and activities across the complete network topology (global domain) of the AS-ATP system (see, e.g., FIG. 7N). Whereas in local mode, each ATP portable network controller 744 intelligently manages, orchestrates, and optimizes the communication resources and activities within the network topology (local domain) comprising AS-ATP systems visible to the given instance of the ATP portable network controller (see, e.g., FIG. 7N).

As shown, the ATP portable network controller 744 is in communication with ATPs 100 using one or more suitable communications modules, such as an RF radio module 750, a satellite module 751, a WiFi/BT module 752, a cellular module 753, and/or the like, including combinations and/or multiples thereof. The modules 750-753 interface with a network interface card that provides network services to the ATP portable network controller 744.

The ATP portable network controller 744 also includes an instance of an A-SDN control-plane communications controller 755 which supports A-SDN features and functions as described herein. Particularly, the A-SDN control-plane communications controller 755 manages and orchestrates communications for the network of ATPs and autonomous systems. The ATP portable network controller 744 also includes a topology manager 756 to manage the topology (i.e., structure or network graph of ATPs 100), a routing manager 757 to route data/commands/messages, a metrics manager 758 to evaluate metrics of data passing through such as quality of service metrics, and a policy manager 759 to apply policies for routing, topology decision making, and/or the like, including combinations and/or multiples thereof. Functional blocks 756-759 of FIG. 7J are implemented through a rule-based approach and/or methods of machine learning to compute optimal topology, routing, and policy decisions provided to the A-SDN control-plane communications controller 755. Additionally, the A-SDN control-plane communications controller 755 operates based on policy configurations and real-time metrics collection from both the metrics manager 758 and telemetry data received from the network of ATPs. In this manner, the A-SDN overall operation is based on a distributed processing and analysis of metrics data for optimal orchestration of the ATP network and indirectly (through ATP 100 interaction with the autonomous system 404) the collection of autonomous systems. Further, the A-SDN control-plane communications controller 755, the topology manager 756, the routing manager 757, and/or the policy manager 759 can operate in a local mode or a global mode consistent with the operating mode of the ATP portable network controller 744.

Operations of the ATP portable network controller 744 are performed by an ATP portable network controller processor 760, which may be any suitable device for processing data or implementing instructions as described herein. Data can be stored in a memory/storage 748, which may be accessible by one or more of the components of the ATP portable network controller 744 described herein. A communications/message system 747 is responsible for internal communications/messaging within the ATP portable network controller 744. A configuration manager 762 is responsible for providing configurations for the ATP portable network controller 744, such as configurations for the local and global modes. The ATP portable network controller 744 is in communication with the ATP platform controller with applications 736 via an ATP platform interface module 761.

Figure 7K:
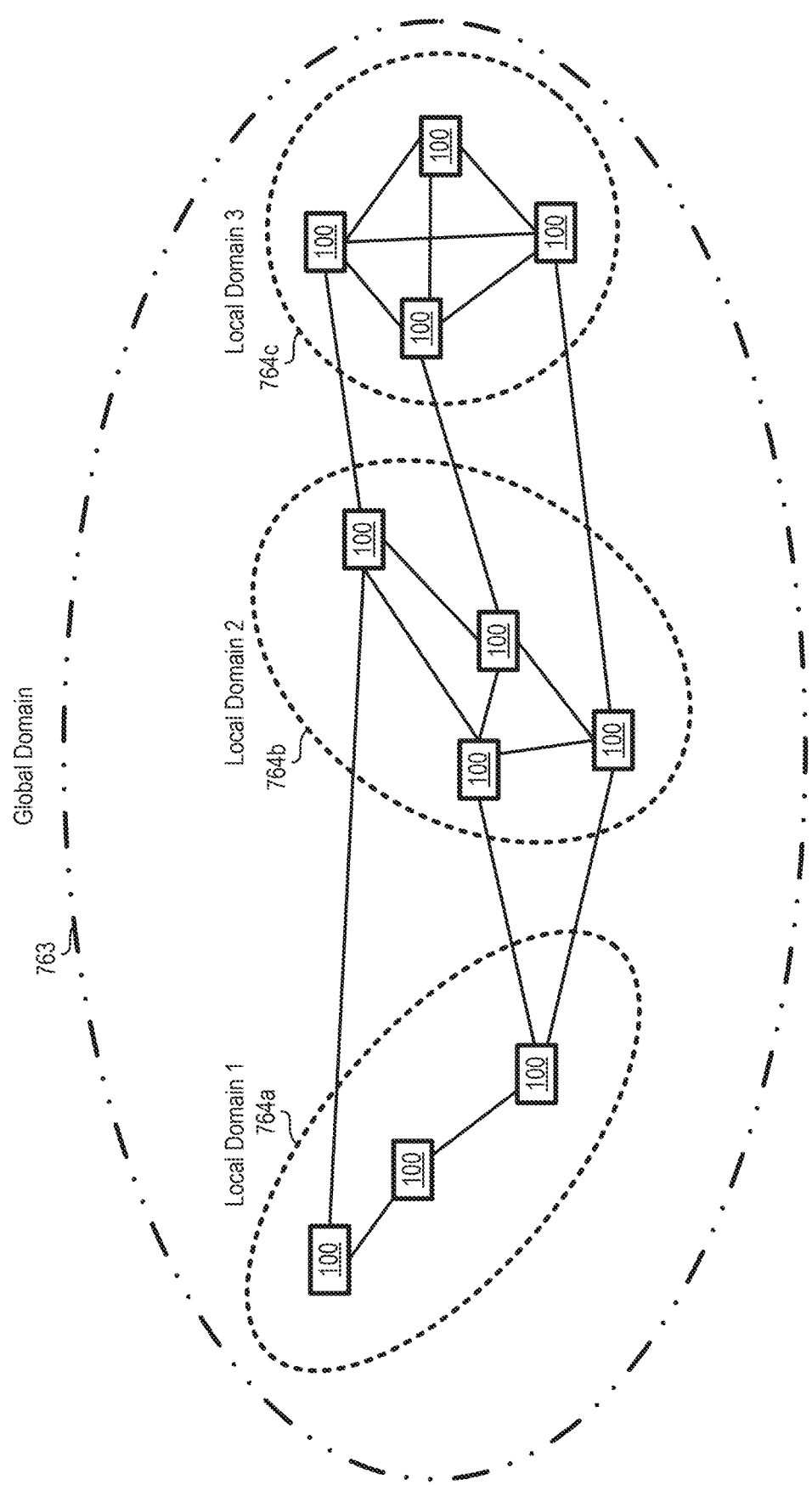
FIG. 7K is a schematic illustration of an example of multiple ATPs deployed in local domains, which together form a global domain according to one or more embodiments described herein.

FIG. 7K is a schematic illustration of an example of multiple ATPs 100 deployed in local domains 764*a*, 764*b*, 765*c*, which together form a global domain 763 according to one or more embodiments described herein.

A local domain 764*a* includes three ATPs 100, and each of the local domains 764*b*, 764*c* includes four ATPs 100, as shown. The ATPs 100 are in communication as shown by the solid lines connecting the various ATPs. The ATPs 100 can be connected in accordance with one or more embodiments described herein (see, e.g., FIGS. 7A-7D).

FIGS. 7L, 7M, 7N, and 7O are schematic illustrations of examples of use cases for the ATP portable network controller 744 of FIGS. 7I and 7J according to one or more embodiments described herein.

Figure 7L:
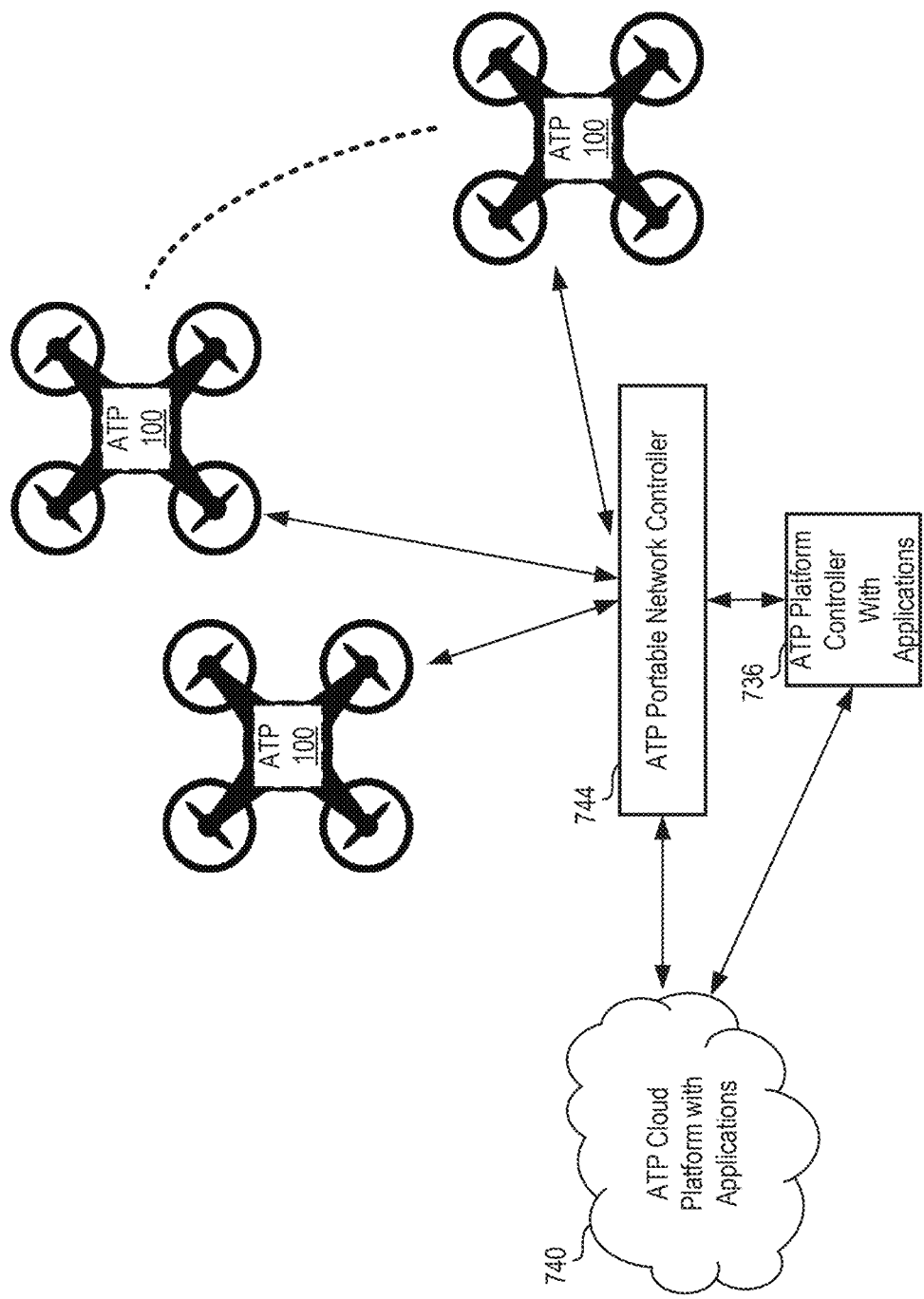

In the example of FIG. 7L, the ATP portable network controller 744 is in communication with ATPs 100, which in this example are unmanned aerial vehicles 409 (see, e.g., FIG. 4E) but are not so limited. The ATPs 100 are in direct communication with the ATP portable network controller 744 using any suitable communication protocol(s) as described herein. The ATP portable network controller 744 is also in communication with the ATP platform controller with applications 736 and the ATP cloud platform with applications 740 as shown, again using any suitable communication protocol(s) as described herein.

Figure 7M:
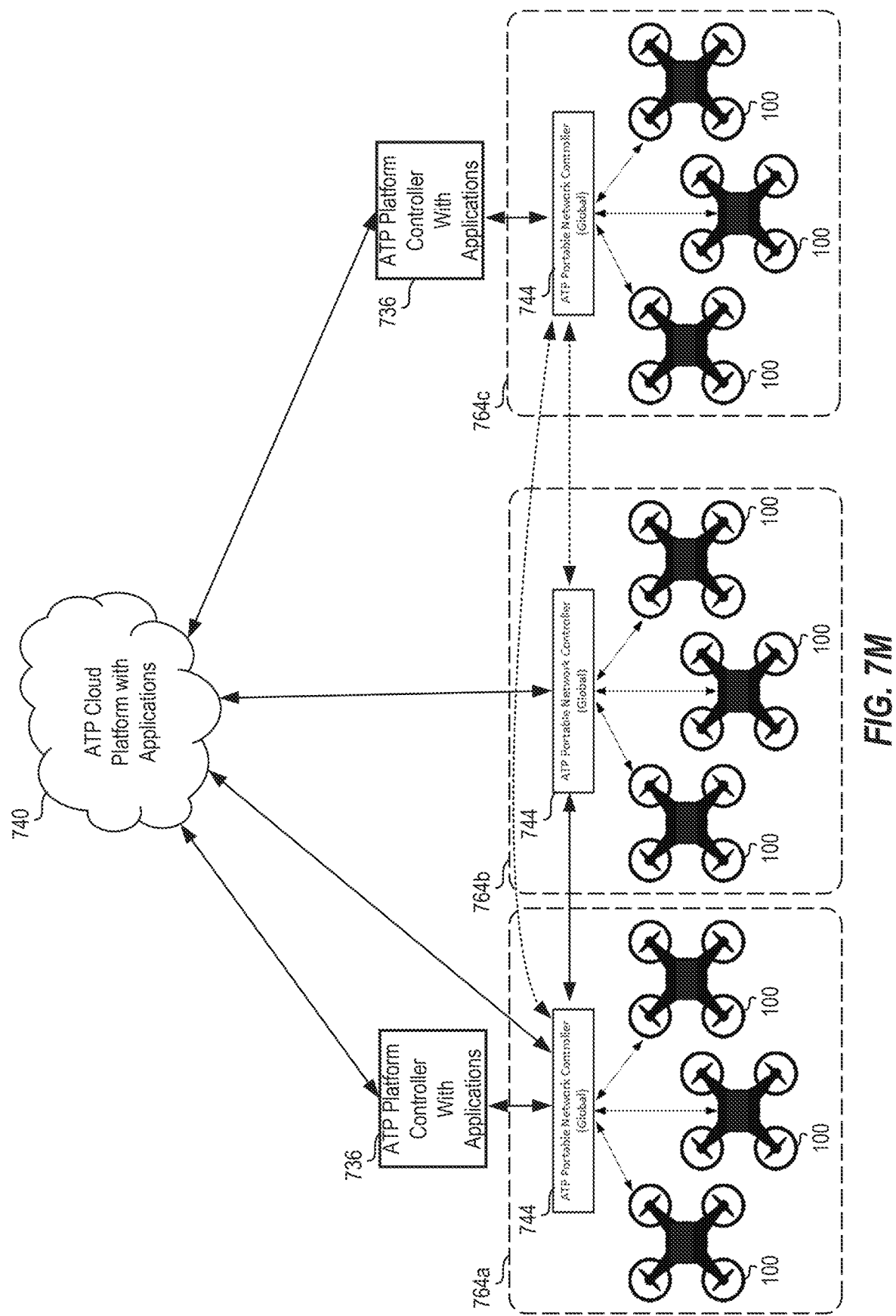
Figure 7N:
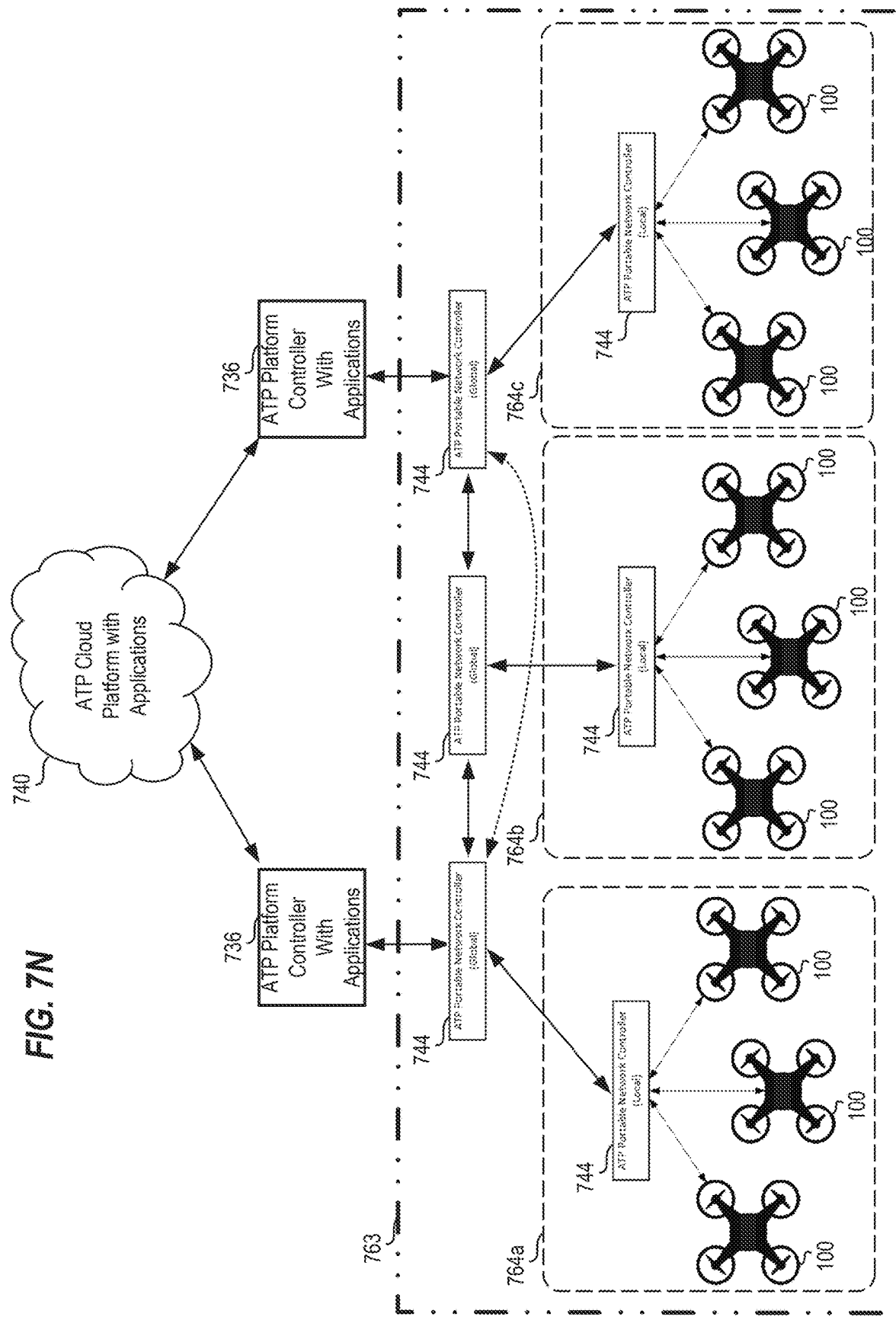
Figure 70:
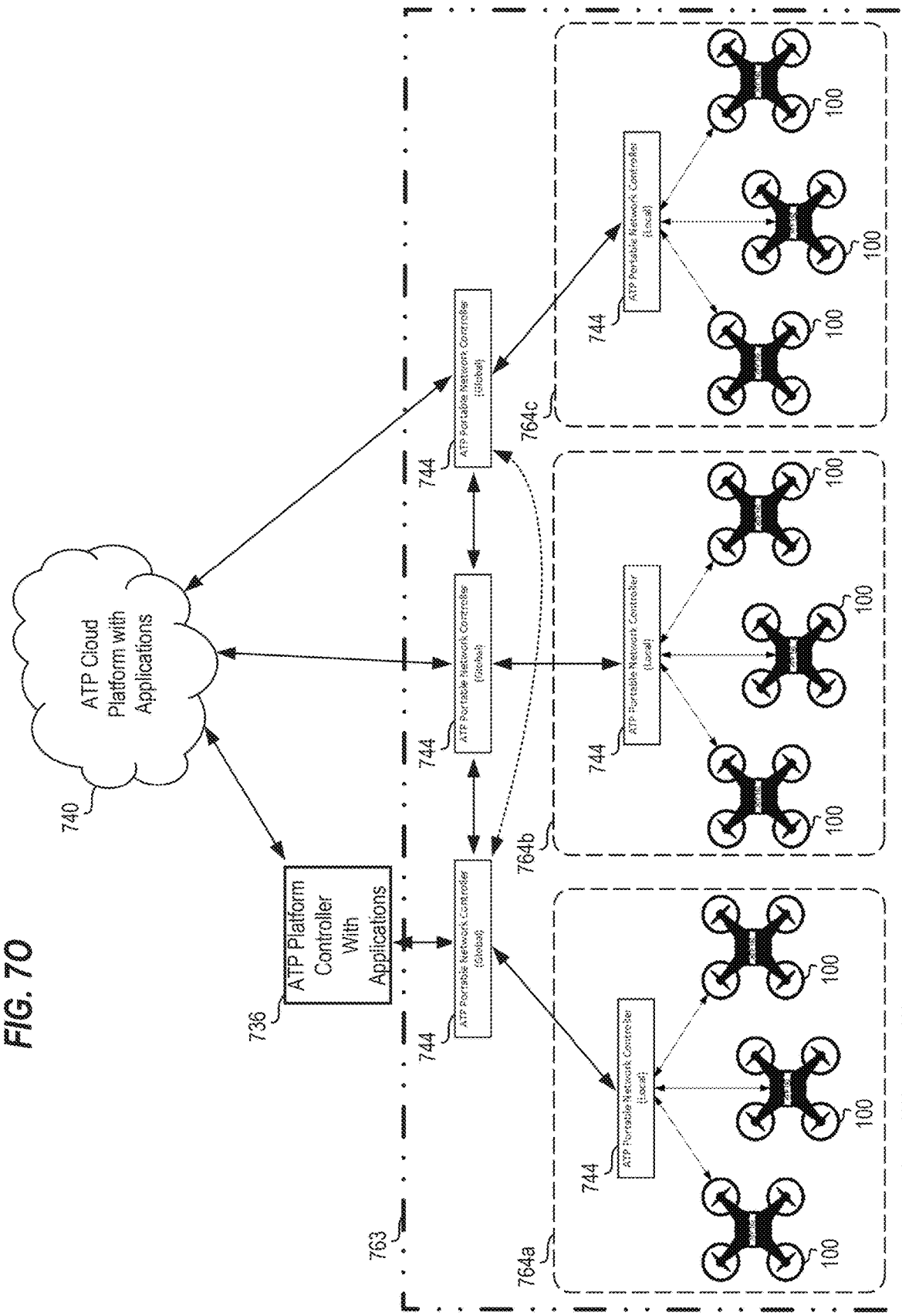

In the examples of FIG. 7M-7O, multiple ATP portable network controllers 744 are implemented and are responsible for managing groups of ATPs 100 shown as local domains 764*a*-764*c*. However, each of these examples implements different configurations of local and global control using various instances of: the ATP portable network controller 744, ATP platform controller with applications 736, and ATP cloud platform with applications 740.

In the example of FIG. 7M, the ATP cloud platform with applications 740 can communicate directly with the ATP portable network controller 744 and/or indirectly via the ATP platform controller with applications 736. The instances of the ATP portable network controller 744 can communicate with one another and/or with the ATP platform controller with applications 736 and/or the ATP cloud platform with applications 740. In this example, the instances of the ATP portable network controller are operating in the global mode each having visibility and awareness for intelligent orchestration across the network topology encompassing 764*a*, 764*b*, and 764*c*.

The example of FIG. 7N provides a hybrid model with a hierarchy on top of the architecture shown in FIG. 7M where a number of elements (where each of the ATPs 100, ATP portable network controllers 744, ATP platform controller with applications 736, and ATP cloud platform with applications 740 represent an element) is greater than a first threshold and/or a network diameter or span is greater than a second threshold. For example, a transition may occur to a federated or hierarchical model (which could occur dynamically) as the number of ATPs increases such that the ability to manage the network topology becomes difficult by single layer of controllers. The threshold can be set/adjusted based on, for example, management capabilities/limitations for the network topology, and/or performance metrics collected during network and system operation. In this example, the ATP cloud platform with applications 740 is in direct communication with the instances of the ATP platform controller with applications 736. In examples, one or more instances of the ATP platform controller with applications 736 can be implemented. The instances of the ATP platform controller with applications 736 are in direct communication with one or more instances of the ATP portable network controller 744, which are operating in the global mode, as shown. In turn, the global instances of the ATP portable network controller 744 are in communication with one another and each is in communication with a respective instance of the ATP portable network controller 744 operating in the local mode as shown. The local instances of the ATP portable network controller 744 are responsible for managing the groups of ATPs 100 shown as local domains 764a-764c.

In the example of FIG. 7O (like the example of FIG. 7N), provides a hybrid model with a hierarchy on top of the architecture shown in FIG. 7M where a number of elements is greater than a first threshold and/or a network diameter or span is greater than a second threshold as described herein. In this example, an instance of the ATP platform controller with applications 736 is moved to the cloud where it interfaces with a global instance of the ATP portable network controller 744 as shown.

In accordance with the examples of FIGS. 7L-7O, it should be appreciated that there are many other example implementations in accordance with embodiments described herein. For example, one or more ATP portable network controllers 744 can be implemented in various configurations. In an example, the ATP cloud platform with applications 740 integrates with a ATP portable network controller 744 directly, where the ATP platform controller is impeded in the ATP cloud platform with applications 740. Again, other configurations are also possible.

The ATPs 100 in FIGS. 7L-7O are shown as unmanned aerial vehicles but could be any suitable device, system, vehicle, embedded controller, and/or the like, including combinations and/or multiples thereof.

Figure 7P:
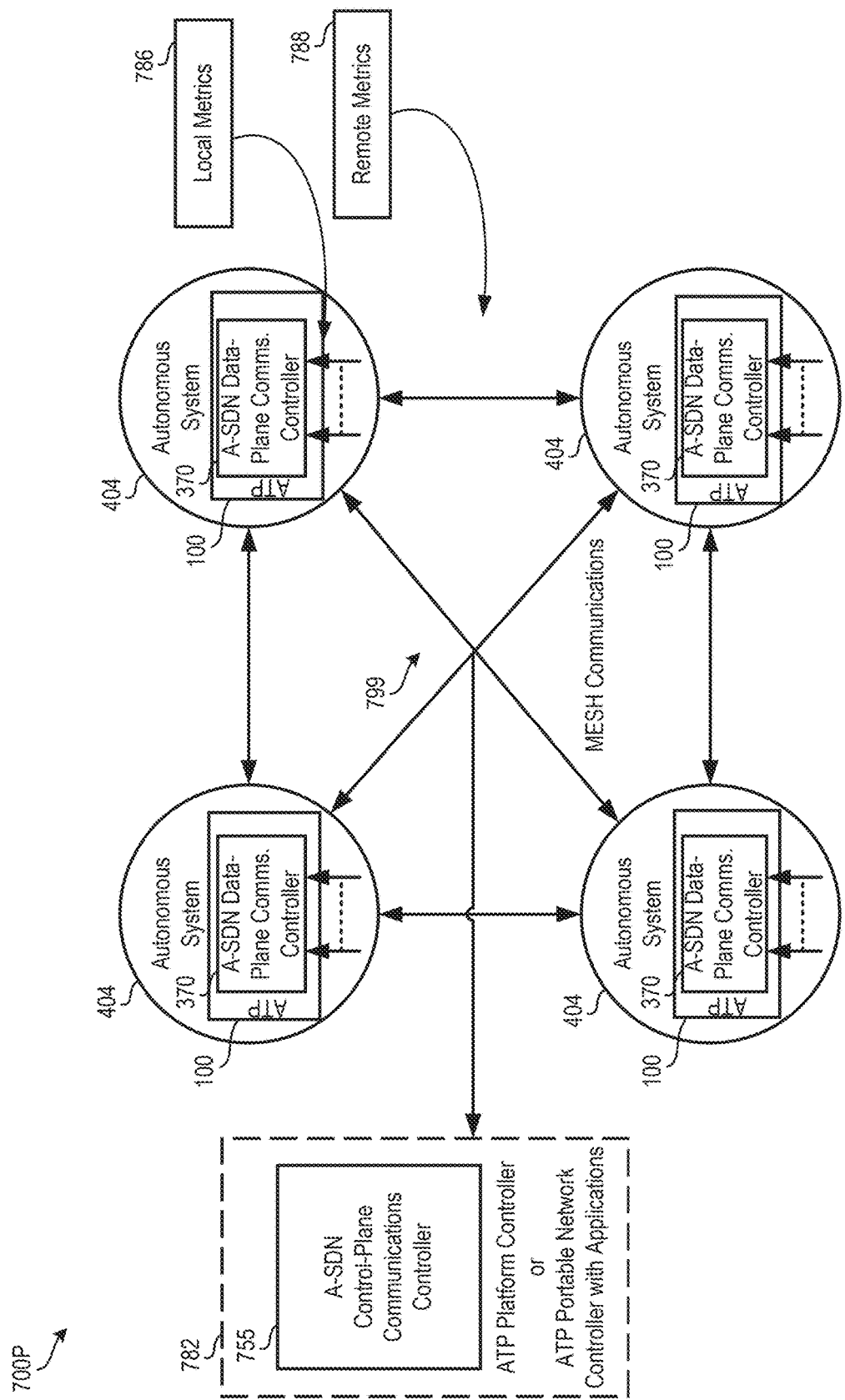
FIG. 7P is a schematic illustration of multiple autonomous systems, each having an ATP with an autonomous SDN data-plane controller according to one or more embodiments described herein.

FIG. 7P is a schematic illustration of multiple autonomous systems 404, each having an ATP 100 with an autonomous SDN data-plane communications controller 370 according to one or more embodiments described herein. Particularly, FIG. 7 depicts a system 700P having multiple autonomous systems 404, each with an ATP 100 having an A-SDN data-plane communications controller 370. Together, the ATPs 100 form a mesh network such that the ATPs are in mesh communication with one another and with a higher-level controller 782, which can be the ATP platform controller with applications 736 or the ATP portable network controller 744. The higher-level controller 782 can include an A-SDN control-plane communications controller 755, which defines network rules and policies that are then implemented, executed, or provisioned, within each A-SDN data-plane communications controller 370 (see FIG. 3D) of the ATP 100 instance as shown. In this manner an autonomous software defined network is established, whereby a control-plane manages, orchestrates and controls the network topology comprising one or more ATPs 100 coupled to respective autonomous systems using the A-SDN control-plane communications controller 755 (see FIG. 7J), for example.

The ATP coupled to each autonomous system 404 can receive local metrics from the respective ATP processor modules (e.g., the ATP processor module 102) of the ATPs 100 and/or remote metrics from other ATPs. For example, the A-SDN data-plane communications controller 370 receives local metrics 786 from its own autonomous system 404 and receives commands from the A-SDN control-plane based on remote metrics received by the A-SDN control-plane from the one or more ATPs. When the ATP processor module 102 is not operating in A-SDN mode (see FIG. 3C), both local and remote metrics are used at the ATP level since the connection manager 311 is acting as the decision maker.

When in an A-SDN enhancement mode (see FIG. 3D), both local and remote metrics for the connection manager 311 are used as described herein. However, in this case, the ATP local metrics are conveyed (received as remote-metrics from A-SDN control-plane perspective) to the A-SDN control-plane communications controller 755 as the decision maker, which means local metrics for each ATP is sent to the A-SDN control-plane system (e.g. the ATP platform controller with applications 736, the ATP portable network controller 744, etc. Thus, the A-SDN control-plane communications controller 755 manages the network unless there is an override rule, policy, or situation (environmental) where the local communications controller will control versus the A-SDN control-plane system. That is, based on the rules and policy configuration, there is an arbitration scenario that is to be supported in each ATP 100 whereby either the A-SDN framework (control plane plus data-planes) or the connection manager 311 is the leader or slave. As an example, if the A-SDN functionality goes down for some reason, the network of ATPs still operates under some controlling entity, which would default to the connection manager 311. In an embodiment, the arbitration logic for master or slave operation can dynamically change based on rules, policies, inference from machine learning, or events based on configuration or real-time metrics (computed or learned through machine-learning methods) as described herein.

This example provides for mesh communications (utilizing any suitable combination of communication protocols, types, or resources) between/among the ATPs 100 by establishing an autonomous software defined network 799. The autonomous software defined network 799 is based on one or more A-SDN data-plane communications controllers 370 (see FIG. 3D) that collect metrics, which are transported to the A-SDN control-plane communications controller 755 (see FIG. 7J). Additionally, the autonomous SDN data-plane communications controllers 370 in conjunction with the communications controller 354, the real-time transport and telemetry metrics processor 352, and the inference and event engine 360 generate events consumed by one or more of the autonomous systems 404 to influence their operations and behavior The A-SDN control-plane communications controller 755 manages and orchestrates communications for the network 799 of ATPs 100 and autonomous systems 404 as described herein. The A-SDN control-plane communications controller 755 generates global rules, policies, and network packet processing configurations (e.g., forwarding rules on a communication resource or port-by-port basis for each network packet, and dynamic configuration of the network based on metrics, events, etc.), for each A-SDN data-plane communications controller 370 in the network formed by the autonomous systems 404 and their respective ATPs 100. The A-SDN control-plane communications controller 755 receives metrics from one or more of the ATPs 100 as described herein from the metrics processing within the AS network controller 124.

Figure 8A:
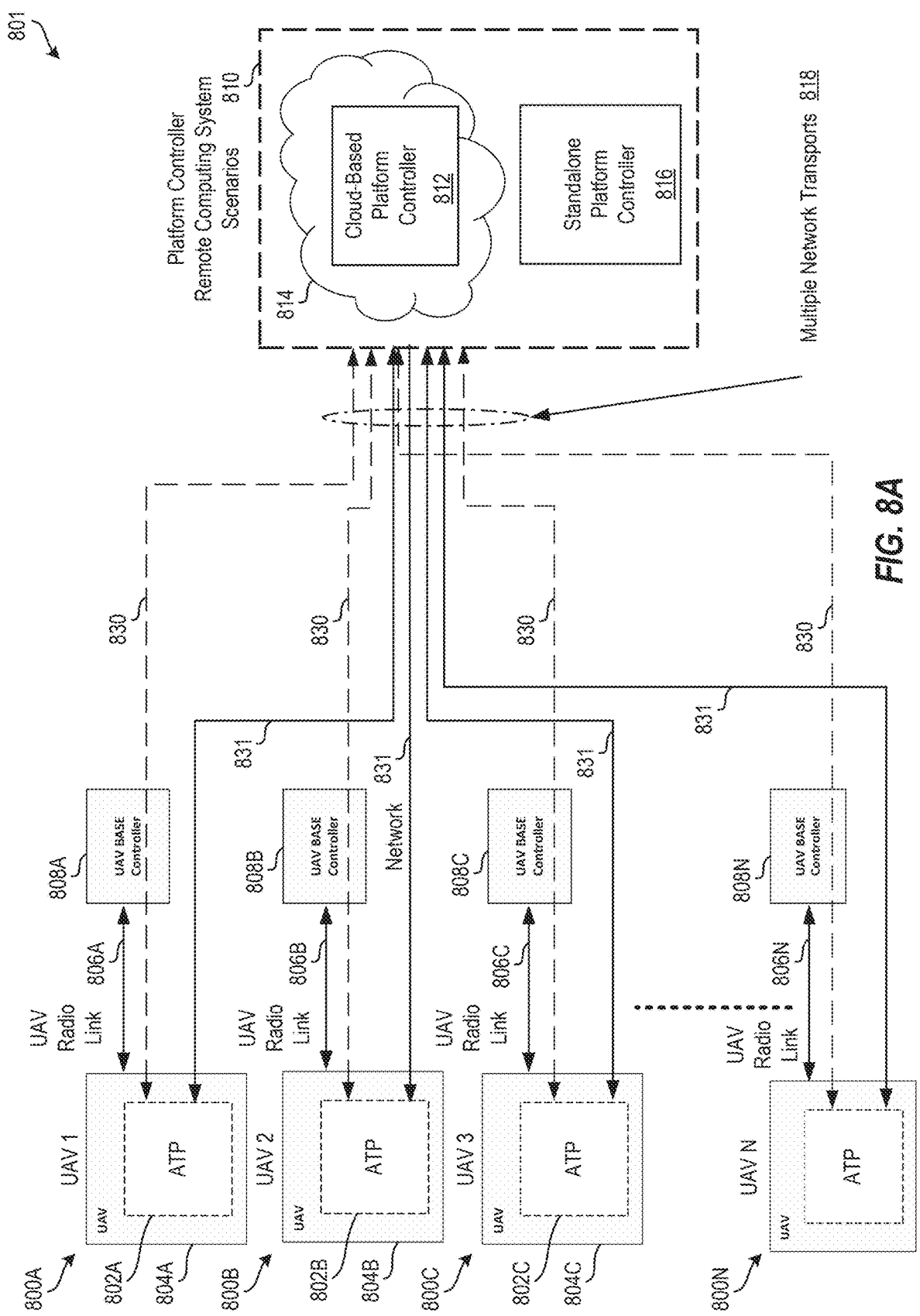
FIG. 8A is a schematic illustration of an example of multiple unmanned aerial vehicles (UAV) each equipped with an ATP according to one or more embodiments described herein.
Figure 8B:
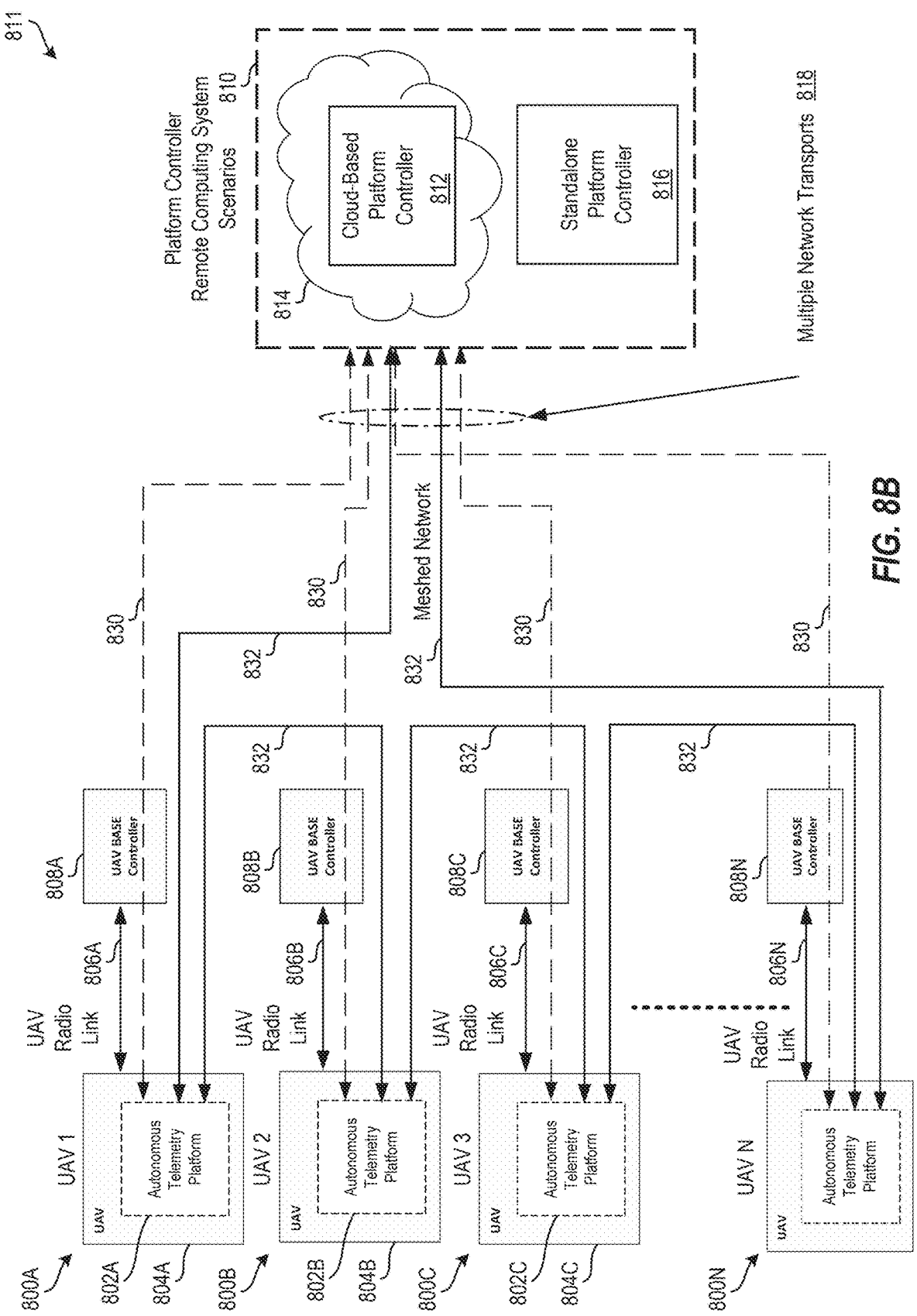
FIG. 8B is a schematic illustration of an example of multiple UAVs each equipped with an ATP and together forming a partial mesh network according to one or more embodiments described herein.

FIG. 8A is a schematic illustration of an example of multiple unmanned aerial vehicles (UAV) each equipped with an ATP according to one or more embodiments described herein. FIG. 8B is a schematic illustration of an example of multiple unmanned aerial vehicles (UAV) each equipped with an ATP and together forming a partial mesh network according to one or more embodiments described herein. In these examples, multiple UAVs are shown, which each include an ATP. This implementation supports multi-sensor acquisition and analysis based on distributed ATPs, which support multiple possible communication paths/network transports and remote system coordination.

An example in which autonomous systems (e.g., autonomous system 404) are unmanned aerial vehicle (UAV) systems is now described. This is only one possible example of an implementation of an autonomous system as described herein. Referring now to FIGS. 8A and 8B, systems 801 and 811, respectively, are shown that provide for multiple (N) UAV systems 800A-800N. The UAV systems 800A-800N include UAVs 804A-804N and corresponding UAV Base Controllers 808A-808N communicatively coupled by UAV radio links 806A-806N. Each of the UAV systems 800A-800N includes at least one ATP 802A-802N (e.g., ATP 100) (see, e.g., FIG. 4E), where each ATP 802A-802N includes an ATP processor module (not shown) (e.g., the ATP processor module 102) as described herein.

Each UAV systems 800A-800N further includes a sensor (not shown) (e.g., gas/liquid chemical sensor) for sensing an environmental property and being operably coupled to a device (e.g., the device 110). The device can communicate directly to a cloud computing environment 814 (e.g., hosting a distributed sensor analysis and prediction application, such as a cloud/distributed computing environment for example) and/or indirectly via the multiple network transports 818 to the platform controller remote computing system scenarios 810 which includes one or more platform controllers, cloud-based platform controller 812 and standalone platform controller 816 as described herein, such as through an application or software being executed on the cloud computing environment 814, or alternatively by directly (not shown) as a direct unicast connection.

In an embodiment, the communications channel is configured as a unicast from the UAV 802 to cloud computing environment 814 (using TCP/IP or QUIC/UDP/IP for message delivery, for example). In an embodiment, there can be data and command/control message queues within the cloud computing environment 814 to enable asynchronous communication as described herein and an ATP processor module associated to each sensor (e.g., gas/liquid sensor module). For asynchronous communications (see, e.g., FIGS. 3A, 3B), sensor readings are published to the data queues on the ATP processor module 102 instance and transmitted to a corresponding data message queue in the cloud computing environment 814, where it can be aggregated with other data message queue data, processed, and/or analyzed based on the global set of datasets across all or a portion of UAV expansion platform sensors modules.

In response to collectively analyzed data, the cloud computing environment 814 communicates with one or more of the cloud-based platform controller 812 and/or the standalone platform controller 816 (collective "the platform controllers 812, 816") with updated telemetry that actuates the operation of the ATPs 802A-802N. In an embodiment, one or more of the platform controllers 812, 816 sends updated command and control data so all or at least a portion of the ATPs 802A-802N are able to execute the appropriate actions in response to the collective environmental analysis in parallel, since all or at least a portion of the ATPs 802A-802N receive any operational command and control messages in real-time (or near-real-time) and within the same multicast group reception time period. In an embodiment, this is essentially concurrently. Operations on the ATPs 802A-802N can include increasing the resolution of gas/liquid sampling, activating other sensors in response to the cloud/distributed computing based data analysis, or even making telemetry available such as updated location or position coordinates that can be communicated to the UAV systems 804A-804N to modify target trajectory patterns (as would be the case in a swarm-based optimization scenario) so the cluster of N UAVs can converge towards an operational goal.

As shown in FIG. 8A, one or more of the UAV systems 800A-800N is linked to the platform controller remote computing system scenarios 1610 via the links 1630 and/or 1631. As shown in FIG. 8B, one or more of the UAV systems 800A-800N is linked to the platform controller remote computing system scenarios 1610 via the links 1630 and/or 1631 and/or are linked together to form a meshed network shown by the links 1632.

Figure 9:
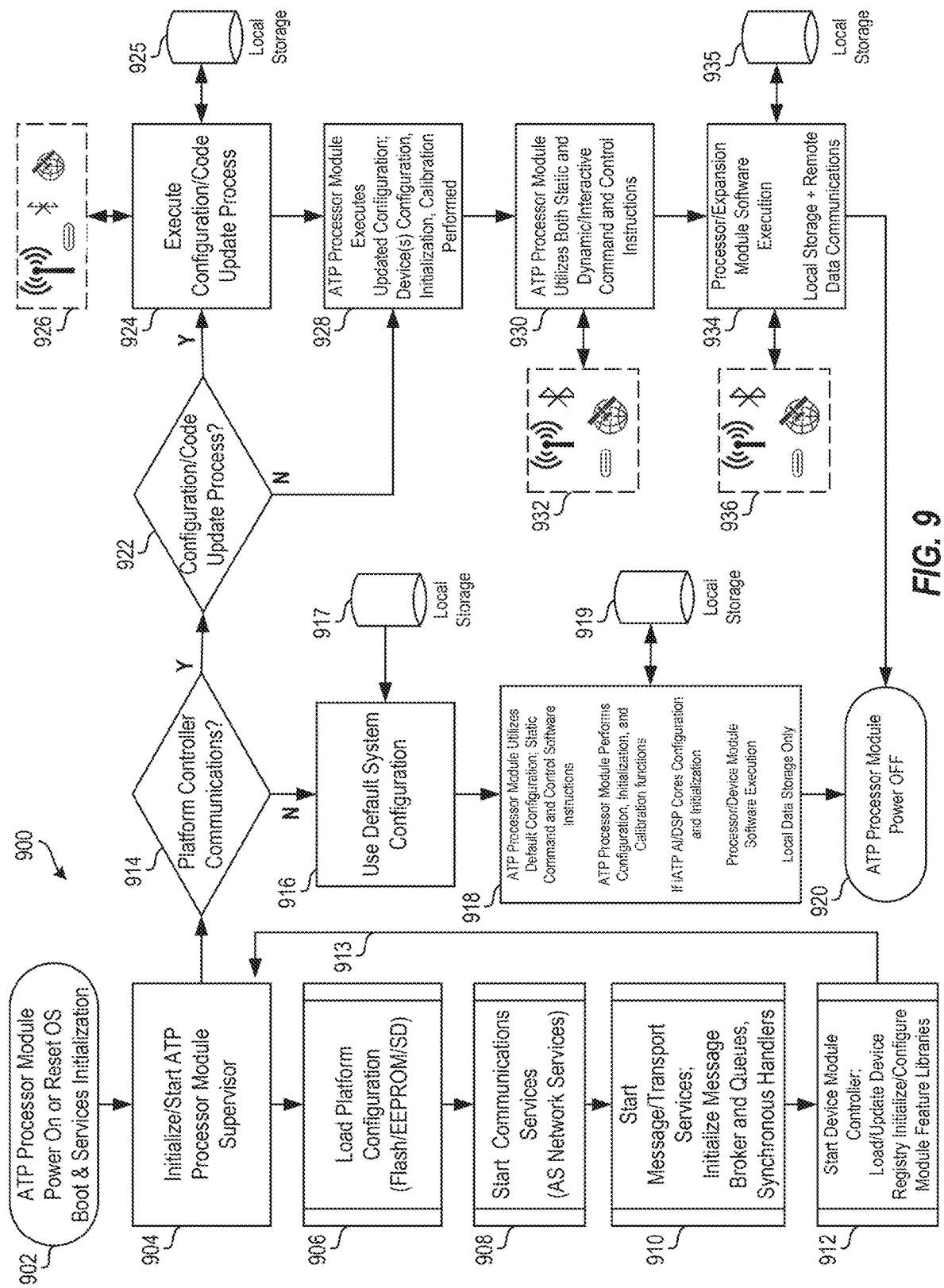
FIG. 9 is a flow diagram of a method according to one or more embodiments described herein.

FIG. 9 is a flow diagram of a method 900 according to one or more embodiments described herein. The method 900 can be implemented, for example, using the ATP processor module 102 and/or another suitable device and/or system.

The method 900 details one example procedure for initiating and configuring an ATP processor module (e.g., the ATP processor module 102), which includes, for example, starting communication services and message and transport services, loading system configuration information, and the like.

At block 902, the control system 200 performs a power on or reset of the ATP processor module 102. This can include booting a processor module operating system and/or initializing any associated services.

At block 904, an ATP processor module system software/OS 116 is initialized. At block 906, a platform configuration is loaded from a memory, such as a flash memory, an electrically erasable programmable read-only memory (EEPROM), or another suitable memory. At block 908, communications services (e.g., the AS network services 120) are started. At block 910, message/transport services (e.g., message and transport services module 118) are started, and a message broker and queues are initialized, including synchronous handlers (see, e.g., FIGS. 3A and 3B). At block 912, the ATP interface controller 112 is started, which can include loading/updating a module registry, initializing/configuring device feature libraries, etc. This initialization process can be restarted, as shown by the arrow 913, as needed, on demand, periodically, responsive to a trigger event, etc.

At block 914, it is determined whether the platform controller communications (e.g., the communications controller 354) are available. If platform controller communications are not available, the method 900 proceeds to block 916, where a default system configuration is implemented, which can be stored, for example, in local storage 917. At block 918, the ATP processor module 102 utilizes the default configuration from block 916, including static command and control software instructions, which are command and control instructions that do not change based on the particular system configuration (e.g., default vs. custom) and can be stored in the local storage 919, for example. Also at block 918, the ATP processor module 102 performs device configuration, initialization, and calibration functions of the one or more of the devices 110. The ATP processor module 102 and one or more of the devices 110 then execute their respective tasks/instructions, and collected data is stored locally, such as in the local storage 919. Subsequent to completion at block 918, the ATP processor module 102 powers off at block 920.

If platform controller communications are available as determined at block 914, the method 900 proceeds to block 922 where it is determined whether to update configuration/code. If so, at block 924, a configuration/code update process is executed using data received from local storage 925 and/or other devices via communication protocol(s) 926, which can include USB/USB-C, Bluetooth, satellite, or any other suitable communication protocol and/or the like, including combinations and/or multiples thereof.

Once the configuration/code update process is completed at block 924 or if it determined at block 922 that no configuration/code update is to be performed, the method 900 proceeds to block 928. At block 928, the ATP processor module 102 executes the updated configuration (e.g., from block 924) and performs device configuration, initialization, and calibration of one or more of the devices 110. At block 930, the ATP processor module 102 utilizes static and/or dynamic/interactive command and control instructions, which can be received, for example, by communication protocol(s) 932, which can include USB/USB-C, Bluetooth, satellite, or any other suitable communication protocol and/or the like, including combinations and/or multiples thereof. At block 934, the ATP processor module 102 and one or more of the devices 110 then execute their respective tasks/instructions, and collected data is stored locally, such as in the local storage 935 and/or remotely in another device which receives the data via communication protocol(s) 936, which can include USB/USB-C, Bluetooth, satellite, or any other suitable communication protocol and/or the like, including combinations and/or multiples thereof. Subsequent to completion at block 934, the ATP processor module 102 powers off at block 920.

It should be appreciated that the local storage 917, 919, 925, 935 can be the same physical or logical storage device or can be multiple physical and/or logical storage devices. The local storage 917, 919, 925 and/or 935 can store data locally and/or remotely relative to the control system 200.

Additional processes also may be included, and it should be understood that the process depicted in FIG. 9 represents an illustration, and that other processes may be added or existing processes may be removed, modified, or rearranged without departing from the scope of the present disclosure.

Figure 10A:
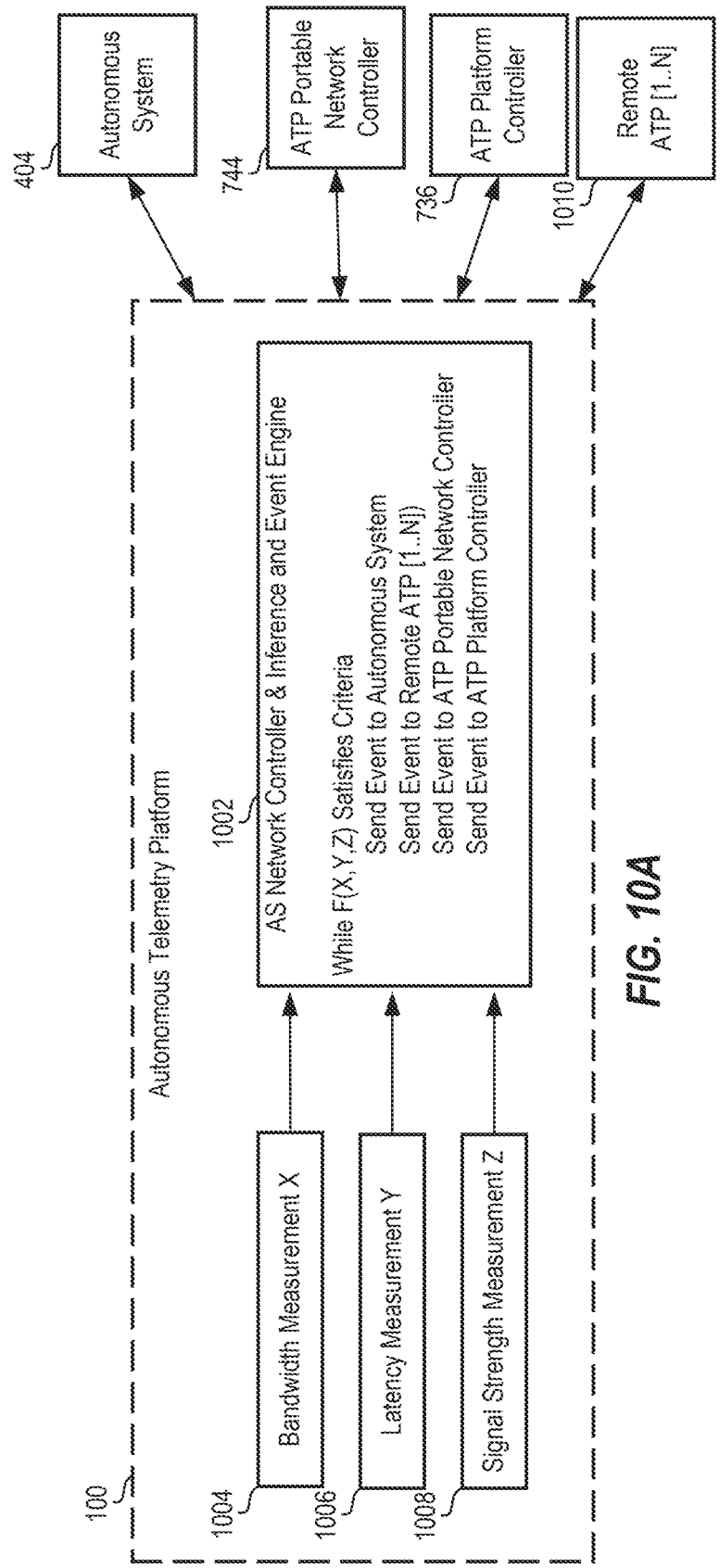
FIGS. 10A-10C are schematic illustrations of an autonomous telemetry platform including an autonomous system (AS) network controller according to one or more embodiments described herein.
Figure 10B:
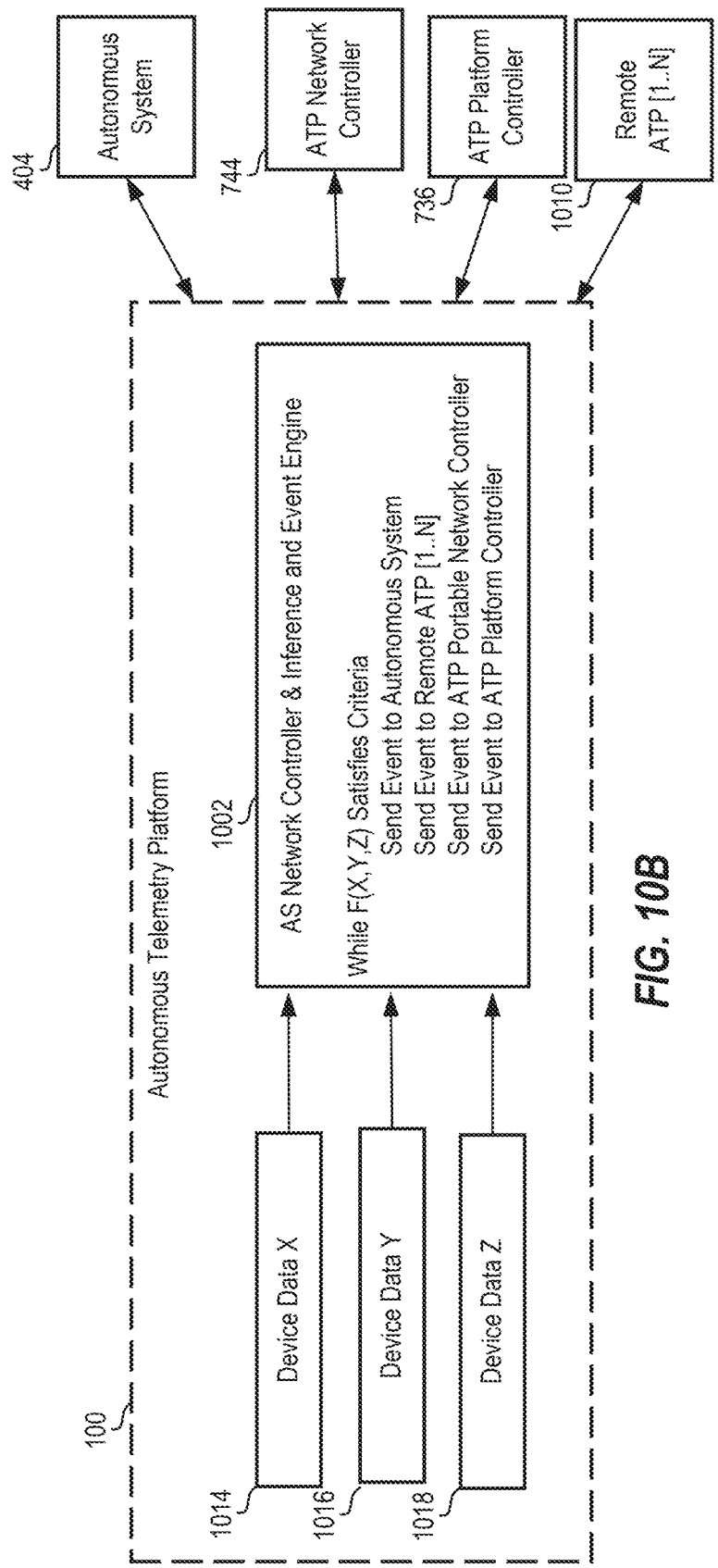
Figure 10C:
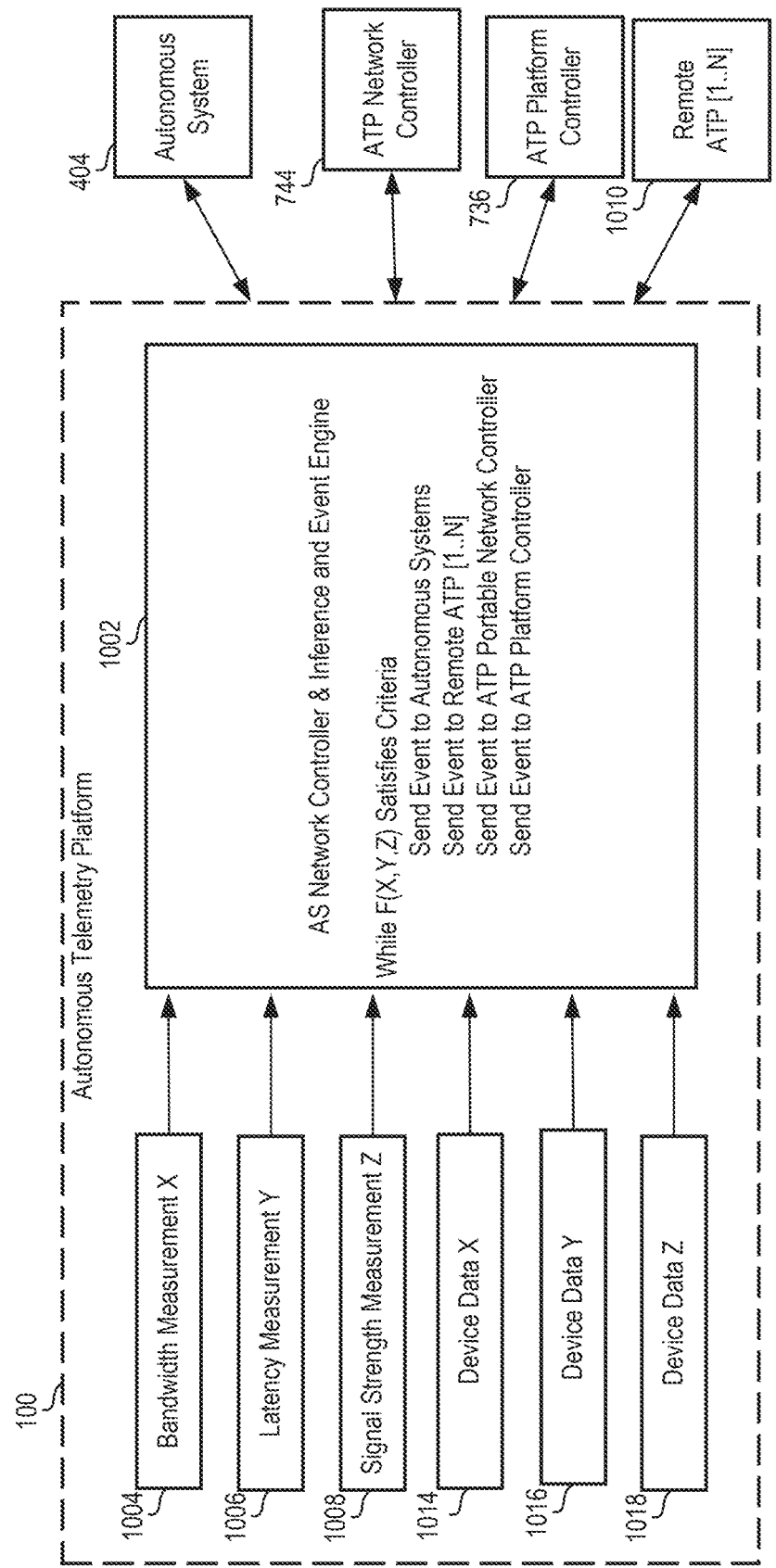

FIGS. 10A-10C are schematic illustrations of an autonomous telemetry platform 100 an autonomous system (AS) network controller 124 providing data to the inference and event engine 360 for event generation to multiple targets according to one or more embodiments described herein. In FIGS. 10A-10C, a processing block 1002 represents features and functions of the AS network controller 124 and the inference and event engine 360.

In the examples of FIG. 10A-10C, the processing block 1002 receives data sources such as metrics, device data, etc., generates events of interest based on performing an inference from the data sources, and delivers those events to one or more devices/systems as appropriate. For example, in FIG. 10A, the processing block 1002 uses a bandwidth measurement X 1004, and/or a latency measurement Y 1006, and a signal strength measurement Z 1008 to generate an event and then delivers the event to one or more of the autonomous system 404, the ATP portable network controller 744, the ATP platform controller with applications 736, a remote ATP 1010, and/or the like, including combinations and/or multiples thereof. As another example, in FIG. 10B, the processing block 1002 uses device data X 1014, device data Y 1016, and/or device data Z 1018 to generate an event and then delivers the event to one or more of the autonomous system 404, the ATP portable network controller 744, the ATP platform controller with applications 736, a remote ATP 1010, and/or the like, including combinations and/or multiples thereof. FIG. 10C represents a combination of FIGS. 10A and 10B, where the processing block 1002 generates and delivers an event based on one or more of the bandwidth measurement X 1004, the latency measurement Y 1006, the signal strength measurement Z 1008, the device data X 1014, the device data Y 1016, and/or the device data Z 1018.

According to one or more embodiments described herein, the ATP 100 of FIGS. 10A-10C may have support for an autonomous SDN (A-SDN), for example, if the AS network controller 124 has an A-SDN capability enabled (see, e.g., FIG. 3D).

In these examples, the processing block 1002 receives information associated with the data (as described) and can use this information (e.g., one or more of the bandwidth measurement X 1004, the latency measurement Y 1006, the signal strength measurement Z 1008, the device data X 1014, the device data Y 1016, and/or the device data Z 1018) to generate an event.

Examples of events the processing block 1002 can generate and deliver are as follows: update as network controller information; update remote ATP 100 as a network controller with communications information; updating remotely A-SDN control-plane communications controller 755 where this functional block exists; send event (e.g., where the event is asynchronous message containing data) to the autonomous system 404; stop/start/change autonomous system 404 or device 110 operation; move autonomous system 404 or device 110 forward or backward, up or down, etc.; move autonomous system 404 or device 110 to a new position; send ATP 100 processed module data to autonomous system 404; configure/reprogram as an AS network controller 124 and/or an A-SDN control-plane communications controller 755; configure/modify the autonomous system 404 or device 110 operation or behavior; and/or the like, including combinations and/or multiples thereof. It should be appreciated that these examples of events are merely examples and there can be many other event types/messages, which can be sent to any number of different targets.

Figure 11:
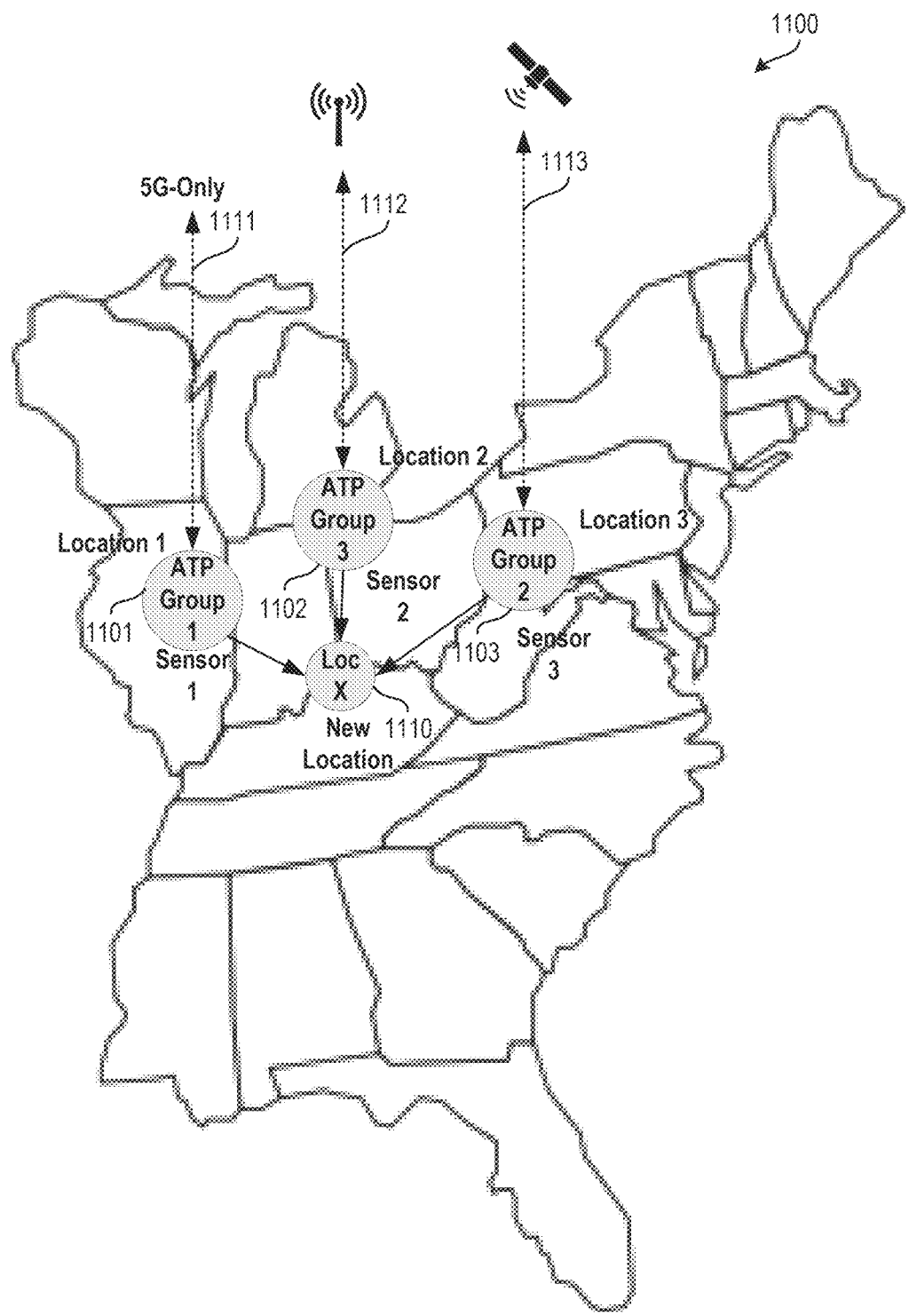
FIG. 11 is a schematic illustration of ATP groups deployed across a geographic area according to one or more embodiments described herein.

FIG. 11 is a schematic illustration of ATP groups 1101, 1102, 1103 deployed across a geographic area 1100 according to one or more embodiments described herein. The groups 1101, 1102, 1103 are examples of the local domains 764a, 764b, 764c respectively of FIG. 7K. The ATP groups 1101, 1102, 1103 each include one or more ATPs (see, e.g., FIGS. 1A-1C) and can be controlled, for example, using one or more of the topologies illustrated in FIGS. 7L-7O.

As an example, ATPs within the ATP groups collect data using sensors. Based on the collected sensor data collected at the ATPs, the ATPs in conjunction with the autonomous system 404 determines a new location 1110 ("Loc X"). The ATPs also evaluate network performance (e.g., reliability, error-rates, QoS) and share metrics with each communications controller (see, e.g., FIGS. 3F, 3G) (depending on particular topology configuration) to select communication resources (based on topology, communication metrics, etc.) for the given current location to optimize the communication performance across ATPs. Based on sensor data and/or network data, a trajectory can be determined and provided to the autonomous systems where one or more autonomous systems can move towards the new location 1110 as illustrated.

Embodiments of the present disclosure provide technical solutions to processing of telemetry and data from one or more autonomous systems or devices. For example, a sensor associated with an autonomous system can collect data. An autonomous telemetry platform processor module can analyze the sensor data and properties related to the data to make decisions, such as how to transmit the data, how to control the autonomous system and/or other autonomous systems, how to implement network topologies to provide for optimal data transmission, and/or the like, including combinations and/or multiples thereof. It should be appreciated that while one or more embodiments described herein may refer to an unmanned aerial vehicle, this is for example purposes and the claims should not be so limited. In other embodiments, the teachings described herein may be used with other types of autonomous systems and/or other types of unmanned, semiautonomous, or autonomous vehicles, such as but not limited to land-based vehicles (e.g. wheeled or tracked vehicles), water-based vehicles (e.g. boats or submersible vehicles), as well as other portable or mobile devices, including industrial control or sensor systems, IoT devices, medical devices, NMR devices, MRI devices, and/or the like, including combinations and/or multiples thereof, for example, without deviating from the teachings provided herein. Further, the remote systems may be autonomous, semi-autonomous, or remotely operator controlled.

It should be appreciated that one or more of the various components, modules, engines, etc. described can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., a processor, processing circuitry, and/or the like, including combinations and/or multiples thereof) for executing those instructions. Thus a system memory (e.g., a random access memory, a read-only memory, and/or the like, including combinations and/or multiples thereof) can store program instructions that when executed by the processing device implement the components, modules, engines, etc. described herein. Other components, modules, engines, etc. can also be utilized to include other features and functionality described in other examples herein.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should also be noted that the terms "first", "second", "third", "upper", "lower", and the like may be used herein to modify various elements. These modifiers do not imply a spatial, sequential, or hierarchical order to the modified elements unless specifically stated.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method comprising:
providing a processor module of an autonomous system, the processor module being communicatively coupleable to a remote system via a first connection and the processor module being communicatively coupleable to one or more devices via a respective connection to each of the one or more devices, each device having at least one device feature hardware to collect data;
establishing the first connection between the remote system and the processor module;
establishing each respective connection between the processor module and each of the one or more devices;
determining, in response to a data request, how to transmit data based at least in part on local metrics, remote metrics, a local configuration of the processor module, a network topology, and network properties;
transmitting data from any one of the remote system, the one or more devices, or the processor module to any other of the remote system, the one or more devices, or the processor module via at least one of the first connection or one of the respective connections; and
causing at least one of the remote system, the one or more devices, or the processor module to perform an action based at least in part on data collected by the one or more devices;
wherein determining how to transmit the data includes determining whether to transmit data synchronously or asynchronously.

2. The method of claim 1, wherein transmitting data is performed synchronously.

3. The method of claim 1, wherein transmitting data is performed asynchronously.

4. The method of claim 1, wherein the network properties comprise a bandwidth, a signal strength, and a latency of the first connection or at least one of the respective connections.

5. The method of claim 1, further comprising unifying data collected by each of the one or more devices into a common data model before transmitting the common data model.

6. A telemetry system, comprising:
a processor module communicatively coupleable to an autonomous system, the processor module comprising:
a communication device communicatively coupling the processor module to the autonomous system;
a system processor system on module;
an intelligent autonomous telemetry processor system on chip; and
a shared memory or internal bus system communicatively coupling the system processor system on module and the intelligent autonomous telemetry processor system on chip;
one or more devices each having at least one device feature hardware to collect data; and
a communication link between the processor module and the one or more devices to transmit data between the processor module and the one or more devices, the processor module having an interface controller facilitating communication between the one or more devices and the processor module via the communication link.

7. The telemetry system of claim 6, wherein the system processor system on module further comprises:
the interface controller;
a processor module system software/operating system;
a telemetry data/model processor; and
a message and transport services module; wherein the telemetry data/model processor is configured to unify the data from each of the one or more devices into a common data model;
wherein the message and transport services module is configured to manage scheduling, transport, and delivery characteristics of data requests.

8. The telemetry system of claim 6, wherein the system processor system on module further comprises:
the interface controller;
a processor module system software/operating system;
a telemetry data/model processor; and
a message and transport services module.

9. The telemetry system of claim 8, wherein the intelligent autonomous telemetry processor system on chip comprises:
a network controller; and
a transport handler configured to interface with the communication device;
wherein the network controller determines whether data requests are transmitted synchronously or asynchronously.

10. The telemetry system of claim 9, wherein the intelligent autonomous telemetry processor system on chip further comprises:
an artificial intelligence processor core;
a digital signal processor core;
a scalar processor core;
a real-time processor core; and
an inference and event engine.

11. The telemetry system of claim 10, wherein the network controller updates whether the data requests are transmitted synchronously or asynchronously based at least on available communication capabilities in real time.

12. The telemetry system of claim 6, wherein the system processor system on module and the intelligent autonomous telemetry processor system on chip are integrated on a single hardware unit.

13. The telemetry system of claim 12, wherein the single hardware unit further comprises:
the interface controller;
a processor module system software/operating system;
a telemetry data/model processor;
a message and transport services module;
the shared memory or internal system bus;
a network controller; and
a transport handler.

14. The telemetry system of claim 13, wherein the single hardware unit further comprises:
an artificial intelligence processor core;
a digital signal processor core;
a scalar processor core;
a real-time processor core; and
an inference and event engine.

15. The telemetry system of claim 6, wherein the communication device of the processor module further facilitates communication between the processor module and a remote system via another communication link.

16. The telemetry system of claim 15, wherein the remote system is selected from a group consisting of:
another autonomous system remote from the autonomous system;
an autonomous system platform controller remote from the autonomous system;
a portable network controller remote from the autonomous system; and
another processor module.

17. The telemetry system of claim 6, wherein the one or more devices are a plurality of devices;
wherein at least one of the plurality of devices is a non-intelligent device further comprising a device hardware interface.

18. The telemetry system of claim 6, wherein at least one of the one or more devices is a nuclear magnetic resonance (NMR) device;
wherein the data is NMR data collected by the NMR device;
wherein the processor module receives the NMR data from the NMR device; and
wherein the processor module transmits the NMR data to an NMR application for visualization and user activity, the NMR application being remote from the NMR device.

19. The telemetry system of claim 6, wherein the communication device comprises a plurality of communication modules, each communication module being configured to transmit and receive data using a different communication medium; and
wherein the processor module further comprises a plurality of transport handlers, each transport handler being configured to interface with a respective communication module of the plurality of communication modules.

* * * * *